Feb. 13, 1962 P. GRAHAM 3,020,640
GRAPHIC MACHINE
Filed Oct. 14, 1958 19 Sheets-Sheet 1
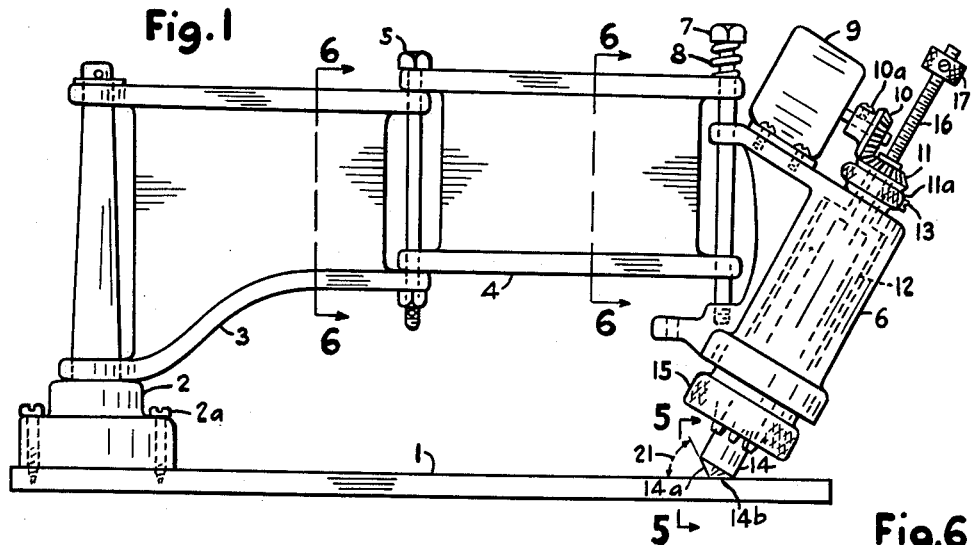
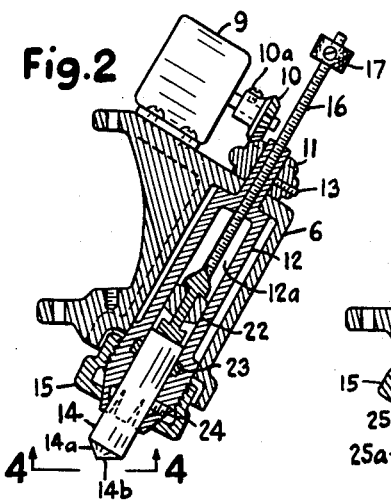
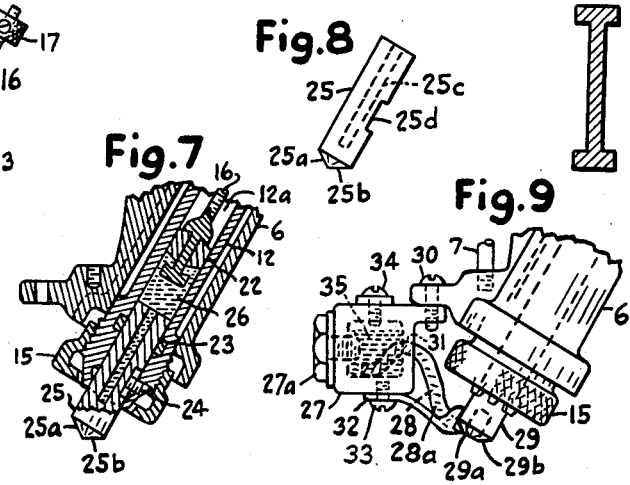
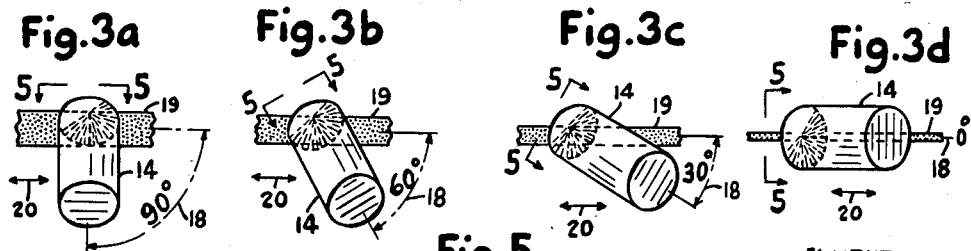
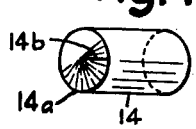
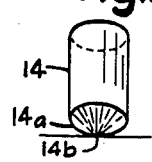
INVENTOR.
Phillip Graham
BY
William J. Ruano
ATTORNEY

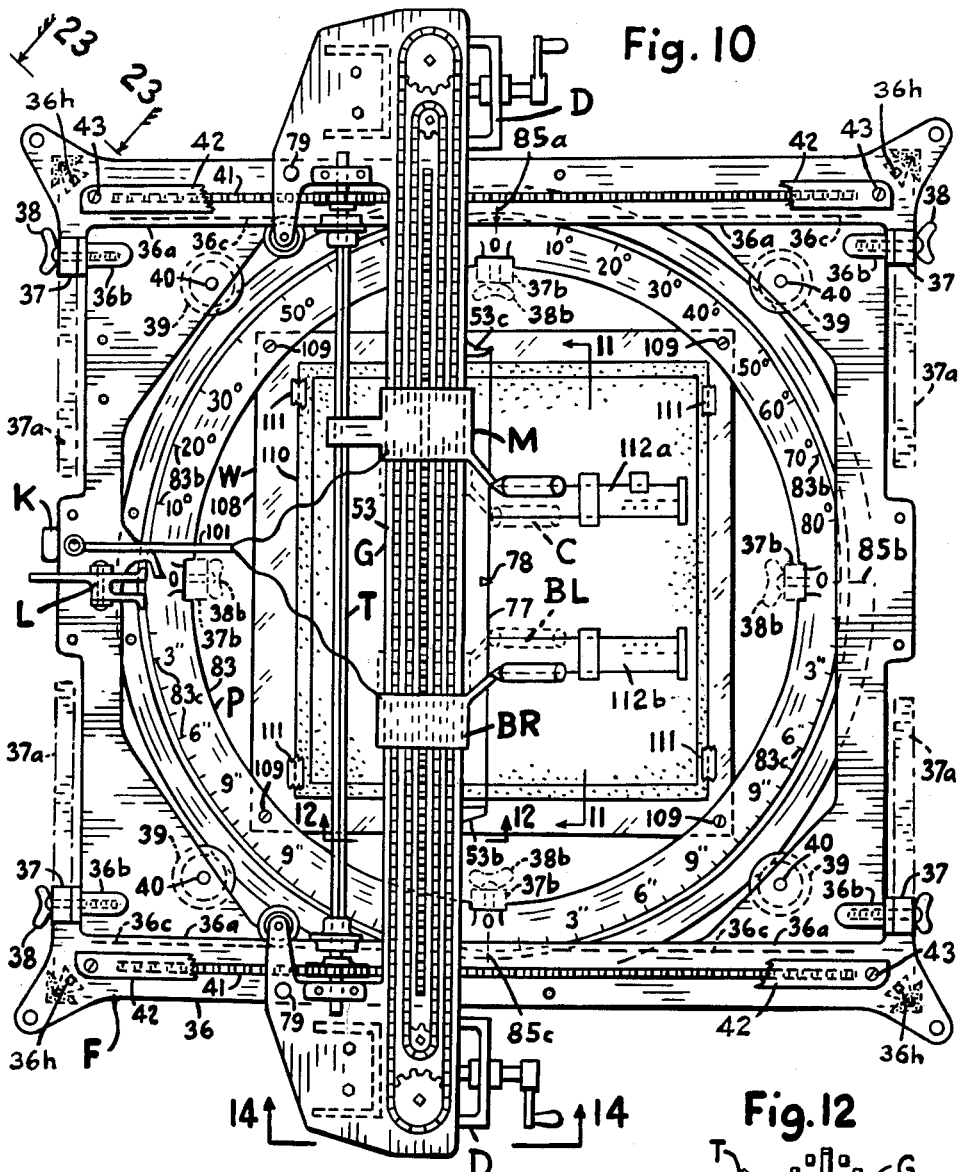
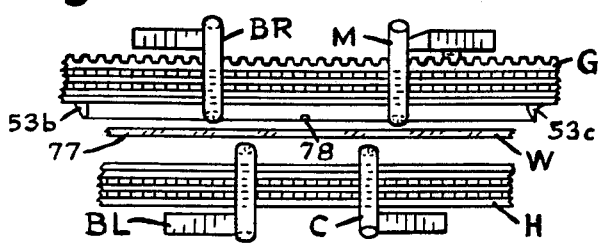

Feb. 13, 1962 P. GRAHAM 3,020,640
GRAPHIC MACHINE
Filed Oct. 14, 1958 19 Sheets-Sheet 3
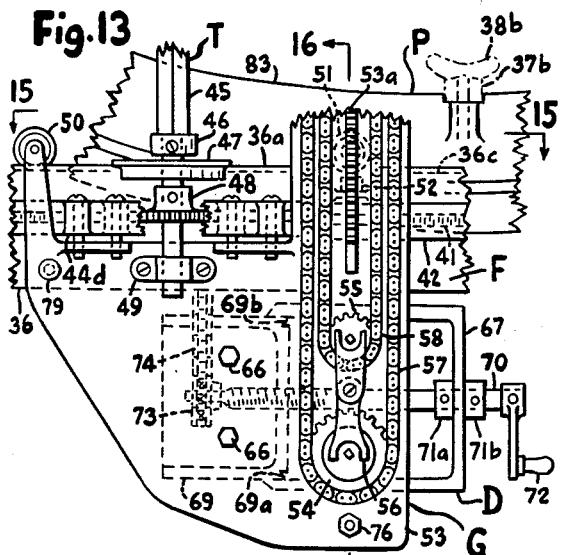
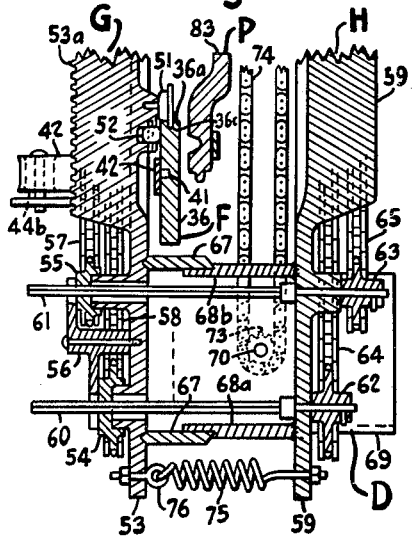
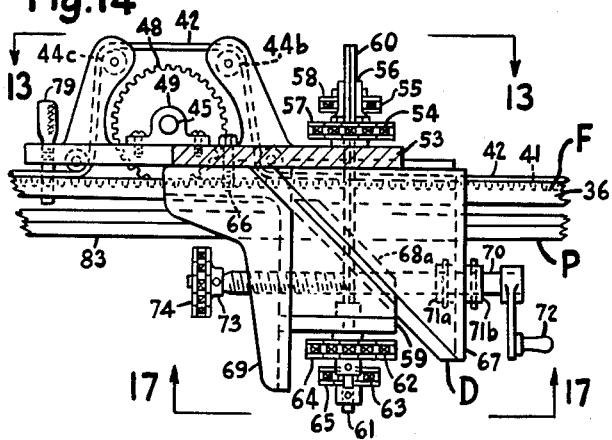
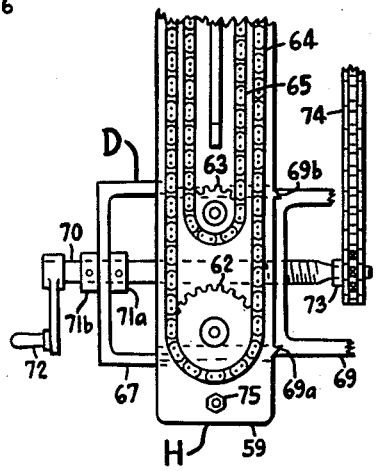
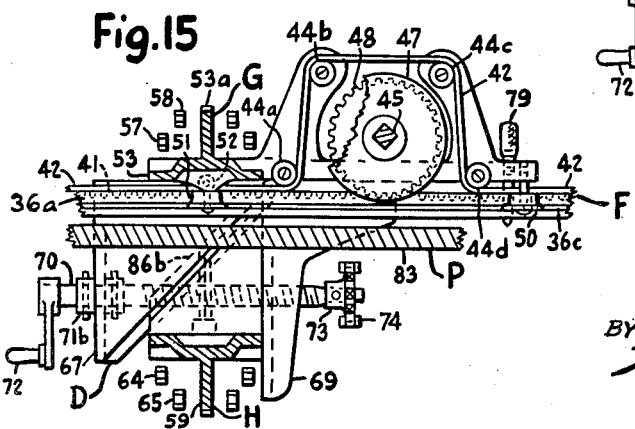
INVENTOR.
Phillip Graham
BY
William J. Ruzano
ATTORNEY

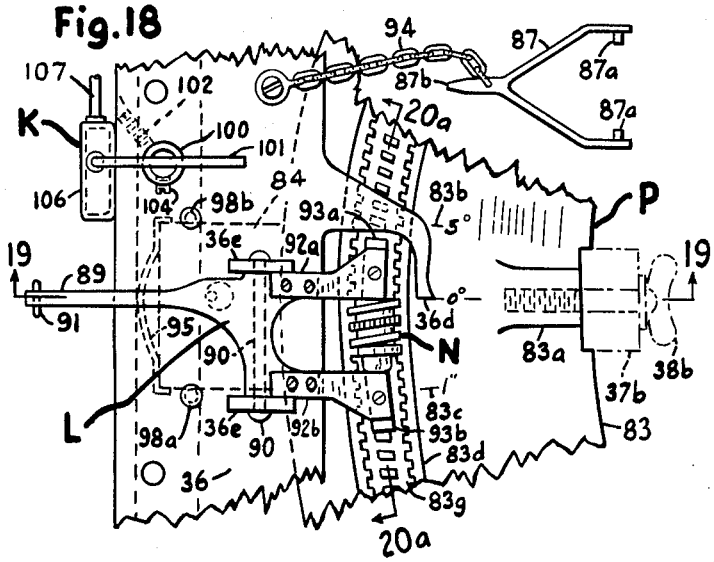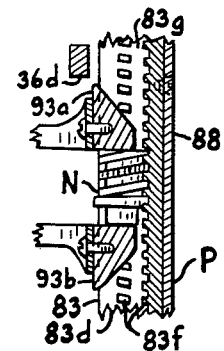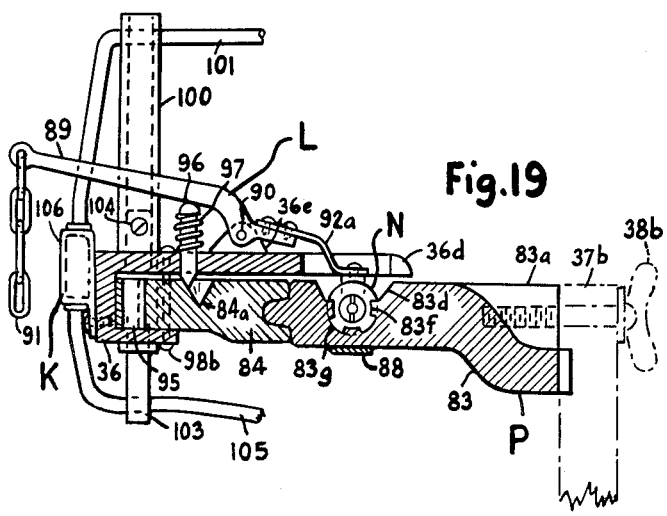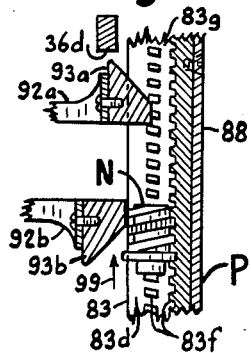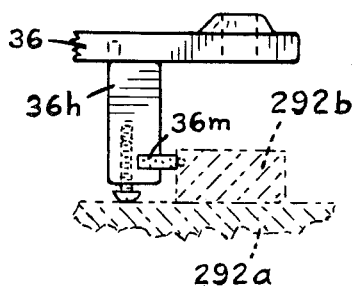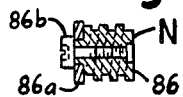

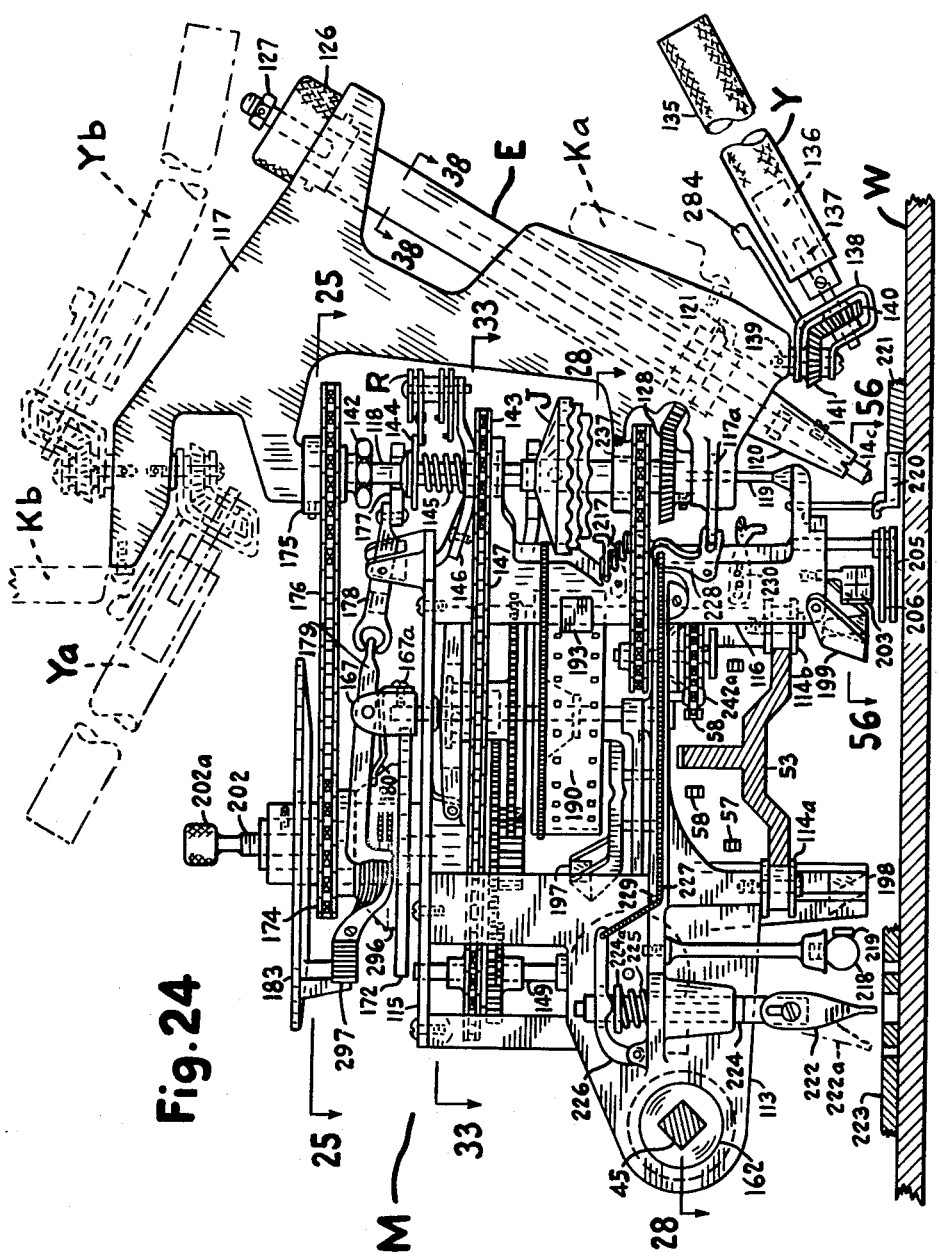

INVENTOR.
Phillip Graham
BY
*William J. Ruano*
ATTORNEY

Feb. 13, 1962  P. GRAHAM  3,020,640
GRAPHIC MACHINE
Filed Oct. 14, 1958  19 Sheets-Sheet 7
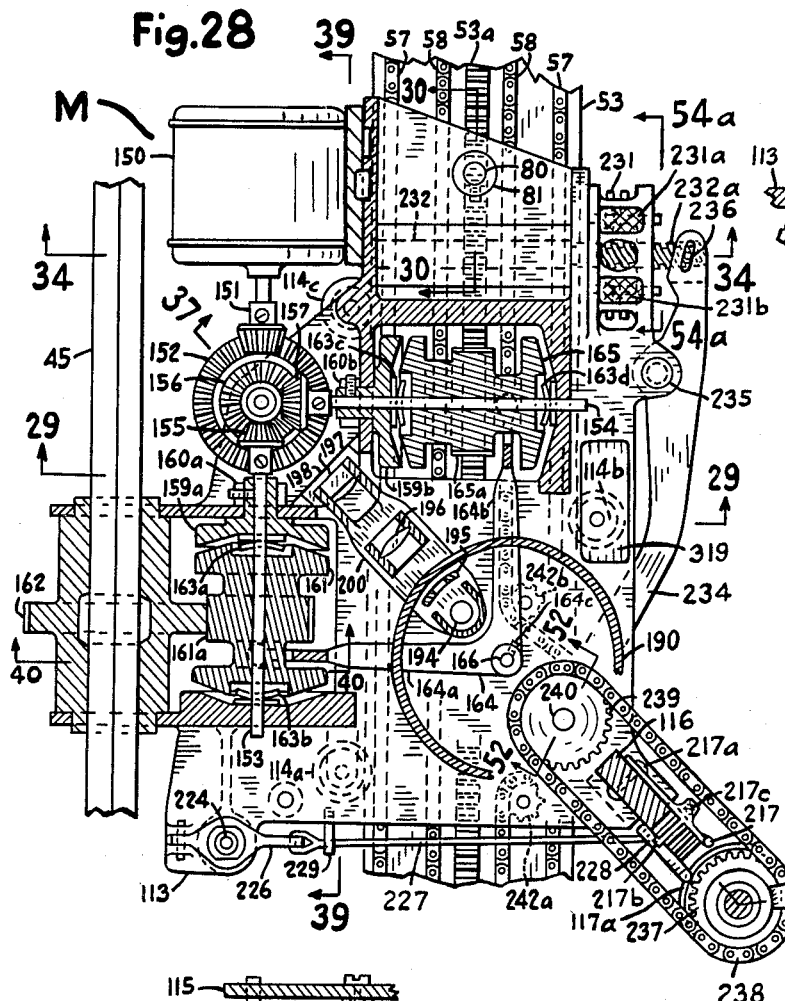
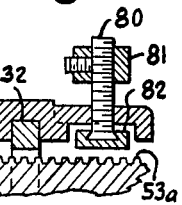
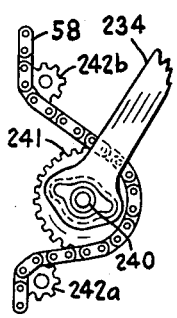
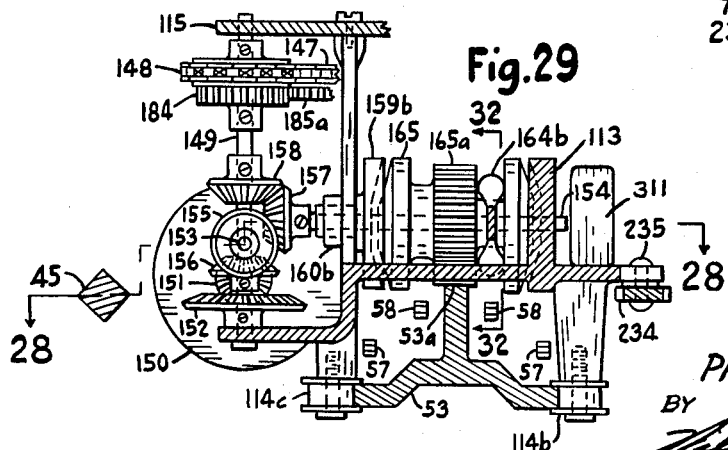
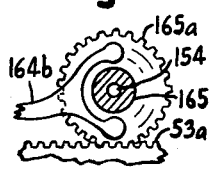
INVENTOR.
Phillip Graham
BY
William J. Ruano
ATTORNEY Feb. 13, 1962 P. GRAHAM 3,020,640
GRAPHIC MACHINE
Filed Oct. 14, 1958 19 Sheets-Sheet 8
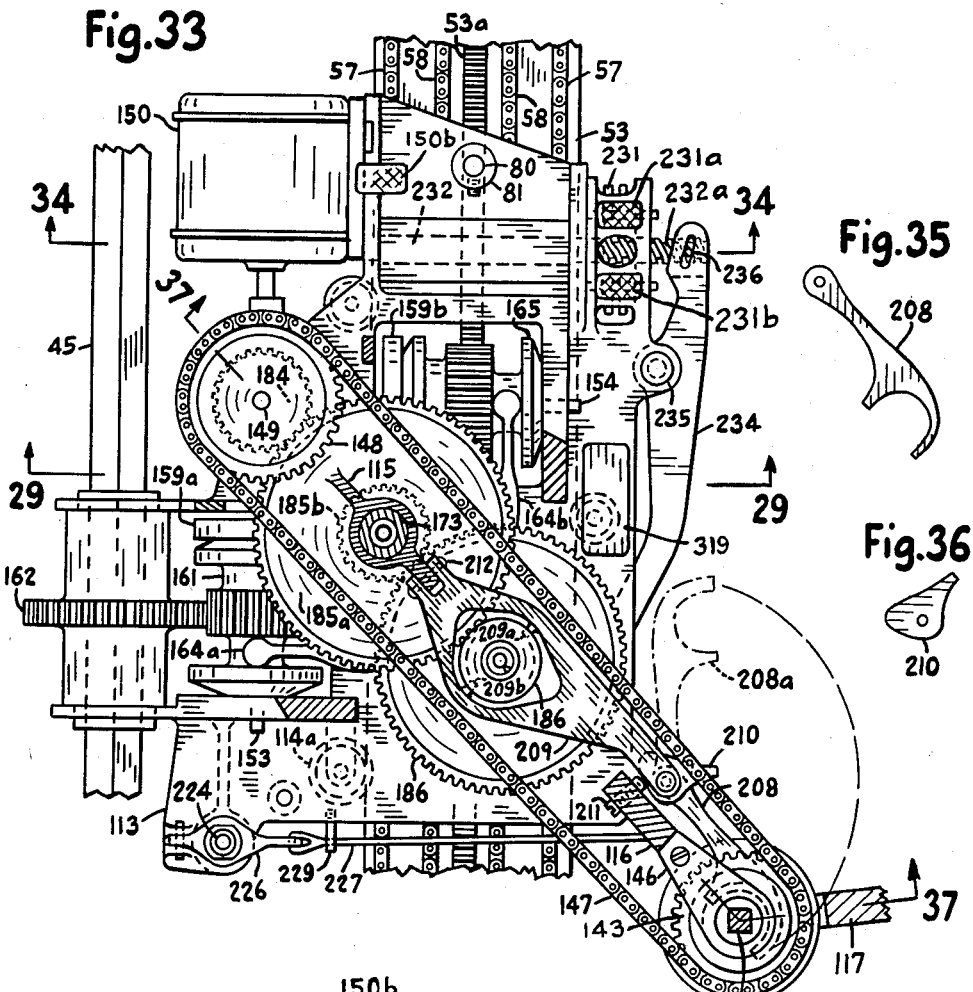
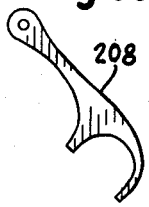
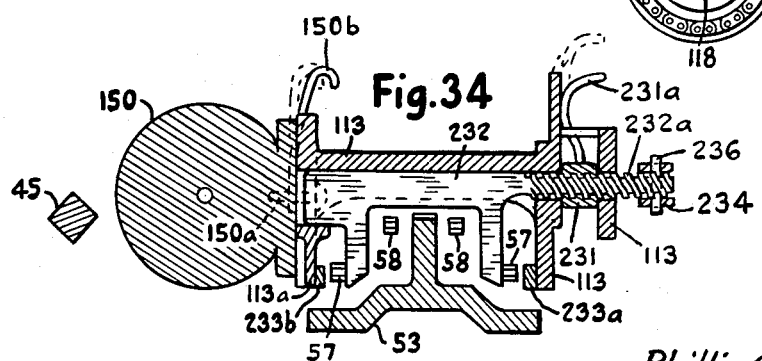
INVENTOR.
Phillip Graham
BY
William J. Ruano
ATTORNEY

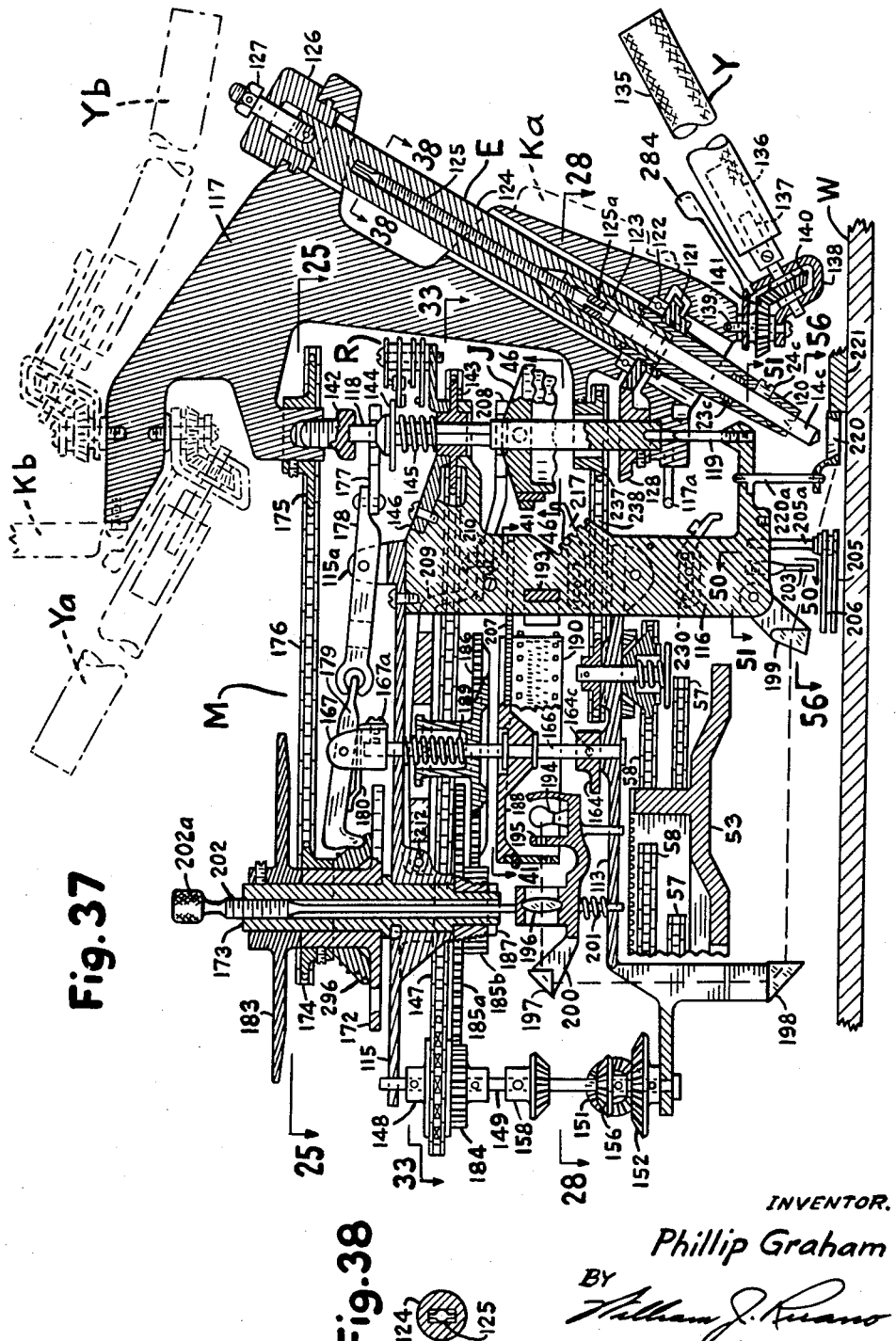

Feb. 13, 1962 P. GRAHAM 3,020,640
GRAPHIC MACHINE
Filed Oct. 14, 1958 19 Sheets-Sheet 10
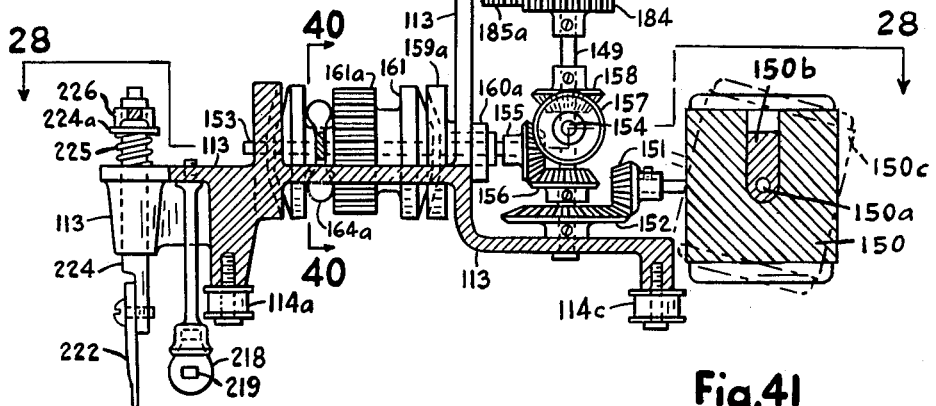
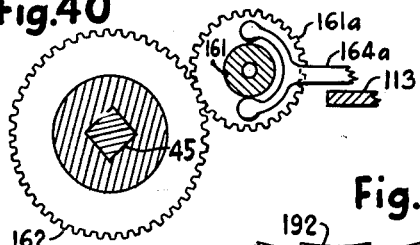
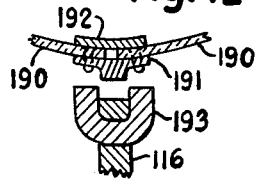
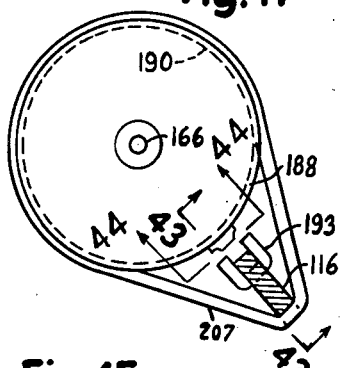
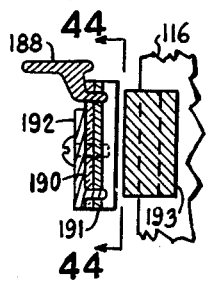
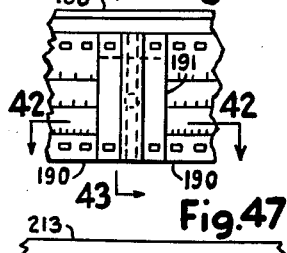
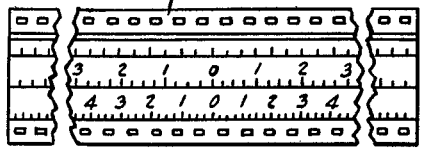
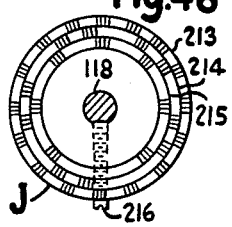
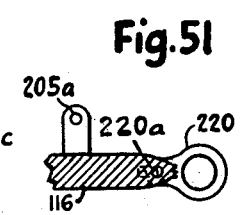
INVENTOR.
Phillip Graham
BY
William J. Ruano
ATTORNEY

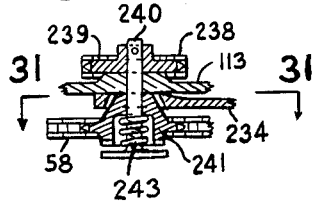
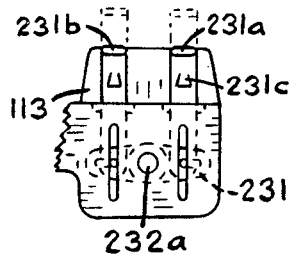
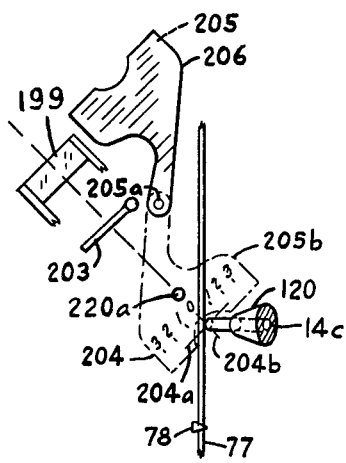
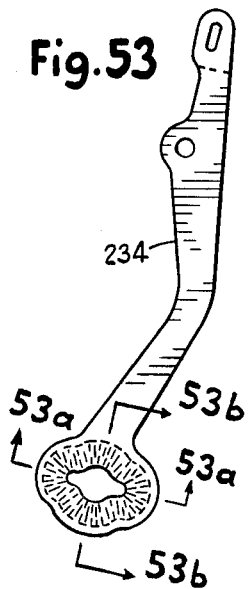
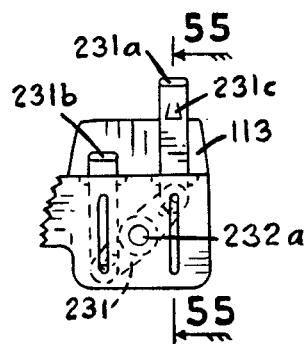
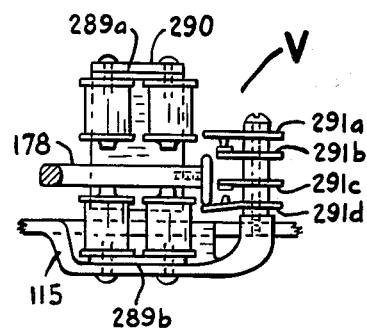
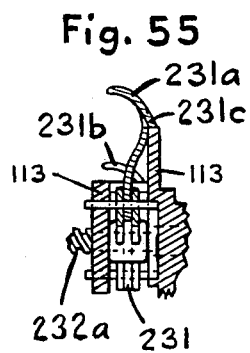

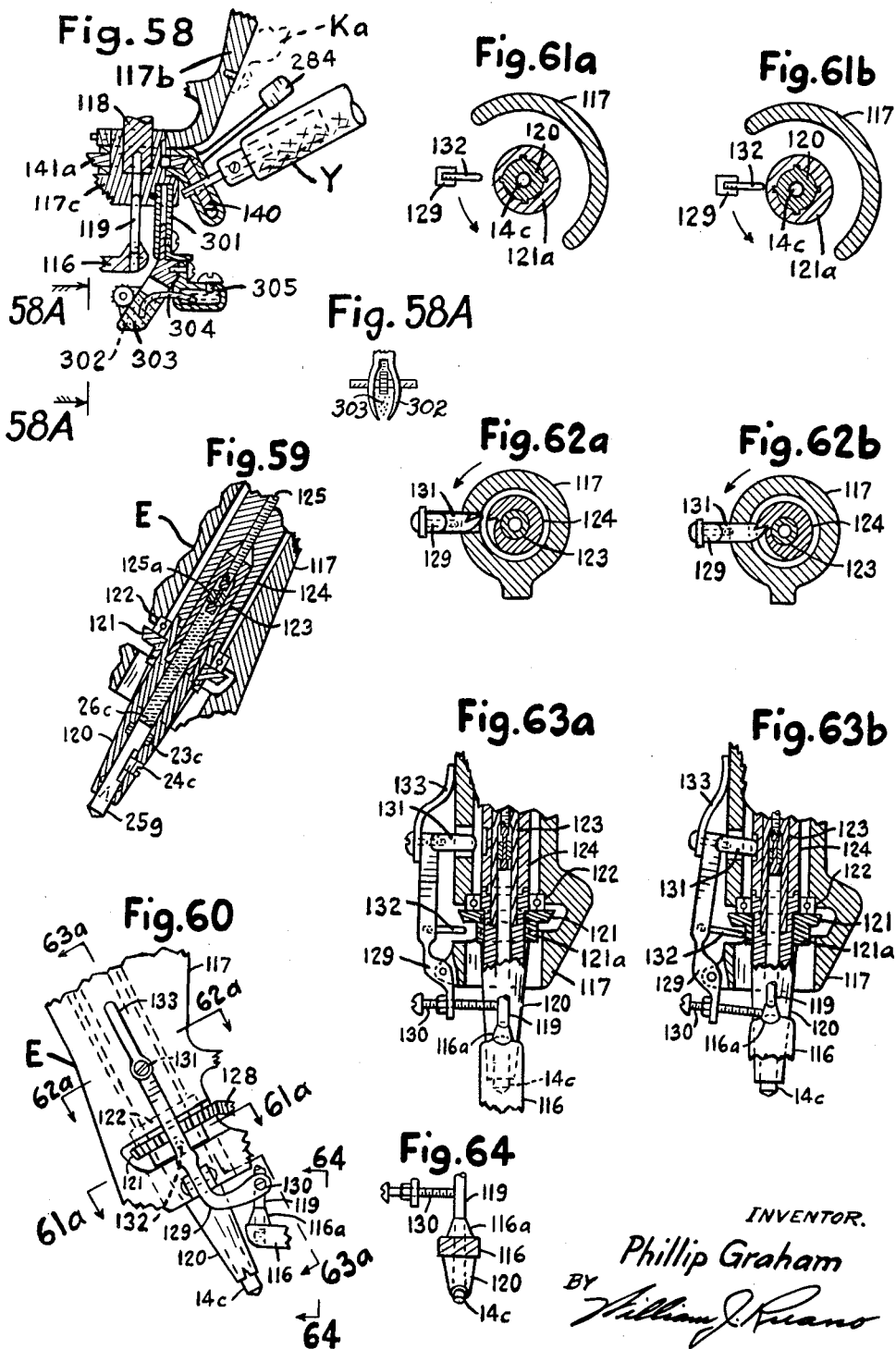

Feb. 13, 1962 — P. GRAHAM — 3,020,640
GRAPHIC MACHINE
Filed Oct. 14, 1958 — 19 Sheets-Sheet 13
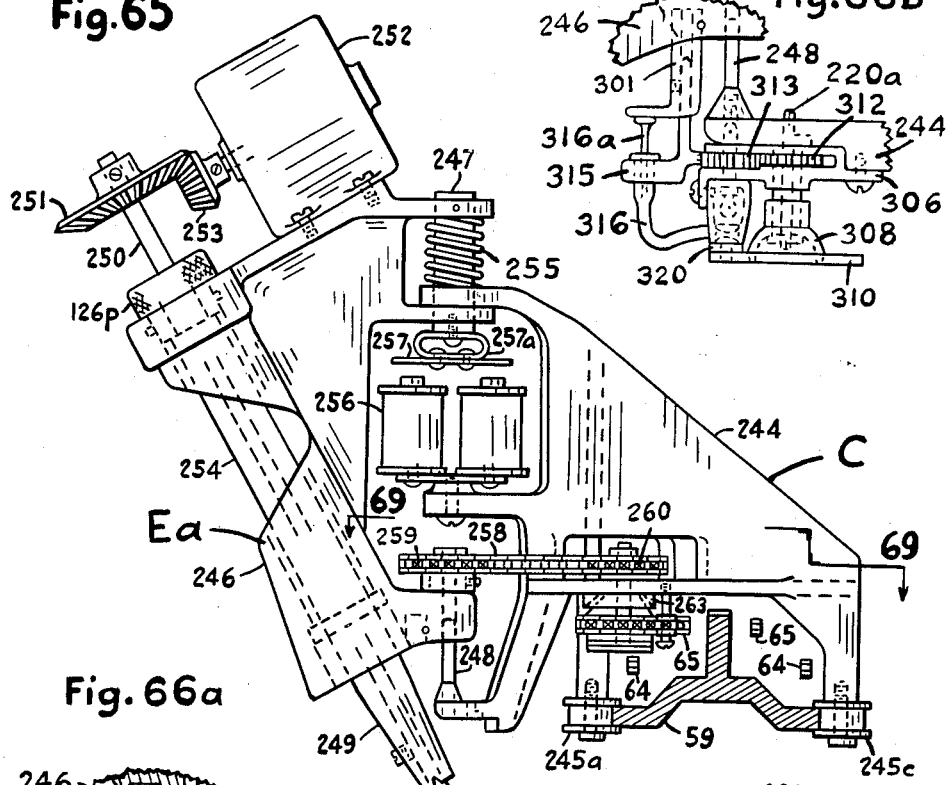
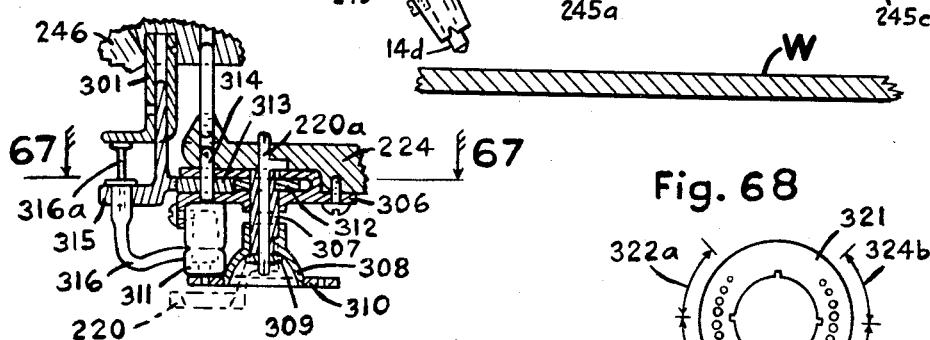
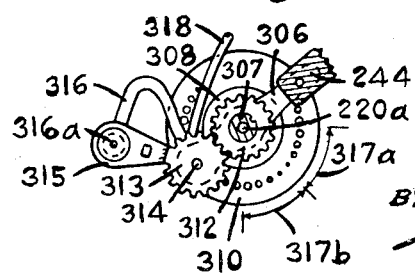
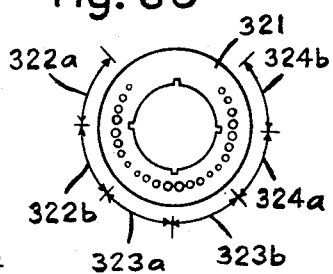
INVENTOR.
Phillip Graham
BY
William J. Ruano
ATTORNEY INVENTOR.
Phillip Graham
BY
ATTORNEY

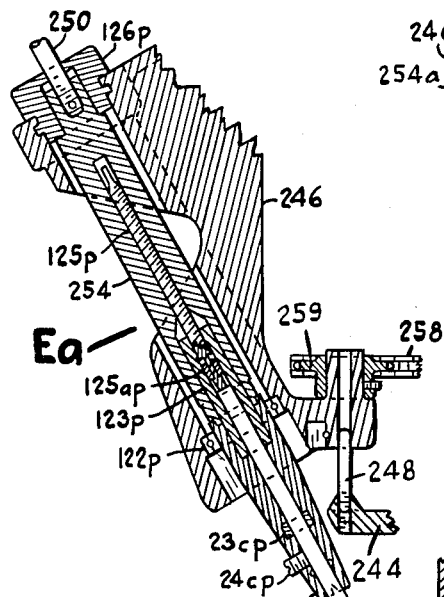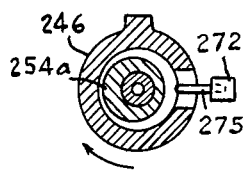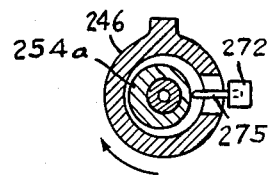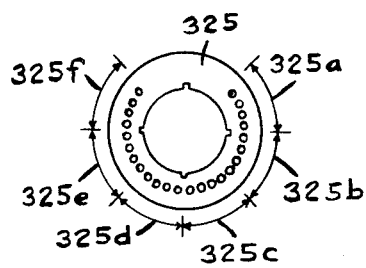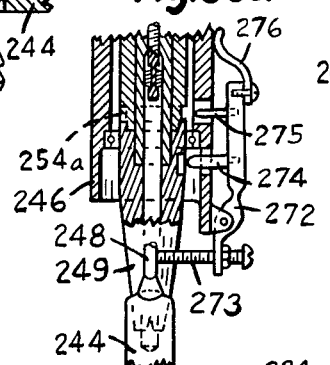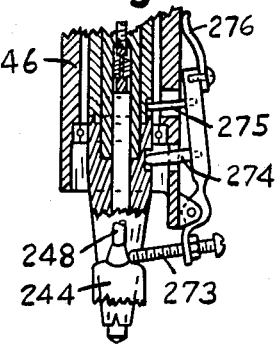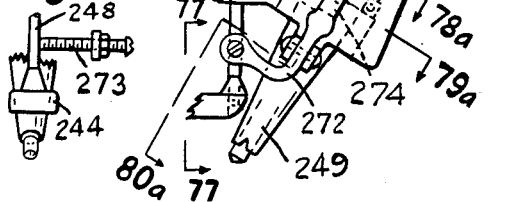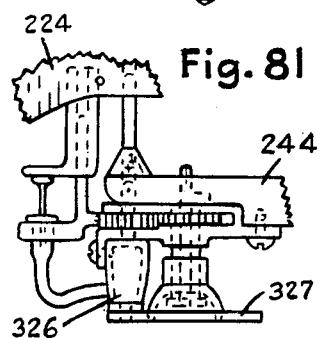

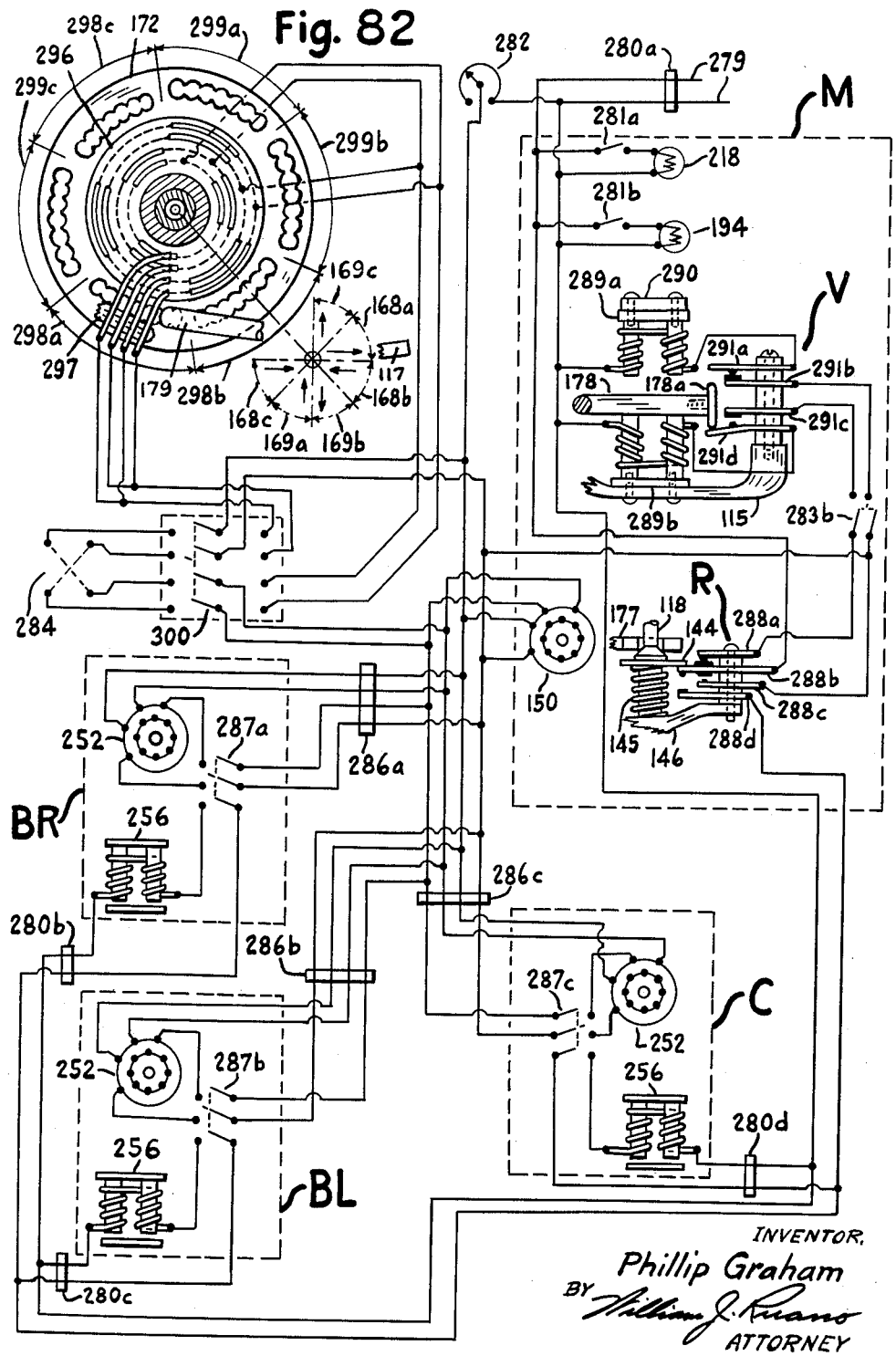

Feb. 13, 1962 P. GRAHAM 3,020,640
GRAPHIC MACHINE
Filed Oct. 14, 1958 19 Sheets-Sheet 17

INVENTOR.
Phillip Graham
BY
ATTORNEY

Feb. 13, 1962 P. GRAHAM 3,020,640
GRAPHIC MACHINE
Filed Oct. 14, 1958 19 Sheets-Sheet 18

INVENTOR.
Phillip Graham
BY
ATTORNEY

Feb. 13, 1962 P. GRAHAM 3,020,640
GRAPHIC MACHINE
Filed Oct. 14, 1958 19 Sheets-Sheet 19
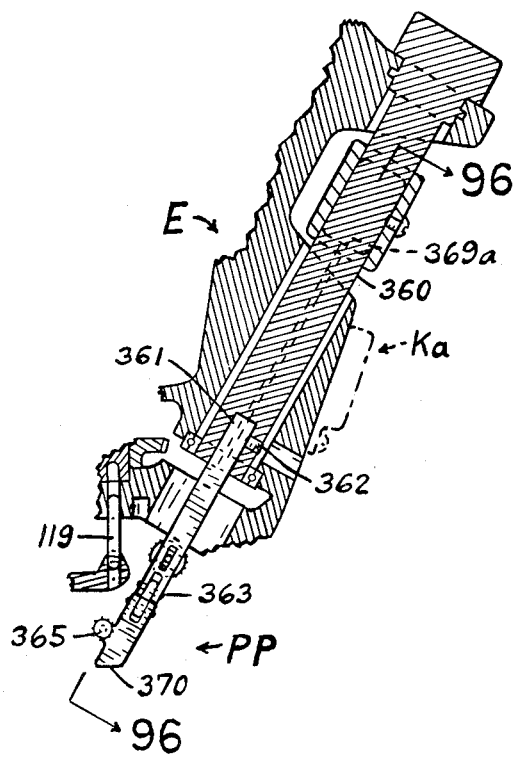
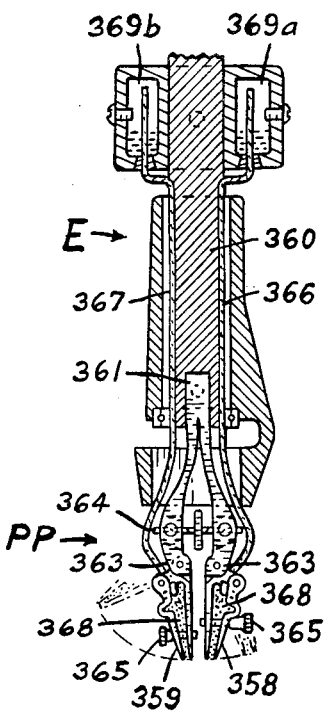
INVENTOR.
Phillip Graham
BY
ATTORNEY United States Patent Office 3,020,640
Patented Feb. 13, 1962

3,020,640
GRAPHIC MACHINE
Phillip Graham, 2825 Glenmore Ave., Pittsburgh 16, Pa.
Filed Oct. 14, 1958, Ser. No. 767,157
44 Claims. (Cl. 33—23)

This invention relates to a graphic machine or mechanism for drawing or laying out sketches on paper or other surfaces accurately and at a rapid rate or for guiding the movements of tools on such surfaces, and is a continuation-in-part of my copending applications: Serial No. 221,005, filed April 14, 1951, entitled Graphic Machine, which has been abandoned (Application Serial No. 221,005 is a divisional application of Patent No. 2,701,417); Serial No. 364,674, filed June 29, 1953, entitled Graphic Machine, now Patent No. 2,882,604, and Serial No. 485,915, filed February 3, 1955, entitled Graphic Machine, which has been abandoned. More particularly, it relates to a flexible graphic machine with a simple main control, which allows an engineering draftsman, and the like, to speedily and accurately draw technical sketches or layouts with substantially natural free-hand drawing movements. The control movements in general are reflex actions of the draftsman, as typing actions are reflex actions of a typist, otherwise the machine is largely automatic in operation, since it embodies a marker or tool which may be used continuously together with an automatic mechanism for making it possible to accurately and rapidly draw and measure straight lines of any desired width at right angles to each other without the use of a T-square or the like.

A graphic machine involving the principles of the present invention may also be used for structural fabricating layout work, wherein layout markings are made on sheet material and the like, such as sheet metal, plastic, wood, glass, or wherein marking is eliminated by having the graphic machine guide the working tool accurately and rapidly as in pantographs with cutting torches.

Engineering drafting techniques and techniques in similar graphic fields have been essentially manual arts that require considerable skill in combination with a technical knowledge. The drafting instruments in general use today do not have the means to allow adequate speed in the development of complicated new project ideas. Such instruments limit the speed and accuracy of the drawing efforts of the engineering draftsmen, template makers, and the like. Generally, the design and detail drawings cannot be drawn as fast as production machinery can be set up to build a complicated project, thus in times of emergency, such as war-like times, production machinery lies idle because of bottlenecks in engineering-drawing work. Usually the bottleneck cannot be eliminated with an oversize force of men, since such a force is unwieldly and inefficient. A greatly overstaffed force is likely to materially slow up the project since so much more time would be spent on coordinating the work and collaborating the work. Such an overstaffed force greatly increases the cost of a project.

Most of the so-called engineering work that is done in drawing rooms is design drafting and detail drafting. Drafting is in general the only practical medium by which an engineer can convey his conception of a project. In many fields of engineering-drawing work, the highly intelligent and experienced engineers and draftsmen can swiftly visualize the answers to technical problems confronting them, but conventional drafting equipment limits the amount of sketching that they can do during a given period. Such key technical men can often think up answers at a rate that is ten times as fast as the rate they can record the ideas with sketches, thus little of their brainpower is used.

These key men could produce many times as much work with the graphic machine embodying the present invention. Trainees, frail operators, and physically handicapped operators could use the graphic machines to draw faster and more accurately with little effort, than could non-handicapped workers with common drafting equipment.

Since our military defense and our economical security are based on the use of the most modern machines, rather than mass manpower, there is an urgent need for a graphic machine which will enable quick designing of new machines and other equipment to keep us ahead of the technical advancements of other countries, also to increase industrial productive capacity so that design costs can be reduced considerably and monetary inflation avoided.

An object of the present invention is to provide a novel graphic machine for engineering drawing work and the like, involving automatic features that allow the operator to rapidly and accurately scale and draw sketches with suitable selective types of lines, particularly straight lines at right angles to each other, on drawing paper and other surfaces on which layouts are to be made, the automatic features being responsive to substantially free-hand, normal drawing movements, that may include manual propulsion of a marker along its path. Furthermore, the automatic features include control means that are pivoted for preselecting the direction of movement of the marker when there is power drive, to draw a line in one direction or in an opposite direction, also lines in either direction along a path at ninety degrees to the first lines.

A still further object of my invention is to provide a graphic machine which, though made up of a plurality of parts, is nevertheless, exceedingly simple in operation and may be readily operated by semi-skilled labor, frail, or physically handicapped persons, such as one-armed persons.

Another object of the present invention is to provide a novel graphic machine involving automatic features, including a marker that may be used continuously and which is pivotable for obtaining different line widths, the marking means and other features greatly speeding up the process of making sketching lines, particularly straight lines, on paper and other surfaces on which a drawing is to be made, and thus speeding up production of manufactured articles, thereby overcoming the disadvantages of slowness of common drafting techniques.

A still further object of the invention is to provide a graphic machine having duplicate, quadruplicate or other multiples of markers, which may be used in cases where multiple layout portions are to be drawn simultaneously with a single control by the operator, which is useful in making duplicate layouts or partially duplicate layouts, also symmetrical layouts or partially symmetrical layouts. Furthermore, this feature allows the operator to follow a right hand detail reference sketch using control movements as for drawing a right hand object while the machine setting causes the marking means to lay out a left hand object. This feature is not only useful in making sketches of I-beams, columns, and the like, but in drawing layout lines on the same or opposite surfaces of sheet metal, or the same or opposite flanges of I-beams or other structural elements and the like.

A still further object of my invention is to embody a novel automatic scale mechanism in the graphic machine so as to project, with ease, a luminous image of any preselected scale in close proximity to the marker so that the operator can quickly measure any line from any starting point by any of a plurality of scales, without diverting his attention away from the marking action.

A still further object of my invention is to provide a novel protractor in the graphic machine so as to more accurately and quickly make a protractor setting, also to make selective indexed protractor settings.

A still further object of my invention is to provide a drawing machine which will make considerably better drawings, since the lines are more uniform and opaque than those normally made by draftsmen using ordinary drafting techniques, and drawings that are relatively clean since it is unnecessary to place either hands or instruments on the paper or other material on which the drawing is made which would normally result in smears.

Other objects and advantages of my invention will become apparent from a study of the following description taken with the accompanying drawings wherein:

FIG. 1 is an elevational view showing the use of a rotating and pivotable, tilted, pencil-type stylus for making lines of preselected variable widths;

FIG. 2 is a sectional view taken through the pivoted arm shown at the extreme right of FIG. 1;

Figure 25:
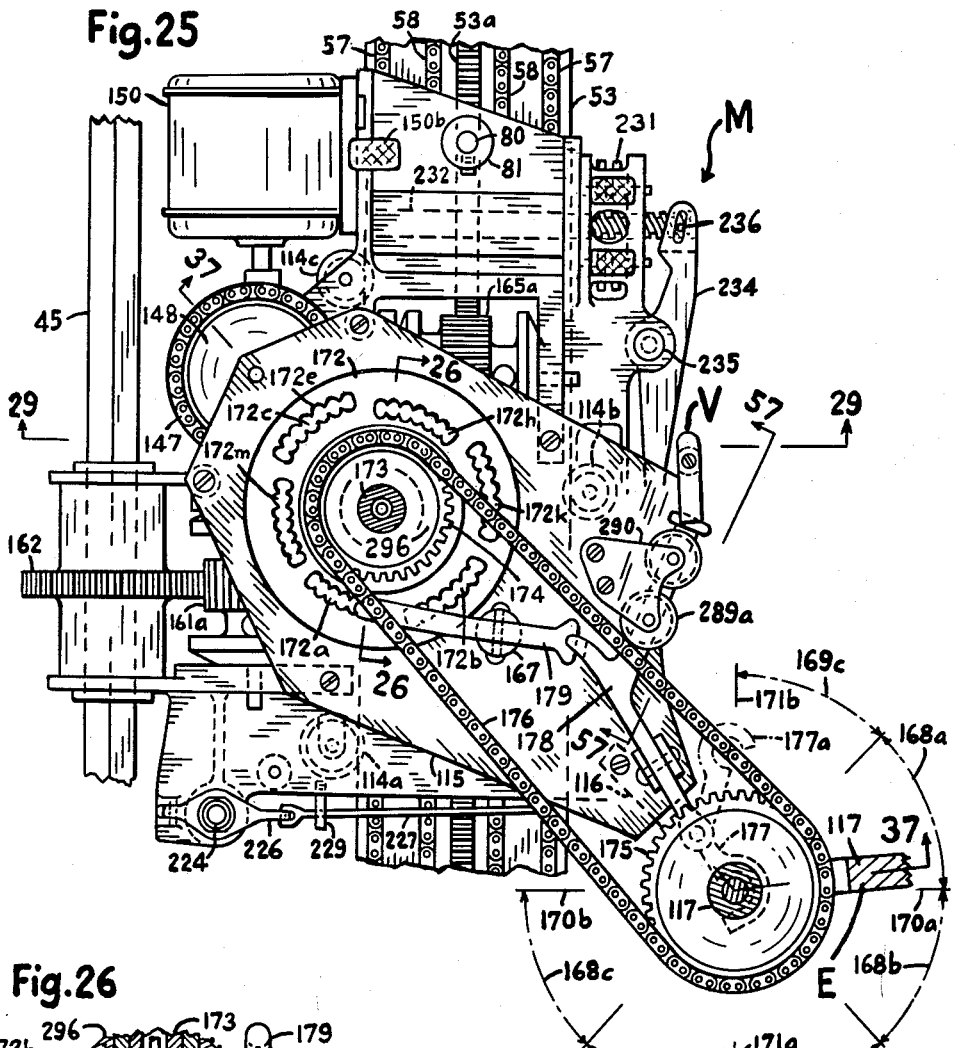
Figure 26:
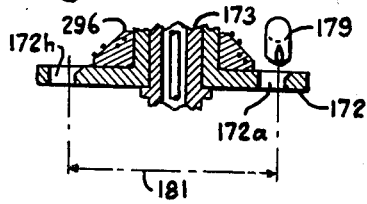
Figure 27:
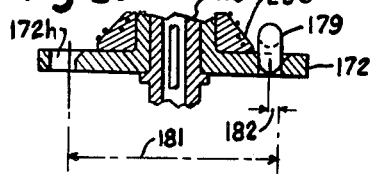
Figure 69:
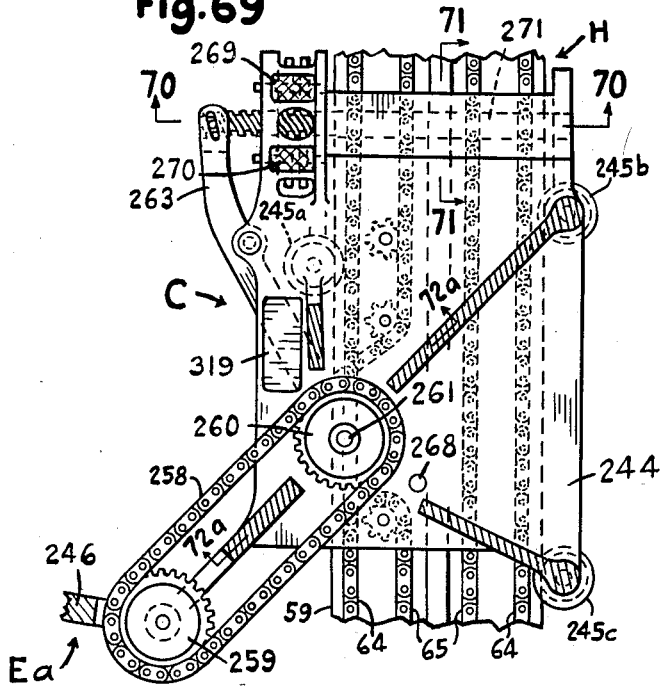
Figure 73A:
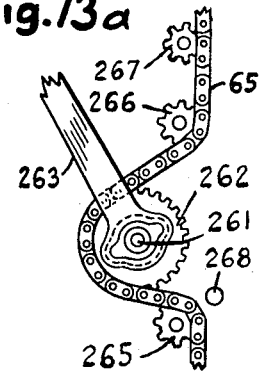
Figure 73B:
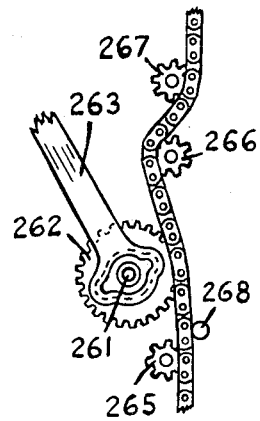
Figure 70:
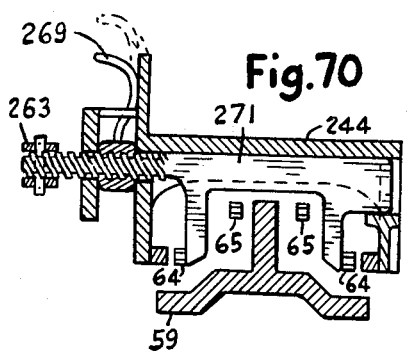
Figure 71:
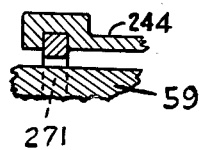
Figure 72A:
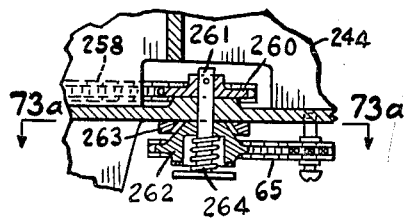
Figure 72B:
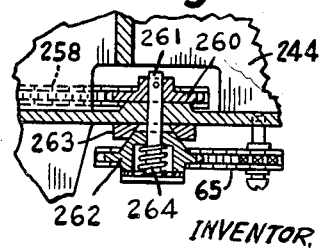
Figure 83:
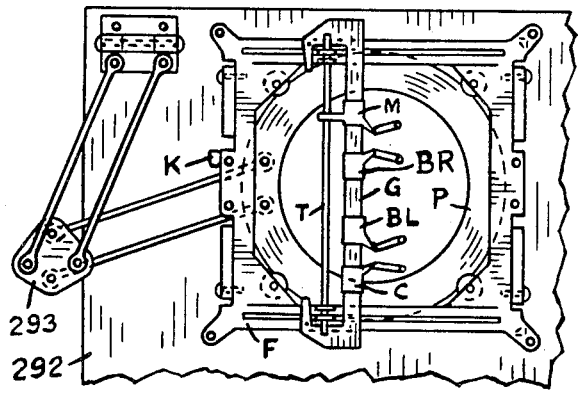
Figure 85:
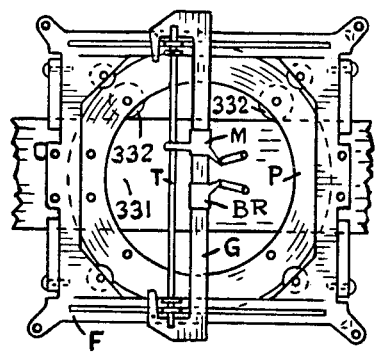
Figure 84:
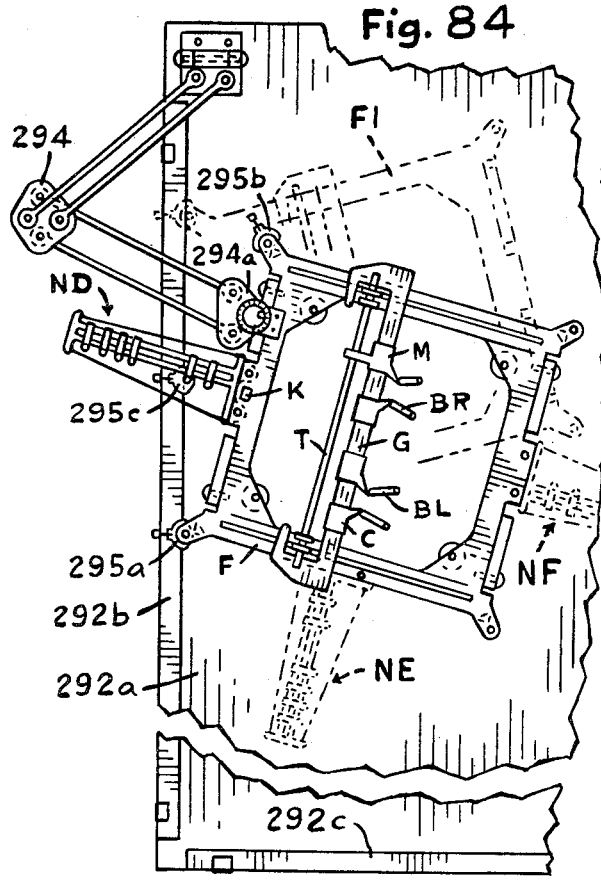
Figure 86:
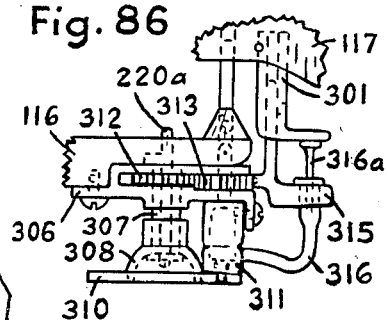
Figure 87:
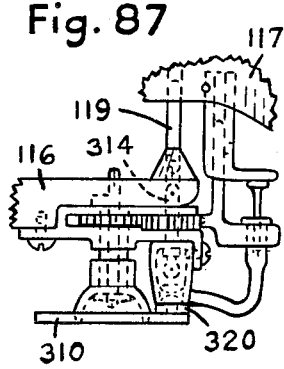
Figure 88:
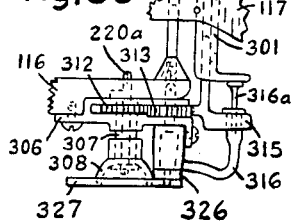
Figure 92:
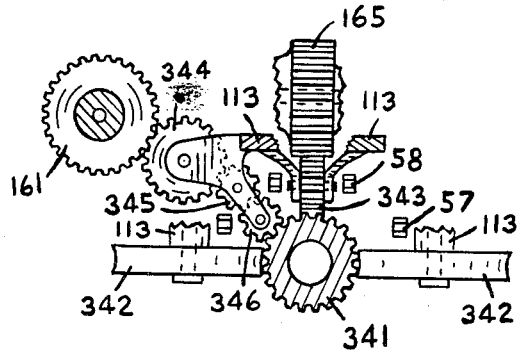
Figure 89:
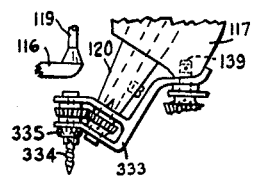
Figure 90:
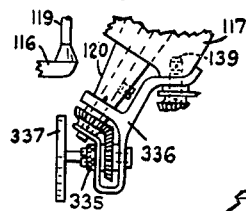
Figure 93:
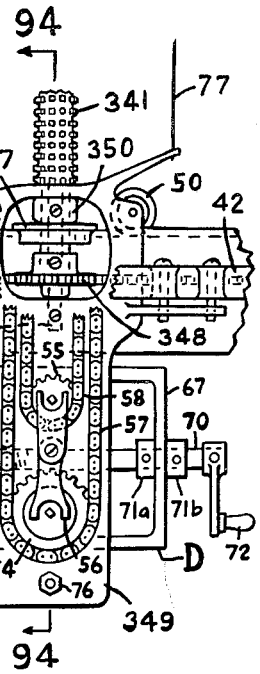
Figure 94:
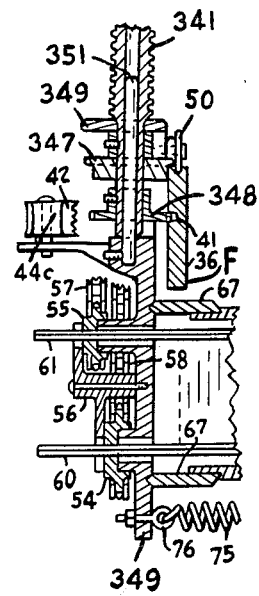
Figure 91:
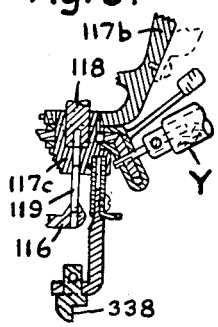

FIGS. 3a, 3b, 3c, and 3d are enlarged plan views of the end portion of the stylus of FIG. 1, showing the stylus disposed at different angles with respect to the direction of movement thereof to obtain different line widths;

FIG. 4 is an enlarged bottom view of the stylus taken along line 4—4 of FIG. 2;

FIG. 5 is an enlarged elevational view taken along line 5—5 of FIG. 1;

FIG. 6 is a sectional view taken along lines 6—6 of FIG. 1;

FIG. 7 is a fragmentary sectional view that is similar to FIG. 2, but showing a liquid fed, pen-type stylus;

FIG. 8 is an elevational view of the liquid fed stylus shown in FIG. 7;

FIG. 9 is a fragmentary view of a pivot arm showing a further modification of a liquid fed stylus and assembly;

FIG. 10 is a plan view showing an automatic graphic machine embodying the principles of my invention;

FIG. 11 is a fragmentary, sectional view taken along line 11—11 of FIG. 10;

FIG. 12 is a fragmentary, sectional view taken along line 12—12 of FIG. 10;

FIG. 13 is an enlarged, fragmentary plan view taken along line 13—13 of FIG. 14;

FIG. 14 is an enlarged, fragmentary end elevation taken along line 14—14 of FIG. 10;

FIG. 15 is a fragmentary, sectional elevation taken along line 15—15 of FIG. 13;

FIG. 16 is a fragmentary, sectional elevation taken along line 16—16 of FIG. 13;

FIG. 17 is a fragmentary view taken along line 17—17 of FIG. 14;

FIG. 18 is an enlarged, fragmentary plan view taken from the left portion of FIG. 10, showing some of the controls including the protractor controls;

FIG. 19 is a sectional view taken along line 19—19 of FIG. 18;

FIG. 20a is a fragmentary, sectional view taken along line 20a—20a of FIG. 18;

FIG. 20b is a fragmentary, sectional view similar to FIG. 20a, but showing parts in a different position;

FIG. 21a is an enlarged plan view of a removable protractor stop;

FIG. 21b is a longitudinal sectional view taken through the stop shown in FIG. 21a;

FIG. 22 is a sectional view taken along line 22—22 of FIG. 21a;

FIG. 23 is an enlarged, fragmentary elevational view taken along line 23—23 of FIG. 10;

FIG. 24 is an enlarged, sectional elevation showing the master carriage M;

FIG. 25 is a sectional view taken along line 25—25 of FIGS. 24 and 37;

FIG. 26 is a fragmentary, sectional view taken along line 26—26 of FIG. 25;

FIG. 27 is a fragmentary, sectional view similar to FIG. 26, but showing the parts in a different position;

FIG. 28 is a fragmentary, sectional view taken along line 28—28 of FIGS. 24, 29, 37, and 39;

FIG. 29 is a sectional view taken along line 29—29 of FIGS. 25, 28, and 33;

FIG. 30 is a fragmentary, sectional view taken along line 30—30 of FIG. 28;

FIG. 31 is a fragmentary, sectional view taken along line 31—31 of FIG. 52;

FIG. 32 is a fragmentary, sectional view taken along line 32—32 of FIG. 29;

FIG. 33 is a fragmentary, sectional view taken along line 33—33 of FIGS. 24 and 37;

FIG. 34 is a sectional view taken along line 34—34 of FIGS. 28 and 33;

FIG. 35 is a plan view of the lever part shown in FIG. 33;

FIG. 36 is a plan view of the scale shut-off part shown in FIG. 33;

FIG. 37 is a sectional view taken along line 37—37 of FIGS. 25, 28, and 33;

FIG. 38 is a sectional view taken along line 38—38 of FIGS. 24 and 37;

FIG. 39 is a sectional view taken along line 39—39 of FIG. 28;

FIG. 40 is a sectional view taken along line 40—40 of FIG. 39;

FIG. 41 is a sectional view taken along line 41—41 of FIG. 37;

FIG. 42 is an enlarged, sectional view taken along line 42—42 of FIG. 44;

FIG. 43 is an enlarged, sectional view taken along line 43—43 of FIGS. 41 and 44;

FIG. 44 is an enlarged, fragmentary view taken along line 44—44 of FIGS. 41 and 43;

FIG. 45 is an enlarged development of the film band which has multiple scale band images;

FIG. 46 is a view of a dotting cam assembly J taken along line 46—46 of FIG. 37;

FIG. 47 is a developed side view showing the profile of the outer ring of the cam shown in FIG. 46;

FIG. 48 is a developed side view showing the profile of the central ring of the cam shown in FIG. 46;

FIG. 49 is a developed side view of the inner ring of the cam shown in FIG. 46;

FIG. 50 is a sectional view taken along line 50—50 of FIG. 37;

FIG. 51 is a sectional view taken along line 51—51 of FIG. 37;

FIG. 52 is a sectional view taken along line 52—52 of FIG. 28;

FIG. 53 is a plan view of a rocker included in FIG. 52;

FIG. 53a is a sectional view taken along line 53a—53a of FIG. 53;

FIG. 53b is a sectional view taken along line 53b—53b of FIG. 53;

FIG. 54a is a fragmentary, sectional view taken along line 54a—54a of FIG. 28;

FIG. 54b is a fragmentary, sectional view similar to FIG. 54a, but showing parts in a different position;

FIG. 55 is a fragmentary, sectional view taken along line 55—55 of FIG. 54b;

FIG. 56 is a sectional view taken along line 56—56 of FIG. 37;

FIG. 57 is a fragmentary, elevational view taken along line 57—57 of FIG. 25;

FIG. 58 shows a modification wherein a modified pivot arm has means for easily and accurately pivoting into a marking position;

FIG. 58a is a fragmentary elevational view taken along line 58a—58a of FIG. 58;

FIG. 59 is a fragmentary, sectional view of arm E showing a liquid stylus assembly;

FIG. 60 is a fragmentary, elevational view showing the automatic intermittent feeding mechanism for a stylus;

FIG. 61a is a sectional view taken along line 61a—61a of FIG. 60 showing the feeding mechanism out of engagement;

FIG. 61b is a sectional view which is the same as FIG. 61a except that the feeding mechanism is shown in engagement;

FIG. 62a is a sectional view taken along line 62a—62a of FIG. 60 showing the feeding parts out of engagement;

FIG. 62b is a sectional view which is the same as FIG. 62a except that it shows the feeding parts in engagement;

FIG. 63a is a fragmentary, sectional view taken along line 63a—63a of FIG. 60, showing pawl 131 out of engagement;

FIG. 63b is a sectional view which is the same as FIG. 63a except that it is showing the pawl in engagement;

FIG. 64 is a fragmentary, sectional view taken along line 64—64 of FIG. 60;

FIG. 65 is an enlarged, elevational view of a secondary carriage C;

FIG. 66a is an enlarged, fragmentary sectional elevational view showing an airbrush marker and a turret on the carriage C;

FIG. 66b is an enlarged, fragmentary, sectional, elevational view showing a light-beam marker and a turret on the carriage C;

FIG. 67 is a sectional view taken along line 67—67 of FIG. 66a;

FIG. 68 is a plan view showing a multi-colored turret with different sized holes for use with a light-beam marker;

FIG. 69 is an enlarged, sectional view taken along line 69—69 of FIG. 65;

FIG. 70 is a sectional view taken along line 70—70 of FIG. 69;

FIG. 71 is a sectional view taken along line 71—71 of FIG. 69;

FIG. 72a is a sectional view taken along line 72a—72a of FIG. 69;

FIG. 72b is a view which is the same as FIG. 72a except that the clutch is shown engaged;

FIG. 73a is a fragmentary view taken along line 73a—73a of FIG. 72a showing the rigging of the pivot chain when the carriage C is mounted as shown in FIG. 11;

FIG. 73b is a fragmentary view similar to FIG. 73a, showing the rigging of the pivot chain when the carriage C is positioned on the same beam as carriage M;

FIG. 74 is an elevational sectional view taken through the pivot arm Ea;

FIG. 75 is a plan view showing a multi-colored turret for a light-beam marker;

FIG. 76 is a fragmentary, elevational view of an automatic feeding mechanism for the carriage C;

FIG. 77 is a fragmentary view taken along line 77—77 of FIG. 76;

FIGS. 78a and 78b are sectional views taken along line 78a—78a of FIG. 76, but showing the parts in the disengaged and engaged positions, respectively;

FIGS. 79a and 79b are sectional views taken along line 79a—79a of FIG. 76, but showing the parts in the disengaged and engaged positions, respectively;

FIGS. 80a and 80b are sectional views taken along line 80a—80a of FIG. 76, showing the parts in the disengaged and engaged positions, respectively;

FIG. 81 is an enlarged elevational view showing a gas fed torch for carriage C;

FIG. 82 is a diagram showing the electrical circuit embodied in the aforesaid described graphic machine;

FIG. 83 is a plan view showing the graphic machine of the present invention as component part of the well-known type of drafting machine;

FIG. 84 is a plan view of the graphic machine of the present invention used and associated with a well-known type of drafting apparatus;

FIG. 85 is a fragmentary plan view showing the graphic machine supported in movable relationship with a long rigid member that is to be marked;

FIGS. 86 to 91 inclusive are enlarged, fragmentary, elevations taken at the lower portion of the pivot arm of carriage M wherein various types of markers and tools are substituted for the tilted rotatable conically ended stylus 14c shown in FIG. 24;

FIG. 86 shows an airbrush marker;

FIG. 87 shows a light-beam marker;

FIG. 88 shows a gas fed torch;

FIG. 89 shows a vertical rotatable drill for marking or fabricating;

FIG. 90 shows a further modification wherein the driven part is turned 90° from the surface W and a marking or cutting wheel is driven thereby;

FIG. 91 shows a tracer-follower which can be used on carriage M or a secondary carriage to follow the contour of a template or the outline of a sketch;

FIG. 92 is a schematic, elevational view showing a modification that has a single beam-shaft member that acts as both a beam and shaft;

FIG. 93 is a fragmentary plan view similar to FIG. 13, showing the arrangement at an end portion of the beam-shaft of the modification shown in FIG. 92;

FIG. 94 is a sectional view taken along line 94—94 of FIG. 93.

FIG. 95 is a fragmentary, sectional elevation showing a multiple pen marking means on a single carriage;

FIG. 96 is a sectional, elevational view taken along line 96—96 of FIG. 95;

FIG. 1 shows a very simple form of graphic machine which illustrates the general principles of a rotatable tilted conical marking stylus or stile embodied in my invention. A drawing board, or a workable surface 1, forms a base. The board 1 should have a hard surface to allow this type of marker to be used most effectively. The spindle 2 is fastened to the board 1 with the screws 2a. An arm 3 is pivotally supported by the spindle 2. The arm 4 is supported on and pivotally connected to the arm 3 by means of pin 5. The pivot arm 6 is pivotally connected to the arm 4 by the shaft 7. The arm 6 is gripped and depressed onto a drawing surface as a pencil is manipulated. The shaft 7 is in slidable engagement with the arm 4. The spring 8 exerts an upward force against the head of the shaft 7. This force lifts the arm 6 when the operator discontinues the downward pressure. A motor 9, which may be reversible, is rigidly fastened to the arm 6. The bevel gear 10 is fastened to the motor drive shaft by a set screw 10a. The bevel gear 11 is fastened to the stylus holder 12 with set screw 13. The bevel gear 11 has a knurled collar 11a, which the operator grips when tightening or loosening the jaws that hold the marker, stile, or stylus 14. The word stylus is used broadly in this specification to indicate any marker that is shaped, positioned and used like the stylus 14, including markers of graphite-lead, crayon, and those coated with ink.

As shown in FIG. 2, the stylus holder 12 is supported by and revolves in the bearing surfaces of the arm 6. The hole 12a in the holder 12 is slightly larger than the stylus 14. A knurled nut 15 is used to squeeze or contract the split or jawed opening in holder 12 so that the stylus 14 is gripped firmly. The gripping hold prevents the stylus 14 from falling out, also it causes the stylus to rotate when the holder 12 rotates. The ram 16 is threaded and its screw threadedly engages the upper end of the holder 12. The knurled knob 17 is keyed to the ram 16 with a set screw. The knob 17 is gripped and turned by the operator to adjust the projection of the stylus 14 from the hole 12a. This adjusting can be done only after the nut 15 has been loosened. The nut 15 is tightened or loosened by gripping and turning the knurled portion while holding the knurled collar 11a.

In the operation of the machine, the drawing paper is fastened to the top of the board 1. In some types of shop layout work, it may be advantageous to keep the graphic machine stationary and have the workable surface move along in contact under it. In this way, the operator could lay out large or small surfaces without moving from a fixed position.

The pivot arm 6 is held by the operator and pressure is applied downwardly so the stylus 14 touches the paper. The machine is then in readiness to draw a line. The motor 9 would be switched on so that the stylus 14 revolves. A jack may be used to switch the motor on and off. Such a jack may be similar to the jack R shown in FIG. 37.

When drawing a straight line, arm 6 is moved laterally while it is being held at a selected pivot angle 18, the angle being relative to the direction of movement of the stylus. The angularity will control the width of the line 19 that is being drawn, that is, as the pivot angle 18 increases, the width of the line 19 increases, but not at the same ratio.

FIGS. 3a, 3b, 3c, and 3d are enlarged plan views showing different widths of line 19, obtained by using different pivot angles 18. FIG. 3a shows the maximum pivot angle 18 which will give a maximum width of line 19, which is equal to the length of the slope of the conical tip of the stylus; that is, that part of the conical end 14a of the stylus 14 which comes in contact with the drawing 1. FIGS. 3b and 3c show intermediate width lines 19 and pivot angles 18. FIG. 3d shows the minimum width of line 19 which is obtained when the pivot angle 18 is zero degrees. The arrows 20 show the direction of movement of the pivot arm 6 and the stylus 14. As indicated by the arrows 20, the marker 14 may be pulled or pushed. The angle 21 shown in FIG. 1 represents the extreme inclination of the conical surface of the stylus 14 from the surface of drawing 1, which, for this example, is about sixty degrees. The pivot arm 6 is built so that the stylus 14 tilts about thirty degrees with respect to the shaft 7. Since the angle 21 is only sixty degrees in the embodiment shown, the cone shape of the stylus 14 has a tendency to iron out any buckle in the drawing when it is being pushed, thus reducing the tendency to snag. The stylus 14 would have little tendency to snag a drawing that is stretched over a hard surfaced drawing board. Therefore, the rotating stylus 14 allows the operator to hold the arm 6 in a given natural drawing position while he pushes and pulls it to draw lines, thus eliminating the waste motion of dead-heading from the right of a sketch to the left, as is done generally with a common drawing pencil to enable the draftsman to pull the pencil to the right without twisting his hand. It is considered poor practice in drafting work to push a common drawing pencil while making long lines since there is considerable risk that the point may snag the drawing paper and rip it.

The graphic machine may be used to draw a line 19 either free-hand or with an edge guide. When the stylus 14 is graphite pencil lead and the like, the line of contact 14b of the conical end 14a constantly wears away while a line is being drawn. The constant rotating of the stylus 14 about its axis while drawing keeps this wearing action uniform, hence the shape of the conical end 14a remains the same, and it is therefore always ready to use, thus the stylus 14 is self-sharpening as compared to common pencils.

When the stylus 14 wears down, nut 15 is loosened and the knob 17 is turned to advance the ram 16, feeding the stylus 14 out of holder 12 until the desired projection is obtained. Then the nut 15 is tightened.

The grinding action of the stylus 14 as it moves against the surface of the drawing paper tends to make a dense, opaque line 19 that is impressed into the paper fibers and that will not readily scale off or rub off with constant handling as pencil lines on non-oily paper usually do when little pressure is applied in making them. There would be much less breakage of a pencil lead type stylus 14 than there would be in comparison to the breakage of common drafting pencil points that have been cut to a long thin needle point in sharpening, because the stylus 14 maintains its full diameter to the short conical tip.

Sharp common drafting pencil points are so thin and fragile that they easily break when a much smaller pressure is applied to them than that which the stylus 14 can safely withstand. A high pressure on the stylus 14 helps to make more opaque lines and impress them deeply into the paper fibers. Since the shape of a pencil lead stylus 14 is inherently strong and it can be used to draw a fine line, a softer grade of stylus pencil lead can be used to make narrow dense opaque lines with much slower wearing down of the lead in comparison with the wearing down of conventional soft pencil leads, as the line of contact 14b is a long bearing and wearing surface that deposits a given amount of graphite to form a line, whereas a common drafting pencil must deposit the same amount of graphite from a smaller area. One grade of hardness of a stylus 14 can be used to make all weights or widths of lines on a drawing, whereas a variety of grades of common pencils are commonly used to make lines of different weight that differ in density. The lines that differ in density reproduce variably on blue prints, but they reproduce alike on extremely contrasting reproduction paper, therefore they are a poor marking means.

The stylus 14 works best in drafting work with a hard board and a thin drawing paper. Embossing is eliminated since the stylus 14 cannot press down the paper into the hard underlying board. Thus the line of contact 14b is kept narrow which allows the making of sharp thin lines that have little fringe.

Unlike the stylus 14, the needle-like common pencil points that are in general use today are dangerous to handle. Most draftsmen accidentally run these points into their hands occasionally.

The width of a thin line drawn with the stylus 14 can be varied by varying the speed of the motor, by varying the speed of drawing and by varying the pressure, since these actions vary the wearing action that temporarily cause a slight flattening or broadening of the line of contact 14b.

The motor 9 is preferably reversible so as to allow more accurate and consistant work when such work is required, such as when wide lines are being made when using a large pivot angle 18. Since the amount of friction between the stylus 14 and the paper surface determines the amount of wear or residue that marks the paper, the opaqueness or density of the line is increased as the residue or friction is increased. When a wide line 19 is drawn, the stylus 14 may be rotated so as to roll in the same direction as the line 19 is being drawn or it may be rotated in the opposite direction. This opposite movement causes considerably more friction with the paper and produces a denser line.

A hard stylus made with the conical surface impregnated with diamond dust, could make it suitable for marking the surface of hard surfaces. Such a hard stylus wears down or grinds the workable surface in marking it.

A stylus similar to stylus 14, with the conical surface cut to form fine burrs similar to dentist's burrs, could be used to mark paper templates by scoring and cutting them. This type of stylus would eliminate an operation since it could cut without marking beforehand.

A liquid fed stylus 25 is shown in FIGS. 7 and 8. There is a gasket 22 on ram 16, a gasket 23 in stylus holder 12, and a machine screw 24 in the holder 12. The gaskets prevent the ink or liquid 26 from leaking out. The stylus 25 is made of porous material through which ink may flow. When the stylus 25 is inserted in the hole 12a, the nut 15 is first removed. This allows space to turn the screw 24 so that it projects into the hole 12a and the notch 25d in the stylus 25. The screw 24 prevents stylus 25 from falling out of or turning in hole 12a. The screw 24 is not tightened against stylus 25 since the stylus must be free to slide in the hole 12a until the end of the notch 25d touches the screw 24. After the screw 24 is adjusted, the nut 15 is replaced and turned only enough to bring the pronged end of the holder 12 in slight contact with the stylus 25. The stylus 25 operates to an extent in the same way as the stylus 14. The shape of the conical end 25a is the same as that of the conical end 14a. The line of contact 25b is similar to the line of contact 14b.

The liquid stylus 25 is useful for drawing fine lines, such as in drafting and layout work to be fabricated. The stylus is made of hard porous substance; for example, porous metal such as "Oilite." There is a hole 25c in the stylus 25. The hole 25c speeds up the flow of the liquid 26 through the stylus. The cylindrical outside surface of the stylus 25 and the surface of the notch 25d are impregnated with a non-porous, liquid-proof substance to prevent leakage of the liquid 26 through these surfaces.

In using the graphic machine with the stylus 25 instead of the stylus 14, the principles of operation are generally the same, except that the stylus 25 does not wear away.

To fill the reservoir between the top of the stylus 25 and the bottom of the ram 16, the collar 11a is held and knob 17 is turned until ram 16 touches the top of the stylus 25. The stylus 25 is now lowered into the liquid to be used until the conical end 25a is submerged. Collar 11a is then held and the knob 17 is turned, which raises the ram 16, leaving a cavity which is almost a vacuum. The liquid 26 will be drawn through the porous surface of the conical end 25a to fill this cavity, which is the reservoir. When the reservoir is filled, pivot arm 6 is lifted so that the stylus 25 is above the liquid container. The collar 11a is now held and the knob 17 is turned until the stylus 25 is forced down by hydraulic pressure until machine screw 24 prevents further downward movement of the stylus 25.

The operation of the stylus 25 is similar to that of the stylus 14. The manual pressure exerted on pivot arm 6 forces it down, thus pressuring the stylus 25 upwardly against the fluid 26, creating a hydraulic pressure in the liquid 26. This pressure forces the liquid through the porous bottom of the stylus 25. The porous surface of the conical tip 25a is slowly permeated by the liquid 26. As the stylus 25 revolves, the liquid on the outside of the conical end 25a is wiped off onto the drawing or workable surface that it is contacting. The hydraulic pressure from within the stylus 25 tends to keep the pores open in conical end 25a, thus preventing dirt, lint, and dried ink from clogging the surface. The greater the manual pressure on the pivot arm 6, the greater the flow of liquid. When a given quantity of liquid has been used up, the stylus holder has slid down on shaft 7 and the stylus 25 has slid upwardly until the end of the notch 25d touches a machine screw 24 to limit the movement of the stylus. The machine must now be stopped and the ram 16 is again operated so as to push the stylus 25 to its extreme lower position. Now the machine may be restarted. When the pivot arm 6 is raised, the liquid pressure drops and the flow is stopped.

When drawing other than the narrowest lines, it is desirable to control the motor so that the stylus 25 does not roll in the direction in which the line 19 is being drawn. This reverse rotation of the stylus 25 makes the ink wipe off the stylus 25 onto the drawing forming a line 19 after the line of contact 25b has passed.

The modification shown in FIG. 9 is used for drawing with liquids. It has a stylus 29 which is similar to the stylus shown in FIG. 2. There is a reservoir 27 for ink or other liquids 35 that can be used in graphic work. A fibrous wick 28 may be used to carry the ink to the surface of the conical end 29a. A tube 28a may be used to shield the liquid flow from the atmosphere. The wick 28 may be encased in the tube 28a or the tube may be used alone to carry the fluid. The tube 28a may be made of transparent plastic so the color of the marking ink can be seen. The reservoir 27 is supported and connected to pivot arm 6 by the machine screw 30. The reservoir 27 has an outlet hole 31. The support 32 holds the lower end of the tube 28a and the wick 28 in position. The support 32 is fastened to the reservoir 27 with a machine screw 33. A slight gap is maintained between the conical surface and a portion of the tube 28a, so as to allow the ink to reach the surface and not be scraped off later by the tube 28a. A machine screw 34 with a gasket can be removed to allow the reservoir 27 to be filled with a medicine dropper. The threaded plug and gasket 27a are removed for access to clean reservoir 27.

In operation, the ink or liquid 35 may be carried by capillary attraction through the wick 28 to the surface of the conical end 29a, or it may flow through the tube 28a without a wick. The wick feed would work if the machine is used when it is inverted. The stylus 29 revolves and the liquid 35 is wiped off the stylus at the line of contact 29b onto the drawing or workable surface to form a line such as line 19. A stylus 29 may be made of hard material such as stainless steel. The end of the cone of stylus 29 is cut off and there is a hole in the center of the tip. The hole eliminates a center surface on which excess liquid would tend to accumulate. This blunt shaped stylus allows the ink to completely coat the conical surface without the wick 28 or the tube 28a touching the drawing surface. The ink may be similar to the type used in ballpoint pens which is quick drying. It allows the making of lines that look like pencil lines and it is easily erased. This type of ink may also be used with the stylus 25.

A modification of the parts shown in FIG. 9 may be made by using the reservoir and flow line to carry water as a solvent to the conical surface of a water-soluble, indelible pencil lead stylus that is shaped like the stylus 29. The solvent softens the conical surface so the conical surface portion of the stylus rubs and wears off when it contacts and rotates against the drawing surface.

*Complete automatic graphic machine*

This sub-title refers to a flexible graphic machine as shown in FIG. 10, that illustrates principles embodied in my invention, the machine being useful for engineering drawing work and the like. The machine includes the means to allow the operator to completely mechanize his drawing work to obtain a much greater drawing speed and to obtain greater accuracy with less effort. A machine is described that is most useful for versatile production draftsmen whose work covers wide fields, the machine design being primarily based on the need for better equipment for these workers. The machine design is also based on needs for the unskilled and physically handicapped who are suitable mentally to be employed as engineer-draftsmen, template makers, and the like, but who need graphic machines to compensate for their handicaps. Wars, auto and industrial accidents create large numbers of physically handicapped who could operate such machines on an equal basis with the non-handicapped. Without such machines many of such handicapped persons would be unemployable or be employed at lesser jobs.

The machine as designed can be operated to a large extent with one hand. The machine has means that eliminate the need for the operator to lean far over the drawing to scan over a straight edge, since a large drawing area adjacent to the marking action is clearly visible from in front of the machine. This visibility of the working area, along with a means to orient the marker from a distance, allows the operator to sit back and manipulate the machine with less fatigue. An illuminating light adjacent to the marking action eliminates shadows at the marking vicinity which eliminates much eye-strain. The physically handicapped, including frail operators, may use power means to move the marking means, also to carry the operator's hand.

This invention is primarily based on the need for better equipment in the field of fabricated metal work, including ship building, aviation, and structural steel work; also for general engineering drawing work in the field of building construction. Experience and study in the fields of engineering drafting, template making, and shop layout work on metal to be fabricated, indicated that these related fields had the same problem, which was the need of a means to increase speed and accuracy in their types of graphic work.

An analysis of structural drafting work and the like indicated that even the highly experienced engineering draftsmen spent most of their time in doing manual drawing work, since they could work out the answers to most of the problems confronting them without interrupting their drawing actions. Their drawing output was limited because the scaling and drawing means available required much tedious time consuming effort to make accurate and legible drawings. Studies showed that many of the fastest design and detail draftsmen made the fewest mistakes, but their drawings were not highly legible since the sketches were not drawn closely to scale and the lines were indefinite because they were too thick or thin and too similar in appearance due to their being the same thickness, and being non-opaque, they reproduced poorly. Results indicated that when an engineering-draftsman sketches an idea very quickly, he is more likely to get all the known facts on paper while they are fresh in his mind. Studies indicated that when the drafting work on a project was done swiftly the engineering draftsman was more likely to maintain his enthusiasm for the project, whereas when the drafting project dragged over a long period, the draftsman lost interest and exerted less effort, thereby increasing the drawing costs. Furthermore, it was found that in these fields the typical sketches were largely but not entirely symmetrical and/or repetitous to a large degree of other sketches on the same drawing.

Thus a graphic machine was developed in accordance with the principles of the present invention that would allow the quick thinking production worker to draw accurately, principally with simple free-hand-like movements as fast as he could move his hand, and in his drawing work he would simultaneously draw and scale. Also, when desirable, he could draw two or more lines simultaneously. The multiple drawing means being selective to allow the drawing of identical sketch portions or a pair of sketch portions that are opposites.

Much of the present day machine design and machine detail drafting consists of sketching to show modifications of existing machines. The time spent on the brainwork is minor. Much of this type of the engineering drawing work is little more than copy work. Such work can be done more rapidly and accurately with a graphic machine as shown embodied in this invention.

The scope of work handled by many draftsmen and the like is limited to small simple sketches or layouts. The drawing of such sketches would obviously not require the use of all the features of the machine shown, but such sketches could be drawn quickly and accurately with innumerable less costly sub-combinations of the machine. Operators who work in limited fields would obviously require machines that only consist of sub-combinations that would be useful in their field. Frail operators would generally prefer powered machines, whereas many strong operators would prefer low cost, non-powered machines. Operators drawing with machines equipped with pencil stylus markers may prefer a machine with powered movement, whereas they may prefer a non-powered machine for ink work because more energy must be used to cause a pencil to bear and grind against a drawing surface. The design for the equipment described in this specification is predicated on the assumption that the use of many of the features of the machine would only be accepted gradually during a long transition period, since management in the field of engineering and drafting resist changes in their field as do other workers. Pencil markers are described in general as the marking means since pencil drawings are at present the type of drawings specified for the bulk of industrial projects. Liquid type markers shown are particularly useful for sketching on durable surfaces like thin plastic sheets of polyester drafting film or glass drawing boards. Such glass drawing surfaces may be sprayed with transparent plastic sizing that can be marked with common graphite pencil leads and with ink. The general use of plastic and glass drawing surfaces would most likely be made in the future after tradition has been broken and mechanization has been accepted in the field of engineering drawing work and the like. The traditional practice of drawing with a common pencil on thin delicate paper and delicate cloth is responsible for the wastage of most of the man hours spent in many drafting rooms, because the men draw slowly to avoid making false drawing actions that could take considerable time to correct. At present, most draftsmen working on delicate common drafting paper and cloth spend much of their time studying their drawing problems so as to try to predetermine what the final sketching will look like. This time consuming study is considered to be insurance against drawing an unsuitable sketch that would later have to be erased. Much of the study time is wasted that is spent on trying to fully visualize a final sketch, since some problems only become apparent as sketching progresses.

The erasing of large areas of pencil lines on drawing paper causes much time loss in addition to deteriorating the fibers of the drawing surface. Common drawing paper and cloth can withstand only a few erasures. These types of sheets are at times snagged and ruined by a poor stroke with a pencil. Engineering drawing work could be done much faster with the graphic machine when ink or pencil markers are used on non-porous drawing surfaces, such as plastic sheets or glass. Major erasures could be made very rapidly with solvents and absorbent wiping means without causing any deterioration of the drawing surface, thus allowing draftsmen to draw rapidly without restraint, knowing that errors or revisions could be erased very quickly without damaging the drawing surface. Such unrestrained drawing actions with little risk would reduce the tension under which the draftsman works. The use of the automatic graphic machine would further reduce the tension by eliminating the concern as to guiding the marker accurately and making the lines suitable in width and density. The elimination of the restraining factors would allow the draftsman using the graphic machine to work freely with greater spontaneity. The lack of risk would tend to give the draftsman more confidence which would tend to increase his drawing speed to obtain a far greater output.

There are light-beam type markers shown for use in copying a preliminary pencil drawing to obtain a sharp and contrasting reproduction on a photographic sensitized surface, the reproduction being used to make lithographs that are equal to those made from inked drawings. Such ink-like drawing means can be used to make low cost patent drawings and the like.

The machine shown in FIG. 10 consists of a supporting frame F which has two parallel rail portions that form a track. The track has racks 41 as parts of the rails. The frame F supports an axle or movable shaft T. This shaft is square and its has gears keyed to its ends. There also are wheels near the ends of the shaft T. The gears and wheels engage the rail portions of the frame F, thus maintaining perfect alignment for the shaft T. The frame F and the shaft T engage and support a movable beam G. The beam G and the track of frame F act as straight edge guides. The beam G supports a master carriage M and a secondary carriage BR. The carriages support markers. The carriages are selectively coupled to endless chains. The edges of the beam B form track rails for the carriages. The carriage M is geared to the shaft T and to a rack on the top of the beam G. The carriage M includes the main controls for operating the whole graphic machine.

A secondary beam H is located on the underside of the frame F and the board W in exact alignment with the beam G. The beam H is supported by the beam G, since they are connected with adjustable diaphragms D. The beam H supports the secondary carriages C and BL. The carriage C and the carriage BR are alike, except that they are rigged differently when they are mounted on different beams. The carriage BL is a left of carriage BR. The markers on the carriages BL and C draw on a second drawing surface, such as a drawing that is fastened to the far or underside of the rectangular board or workable surface W. The frame F supports an electrical control board K near the protractor locking mechanism L. This arrangement allows the operator to work the controls on the master carriage M with his right hand while his left hand controls the control board K and the protactor locking mechanism L. The control board K may be switched to a position on the carriage M to allow a handicapped person who has only one good hand to operate all the hand controls readily with his able hand. Such a handicapped operator could operate the locking mechanism L with a foot pedal or a solenoid.

The operator controls, through manipulations of a main control and secondary controls on the carriage M, the movement of all the carriages along the beams G and H to make sketch lines parallel to the beams, the shaft T and the beams being automatically locked into a fixed position while these lines are being made. Lines at right angles or perpendicular to the beams are made by differently manipulating the controls on carriage M to lock or restrain the carriages from moving along the beams and not locking the beams and the shaft T. The beams and the shaft T are thus free to move under control, along the track of frame F carrying the carriages. This selective locking of the beams and carriages prevents the markers on the carriages from deviating from selective straight paths that are parallel or at right angles to the beams.

All the carriages are selectively mechanically coupled to cause them to operate in response to selective controls on the carriage M. The operator makes a selective single lateral pivoted movement of the main control on the carriage M to simultaneously select the locking set-up for the beam G or the carriage M, the width of line to be drawn and the direction of travel to be made along the path of the drawing action when powered movement is used. Then the operator depresses this control to engage these portions of the mechanism. The depressing action also causes a recording scale to engage. The recording scale is an odometer similar to a speedometer to register or indicate the distance travelled by a carriage. After moving the carriage M by powered or by manual effort to draw a line, the operator raises the main control to disengage all the mechanisms. Lines that are to be made that are diagonal to those already drawn are made by revolving the protractor ring P to the required angle, locking the ring P with the locking mechanism L and then drawing lines parallel or perpendicular to beam G.

The main control on master carriage M is a simple control that is gripped as a pencil is naturally gripped. The secondary controls are within fingertip reach and simple to operate. The carriage M includes synchronized mechanism which includes a marker and a means for using it to draw various width lines. In addition it includes the automatic recording scale means. Furthermore, it includes a means for automatically locking either the carriage M to the beam G to prevent movement of carriage M along the beam when drawing a line along a path parallel to the rails 41, or the locking of the shaft T to restrain it from rotating, thus preventing any movement of the shaft T and the beam G, but allowing the carriage M to move along the beam G when a line is being drawn along a path parallel to the beam.

The carriage M also includes a means to control and operate the secondary carriages BR, BL, and C by selectively engaging the two chains on the beam G, the carriage BR also being engagable to these chains. The beam H has chains similar to those on the beam G, but it does not have a rack. The chains on beams H and G are supported on sprockets at the ends of the beams. The sprockets on beam G transmit their movements to the similarly located sprockets on the beam H. The sprockets are in alignment and in keyed engagement to common vertical square shafts. Thus, any movement of the master carriage M can be transmitted to any or all of the secondary carriages. There are chain clutches on all of the carriages which allow the carriages to be disengaged from the chains; then be moved along their beam in a few seconds to any desired location along the beams, and be reengaged to the chains. The carriage M and the secondary carriages can be controlled so as to allow the operator to simultaneously draw duplicate sketch portions or pairs of sketch portions and the like, that is, right-hand and left-hand view portions. The carriage M has means to allow the operator to make dotted lines mechanically. The carriage M has means to allow the operator to move it manually or move it with powered means. The carriage may be propelled by the simultaneous application of manual effort and motor power, the motor power being a helper, allowing the manual effort to more easily control the movement. There is means to automatically control the direction of movement when the powered movement means is used. Other features of the carriage M mechanism aid in making curved and irregular lines.

In FIG. 10 the carriages are shown symmetrically spaced about the center of the board W. They can be quickly uncoupled from the chains and be shifted to any desirable position along the beams G and H.

FIG. 11 shows the markers for the four carriages positioned to allow the operator to simultaneously draw four lines when he is sketching portions of the pair of structural steel column detail sketches 112a and 112b. When only one marker is being used to draw, other markers are made inoperative with the controls on the board K. The secondary carriages may be unclutched from the chains and be pushed toward the ends of the beams when not required for a long period.

The frame F has a rectangular framework 36 which has an octagonal opening in it. The framework 36 is supported by four supports 37. The supports 37 may be adjustable in length. The supports 37 are used as legs, hangers, or brackets, depending on the position of the machine, that is, depending upon whether the machine is set horizontally, vertically, or in a tilted position. The horizontal positioning may be as shown in FIG. 10 or it may be reversed to an upside-down position with the carriage M being below the drawing.

The supports 37 are fastened to framework 36 with wing head bolts 38 which are threaded into tapped holes in the lugs 36b of framework 36. When the supports 37 are not being used, they may be folded to the positions shown by the phanton dot-dash outlines 37a.

The frame F has four grooved wheels 39 which revolve on shafts 40. The wheels 39 support a protractor ring P so that it can be rotated 360°. A protractor locking mechanism L is supported by the frame F. The ring P supports the board or workable surface W with bolts at the corners of the board. The board W supports the drawing which is fastened with drafting tape or other suitable means. Board W may be opaque or it may be made of a transparent or translucent material, such as glass or plastic. An illuminating light can be placed behind such a translucent board, thus obtaining shadowless illumination of a drawing. The machine may be used extensively when it does not have a board W attached to it; this use will be described further on.

When subcombinations are used such as those without the beam H and its supplementary parts, the supports 37 may be removed and be relocated by fastening them with bolts 38 to the tapped holes in lugs 83a on the inside of the protractor P. The second position of each support 37 is marked 37b and the second position of each bolt 38 is marked 38b. The positions 37b and 38b are shown in phantom dot-dash outlines. When the supports 37 are fastened in the positions 37b, the frame F can be rotated around the protractor P, thus keeping the drawing stationary. With such an arrangement, images can be projected onto the board from above or below the board, so that images may be viewed for tracing and the like. Another arrangement of subcombinations that does not include the beam H and its supplementary parts allows the machine to be supported by a table, with the supports 37 retracted to positions 37a, the board W or the four corner props 36h engaging the table.

FIG. 23 shows details of a corner prop 36h. The props 36h are removable so that one or more of them can be removed when the machine is used as shown in FIG. 83, as a prop or two would interfere with the common drafting machine arm 293. The props 36h are tightly fitted into square holes in the corners of the framework 36, thus they are keyed so they cannot turn. There is a machine screw in the bottom of each prop 36h which allows the prop to be adjusted in height. This adjusting means allows the props to be shortened so the board W can rest on a table and support the machine allowing the frame F to be rotated freely. The props 36h, being in close proximity to the table top, engage the table top to restrain the machine from tilting when the operator's arm touches a side of the frame F. When the operator prefers to rotate the board W and the protractor P, he can adjust the machine screws in the bottoms of the props 36h so as to lengthen the props so they raise the board W above the table and thus support the machine. The props 36h would support the machine on a table top when the board W is omitted, also when the protractor P is omitted.

The track rail edges 36a are the two grooved inside edges of the frame 36. A groove in the upper surface of each rail portion of the frame 36 has a rack 41 fastened therein. Each of the edges 36a has a groove 36c as shown in FIG. 15 and FIG. 16.

Each flexible guard 42 covers the full length of a rack 41, except near that portion of the rack 41 which is being engaged by the adjacent spur gear on the shaft T. The guards 42 are fastened to frame F with screws 43. Each guard 42 passes over a spur gear on the shaft T. Each guard is guided by the pulleys 44a, 44b, 44c, and 44d, as shown in FIGS. 13, 14, 15, and 16. The pulleys are supported on the beam G. The guards 42 prevent dirt, tools, or other materials from fouling the teeth of the racks 41. They also prevent oil and dirt from the racks 41 from contacting and soiling the clothes or hands of the operator. Furthermore, the guards 42 prevent the operator from scratching his hands on the sharp rack teeth.

The axle or shaft T consists of a square shaft 45, which has its end portions turned to rounded shapes. The turned ends of the shaft 45 are fitted with collars 46 which are fastened to the shaft 45 with a set screw. The flanged wheels 47 are fitted onto the shaft 45. The spur gears 48 are keyed to the shaft 45 with set screws. The pitch diameter of the gears 48 is equal to the diameter of the wheels 47. The ends of hte shaft 45 revolve in the bearings 49. The bearings 49 are connected to the beam G with machine screws. The wheels 47 ride along the track edges 36a. As shown in FIGS. 13, 15, and 16, the wheels 50 and 51 are mounted on the beam body 53. The flanges of the wheels ride in the grooves 36c and restrain the beam G from leaving its position in relation to the track. The bottom of the beam body 53 has attached to it the plain wheels 52 which ride on the same track surfaces as do the wheels 47.

The main portion of the beam body 53 of the beam G is shaped similar to an inverted letter T, and the body 53 has an irregular flat offset on each end for connecting to the adjoining parts of the machine. The stem of the beam 53 has rack teeth 53a. The beam 53 supports sprockets 54 and 55 near its ends. These sprockets revolve on bosses or offsets of the beam 53. A stay 56 keeps the sprockets in position. Movement chain 57 engages the sprockets 54, and transmits the movement of the carriage M to the carriage BR and to the sprockets 54. The sprockets are coupled to other parts of the machine which causes movement of carriages BL and C. An endless pivoting chain 58 engages the sprockets 55. The chain 58 transmits the pivotal movement of the pivot arm on the carriage M. The pivoting controls the width of lines being made by all the markers on all the carriages. The slackness in chains can be taken up by removing links of the chain or by attaching conventional chain take-ups.

The beam body 59 of the beam H is shaped similar to the beam 53, except that it does not have rack teeth and end offsets. The beam 59 supports the shafts 60 and 61. The shaft 60 has a sprocket 62 keyed to it with a set screw. The shaft 61 has a sprocket 63 keyed to it with a set screw. A movement chain 64 engages the sprockets 62. The chain 64 transmits movement to the carriages C and BL, the movement originating at the carriage M. A pivoting chain 65 engages the sprockets 63. The chain 65 transmits the pivotal movement to the carriages C and BL.

The sprockets 54 and 55 have square holes to make sliding fits with the squared portions of the shafts 60 and 61. Thus, shafts and sprockets remain coupled when the beams G and H are spread apart by the diaphragms D. This arrangement allows the shafts to be removed without disturbing the sprockets 54 and 55 when the operator prefers to remove the beam H when he has considerable sketching to do during a long period that does not require the use of the carriages on the beam H. The diaphragms D which connect the beams G and H are supported by the beam G and are fastened thereto by cap screws 66. The diaphragms D are adjustable wedge devices which operate to adjust the elevation of the beam H to thus compensate for different thicknesses of the boards W or objects to be laid out for fabrication. Since the board W may consist of various combinations of different thicknesses, such a board with a thin paper drawing adjacent to the beam H or a heavy cardboard for a template or drawing instead of a thin paper. A sheet of glass or transparent plastic may be used rather than drawing paper.

Since glass has a low coefficient of expansion which allows sketches on a glass surface to remain undistorted, glass may be used for drawing very accurate sketches. Two sheets of glass may be placed together to allow the two exposed surfaces to be used as drawing surfaces to sketch portions of the sketch on one surface and the other portions on the other surface, the carriages M and BR marking one surface and the carriages C and BL marking the other surface. When such sketching is completed, the two sheets of glass may be removed from the machine and be placed together in alignment so as to have the sketched surfaces in engagement so they can be photographed accurately. There is much engineering drawing work that can be made better on the exposed surfaces of two sheets of transparent glass or the like that are placed together. Such glass sheets could be marked with liquid type stylii such as that shown in FIG. 9, or with air brush type markers. The ink would have adhesive characteristics to cause it to stick to the glass. One of the big fields for using the system with two drawing surfaces would be in making shop detail drawings, as it would allow the draftsmen to draw detail sketches for a fabricating shop on one surface which would include the bare essential data needed for the shop, while the second surface is marked with reference figures, notes, and other pertinent data that is not wanted by the shop but is highly useful in the engineering department in order to speedily check the work and to allow others to readily grasp the facts about the details so they can coordinate adjoining portions of the subject being drawn. A translucent photocopy would be made of the single glass sheet which has the sketch work on it for use in making shop prints. The two sheets of glass would be photographed while they are together to make a translucent photo-copy for the engineering department. The sketch for the shop could be made with black lines on the one surface, the reference sketch work for the checker would be made with red lines on the second surface. A multi-colored print for the checker would allow him to see and check the information correctly.

The board W may be a thick piece of material such as a metal plate that is to be marked on both sides simultaneously to indicate positions for connections that are to be welded to it. The board W may be made up of two plates that are to be fabricated. They would be fastened together so the exposed surfaces could be laid out simultaneously, either marking the pieces in an opposite manner to form right and left hand pieces, or by selective switching of the carriage movements, identical layouts could be made. This arrangement is particularly useful in laying out raised patterned floor plate and the like, which can only be marked on their smooth side which is the opposite surface to that shown on the detail drawings.

A diaphragm D consists of a U-shaped piece 67 which has sides that are tapered to form wedge-like shapes. The top edges of piece 67 bear against the beam 53. These edges are tapered to a V-shape to engage and slide in a V-shaped groove in the beam 53. The diagonal bearing edges of the piece 67 are tapered to engage and slide in the grooves in the triangular pieces 68a and 68b. Pieces 68a and 68b are welded or otherwise fastened to the beam 59.

The support piece 69 is fastened to the beam 53 with cap screws 66. The support 69 has grooves 69a and 69b which engage the beveled edges of pieces 68a and 68b. The pieces 68a and 68b bear and slide in these grooves.

A shaft 70 engages a plain hole in the piece 67 and the tapped hole in the support 69. The collars 71a and 71b are connected to the shaft 70 with pins. A handle 72 is connected to the shaft 70 with a pin. A sprocket 73 is fastened to the end of the shaft 70 with a pin. An endless chain 74 engages the sprocket 73 on each diaphragm D. The rotation of one sprocket 73 is transmitted by the chain 74 to the sprocket 73 on the other diaphragm D. A tension spring 75 is fastened to the beam 59 and it is hooked onto the eyebolt 76.

Diaphragms D are controlled to suit the thickness of the board W by rotating the handle 72 of either diaphragm D. The shaft 70, being revolved by the handle 72, moves back or forth due to the screw action of the threaded part of the shaft 70 in the tapped hole in piece 69. This action causes the piece 67 to move laterally. This movement of piece 67 causes the pieces 68a and 68b and thus the beam 53 to slide down or slide up against the force of the spring 75. The alignment of the beams G to H is maintained without play. When the operator is to do considerable sketching on the top drawing surface only, he may quickly remove, as a unit, the beam H and its supplementary parts. The unit can be removed by disengaging the screws 66 from the supports 69, unhooking the springs 75 from eyebolts 76, and by unplugging the electric cable 105.

*Aligning strand for orienting marker path with working points*

As shown in FIGS. 10 and 11, two small arms 53b and 53c are supported from the underside of the beam 53. They are curved to clear the wheels of the carriages M and BR. The ends of the aligner strand 77 are attached to the arms 53b and 53c. The strand 77 acts as a guide in lining up two points which are to be connected with a drawn line. The strand 77 is a little to the left of the markers on the carriages M and BR so as to clear them. The strand 77 may be made of wire, or if preferred, an elastic strand of rubber may be used. A small pointer 78 may be fastened to a wire type of strand 77, to indicate the center line of the protractor P. The arms 53b and 53c are adjustable so they can be adjusted to pull the pointer 78 into a perfect centering position. The arm 53c is resilient so it keeps the strand 77 taut, the arm will yield when the strand 77 comes in contact with curve templates and the like. The strand 77 may be removed when the type of work being sketched does not require its use.

*Use as a beam compass*

The beams G and H may be used like a beam in a beam compass to draw circles and arcs. In this operation, the beam G is locked to the frame 36 with the retractable pins 79. With this positioning, the tip of the pointer 78 indicates the center of the protractor ring P. The paper drawing or workable surface is positioned so the radial point on the drawing surface is directly at the pointer 78. The paper is fastened to the board W and the radius of the arc or circle to be drawn is measured with carriage M from the pointer 78. The carriage M is then locked to the rack 53a on the beam 53 with a screw arrangement as shown in FIG. 30, by which the screw 80 is turned by gripping and turning the knurled knob 81. The knob is fastened to the screw 80 by a set screw. The resilient shoe 82 on the screw 80 is forced against the rack 53a. This binding contact then restrains the carriage M from moving along the beam 53. The carriages BR, C, and BL can be set to draw different radii. The protractor P is unlocked at the lock L so that it can be pushed and rotated into a complete circle with the markers marking the drawings to form the circles. This beam compass feature is useful when there is one radial point from which many large circles are centered and can be drawn simultaneously with the multiple marking means. The drawing must be moved to line-up different radial points to pointer 78. When a subcombination is being used such as that shown in FIG. 83, the machine can be slid so it can be centered on the drawing surface at any radial point. This arrangement would be much more practical than a conventional beam compass for drawing large circles since it does not have the faults of large compasses. The weaknesses of conventional beam compasses are: the frequent necessity of sharpening the lead, the danger of cutting through or snagging the drawing if the lead is sharp, the lack of means to speedily draw uniform dotted lines, and the lack of means to simultaneously draw multiple circles accurately about a common radial point.

*Protractor ring "P"*

The protractor ring assembly P has a ring 83 supported by the wheels 39. FIG. 18 shows details of the protractor lock L, the control board K, a fragment of the frame F, and a fragment of the protractor P. The outside diameter of the ring 83 has a tongue shape to fit the groove in wheels 39 and the groove in the brake block 84. The ring 83 has protractor markings, two quadrants having degree markings 83b and the other two quadrants having inch bevel markings 83c. The inch markings 83c correspond to the dimensions of the short side of a right angle triangle which has a base of twelve inches. The indicator arrows 85a, 85b, and 85c on the frame 36 mark the axii of the protractor P. The indicator arm 36d at the lock L is the fourth indicator. The top of the ring 83 has a continuous circular groove 83d. There are threads 83f in the groove. One or more threaded index stops N are inserted in the groove 83d. Two recesses 83g run through the threaded area 83f. They allow the groove to be cleaned.

FIGS. 21a, 21b, and 22 show details of a stop N. A stop N consists of a threaded stud 86, a resilient disk 86a, and a machine screw 86b. The disk 86a bears tightly against the sides of groove 83d to prevent the stop N from creeping from vibration. The disk 86a also acts as a lock washer. The stud 86 may be made of metal, such as magnetic metal ("Alnico") having an aluminum-nickel-cobalt composition. The stud is threaded so as to maintain a loose enough fit to allow it to enter the groove 83d. The stud 86 has a hexagonal shoulder at one end which engages a hexagonal hole in the disk 86a. This hexagonal shape prevents the stud 86 from turning in the disk 86a. The disk 86a is made of a resilient substance, such as rubber, and it is slightly larger in diameter than is the stud 86. The stud 86 has a hole through the center which is tapped to suit the machine screw 86b. An end of the stud 86 and the head of screw 86b are counterbored to fit the pins 87a on the stop tool 87.

The stop tool 87 is used to grip a stop N in placing or removing it from the groove 83d. The tool 87 is made of spring steel. Since the distance between pins 87a is greater than the length of stop N, the prongs of tool 87 are squeezed to grip a stop N. The tool 87 is connected to the frame 36 with a chain 94.

The stops N are gripped with the tool 87 and inserted in the groove 83d. A stop N is rotated in the groove 83d by pressing the chisel point 87b against a side of a toothlike groove 86c to obtain vernier accuracy to any given angle marking 83b or 83c. The grooves 86c are cut across the thread of the stud on one complete turn of the thread in the center of the stud 86, thus leaving ungrooved threads at each end of the stud 86. If the stud 86 were grooved full length, there would be a tendency to cut into the groove 83d. The chisel point 87b may be used as a screw driver to turn the screw 86b and thus the stop N in making vernier adjustments. These stops N may be positioned and used as index settings for angles that are used frequently, such as 0°, 30°, 45°, 60°, and 90°. Furthermore they may be set to index odd angles or bevels which are to be used frequently for a particular job. These stops N may remain in the groove 83d without interfering with any operation. The resilient disk 86a on stop N is squeezed into the groove 83d, thus securely holding the stop N within the groove. The disk 86a prevents the stop N from jarring loose, or falling out.

When magnetized studs 86 are used, an iron band 88 may be fastened to ring 83 to complete the magnetic path to the stud 86. If the ring 83 is made of iron or steel, the band 88 may be omitted. If the ring 83 is made of plastic, the band 88 may be inserted within the plastic. If the ring 83 is to be made of plastic, it would be practical to place a steel insert in the plastic to form the threaded groove 83d, the steel insert would attract the magnetized studs 86. In operation, the stops N would bear against prongs or fingers on the protractor locking mechanism L. The lever 89 is supported by the ribs 36e on the frame 36 with the pin 90. The handle of the lever 89 is pushed or pulled down by the left hand or by the action of a foot pedal attached to the chain 91, releasing the brake block 84 and raising the prongs 92a and 92b which raises the bumpers 93a and 93b above the stop N, thus releasing the stop N. The ring 83 is then free to rotate to any desired position. The lever 89 may be depressed by a solenoid (not shown) in response to a switch on the control board K. This feature would be useful for some physically handicapped operators.

The prongs 92a and 92b are fastened to the lever 89 with machine screws. The bumper 93a is fastened to the prong 92a and the bumper 93b is fastened to the prong 92b with machine screws. A spring 95 exerts a pressure on the brake 84, tending to lock the brake against the ring 83, thus allowing the locking of the protractor at any angle without using stops N. The pin 96 has a conical end to engage a large conical hole 84a in the brake 84. The pin 96 is moved downwardly by the action of lever 89, compressing the spring 97 and forcing the block 84 outwardly by the bearing and sliding action of the point of the pin 96 against the side of the hole 84a. When the pressure is removed from the lever 89, the spring 97 under the head of the pin 96 forces the pin upwardly which also forces the lever 89 to return by pivoting upwardly. The spring 97 is useful since it lifts and pivots the lever 89 when the spring 95 is removed.

It would be desirable at times to remove the spring 95 so the brake 84 does not operate, the stops N being used with the lever 89 to lock protractor ring P, thus allowing less effort to operate lever 89. The guide pins 98a and 98b restrain the brake 84 from moving sideways. The brake 84 with the spring 95 engaged to it may be used to lock the protractor P without using any stops N.

FIG. 20a shows a stop N locked into position. FIG. 20b shows the positioning of parts when the lever 89 is depressed and the protractor ring P is being rotated in the direction of the arrow 99. Since the brake 84 and the spring 95 are operating, the handle end of lever 89 is depressed only slightly so as to disengage the brake 84 from the ring 83. The depressing of the handle of lever 89 raises the bumpers 93a and 93b equally. When the ring 83 is rotated, the stop N contacts the sloping surface of the bumper 93b, forcing the bumper 93b upwards since prong 92b is resilient, thus allowing the stop N to pass under the bumper 93b until it contacts the bumper 93a and is forced to stop. After the stop N has passed the bumper 93b, the bumper returns to its former position, which is similar to the position of the bumper 93a, thus blocking or stopping the stop N and the ring 83 from moving in either direction. When the spring 95 is removed, and the brake 84 is not operating, the lever 89 does not require depressing when locking, since the stop N can raise the bumper it contacts first.

*Electrical control board "K"*

The electrical control board K is shown positioned near the protractor lock L, so the board K and the lock L can be operated with the least amount of motion by the left hand of the operator. The board K may be positioned on the carriage M if preferred, such as at the positions Ka or Kb as indicated by the phantom dot-dash outlines in FIG. 24. Such positioning on the carriage would be preferred by a handicapped operator who has only one usable hand, as he could work the switches on the board K with his index finger as he is gripping and manipulating the pivot control arm Y.

A tubular mast 100 supports the electric cable 101. The cable 101 connects the board K to the carriages M and BR. The mast 100 is supported by the frame 36 and it is fastened with the set screw 102. A mast 103 fits into the hole in the mast 100 and it is fastened with a set screw 104. The mast 103 supports the electric cable 105. The cable 105 connects the board K to the carriages C and BL. The board K has a panel 106. The panel 106 is connected to the frame 36 with a machine screw. The cable 107 connects the board K to a power source. The panel 106 has switches, plug sockets, and rheostats attached to it for controlling all the carriages. FIG. 82 shows the electrical diagram which shall be explained later.

The board or workable surface W consists of a board 108 which is fastened to the ring 83 with four bolts 109. The board 108 should have a hard surface if it is to be used with a pencil-stylus that is similar to stylus 14. The drawing paper 110 is fastened to the board 108 with the drafting tape 111. The sketches 112a and 112b are examples of the work that can be drawn with this machine. When a drawing is longer than the board 108, a portion of a drawing may be worked on while the remainder of the drawing is allowed to project down through the segmental spaces between the board 108 and the ring 83.

When the operator uses a conventional compass with a needle-like metal point which tends to penetrate the drawing and the underlay, a suitable underlay may be made with a piece of 1/16" thick clear plastic material (not shown) such as "Plexiglas." It can be fastened to the top of the board 108. The plastic can be pierced by a compass point and it is hard enough to prevent a rotating pencil stylus from materially depressing it. A stylus 14 and the like would not snag into compass holes in the plastic as common pencils would tend to snag. The long contact line of the stylus 14 could not penetrate a small compass hole. The board 108 may be a transparent glass sheet which is highly useful for drafting work since it is hard, smooth, flat, durable, strong, and it does not absorb mixture. Furthermore, it is non-corrosive, easily cleaned, and it has a low expansion coefficient. A plastic board 108 may be used. It has some of the favorable characteristics of glass.

A board 108 may have a slightly yieldable resilient covering of plastic or rubber for use when ball point pens are used as markers on the graphic machine. The ball point pens may be made to bear lightly on the drawing to make narrow lines. Wider lines can be made by increasing the pressure on the pens so they press the drawing into the yieldable underlay causing the paper at the lines to groove, thus causing wider line contact between the pen point and the paper. Ball point pens would not tend to snag a drawing. They would be self-feeding and they would not have to be rotated, thus they would be economical to use for much drawing work on tough paper on tracing cloth or tough drafting paper and template paper.

Master carriage "M"

The master carriage M is shown by FIG. 24 to FIG. 64 inclusive. FIG. 24 shows an elevation of the carriage M. FIGS. 25, 28, 33, and 37 show most of the features of the carriage.

The main framework part 113 is supported by three flanged wheels 114a, 114b, and 114c which ride on the edges of the beam 53. The top frame part 115 and the frame post 116 are fastened to other frame parts with machine screws. The control arm E has a pivot arm frame 117 which is fastened to the carriage framework with the shaft 118 and the pin 119. The pivot arm 117 may be pivoted over an angle of 270° to selective zone positions for selective locking of the shaft T or the carriage M, combined with selective powered movement of the beam G and/or the carriage M along with selective pivot angle positioning for drawing selective width lines.

The stylus or marker 14c is like the stylus 14 of FIG. 1. Referring to FIG. 37 which illustrates to a large extent the mechanism of the carriage M, the arm E consists of a holder 120 which holds the stylus 14c. Since standard pencil leads 1/32" and 1/16" thick are suitable for use in most drafting work, a holder 120 would be used to suit the diameter pencil stylus 14c being used. The tapered end of the holder 120 is split to form prongs which are bent inwardly so as to grip the stylus 14c, thus restraining the stylus from turning within the holder. A set screw 24c on the holder 120 is for holding a liquid stylus. A gasket 23c is identical to the gasket 23.

FIG. 59 shows a fragmentary view of the arm E when it is being used with liquid stylus 25g. The stylus 25g is like the stylus 25. The liquid 26c is like the liquid 26 of FIG. 7.

A bevel gear 121 is splined to the holder 120. A set of ball bearings 122 is engaged to the holder 120. The bearing 122 is press fitted to the arm 117. The holder part 123 is press fitted to the holder 120. The part 123 has a tight sliding fit to the shaft 124. The ram 125 engages the threads in the upper portion of the part 123. The gasket 125a on the ram 125 is used in conjunction with a liquid stylus. The holder cap 126 has a bayonet fitting to engage the arm 117. The machine stud and nut 127 ties the shaft 124 to the cap 126. The cap 126 acts as a bearing for the shaft 124. The shaft 124 rotates when the bevel gear 128 on the shaft 118 is revolving as the bevel gear 128 drives the gear 121, thus rotating the stylus 14c. The ram 125 feeds out the stylus 14c as it wears away. This feeding action is made either manually or automatically. Manual feeding action is made by turning the holder 120 while preventing the shaft 124 from turning. The abutting surfaces of the part 123 and the shaft 124 are tight enough to act as a slip clutch. When the assembly 120—123 is turned, the shaft 124 can be restrained by a force large enough to overcome the friction between the part 123 and the shaft 124. The feeding action can also be done manually by restraining the holder 120 from rotating, while turning the shaft 124. When either the holder 120 or the shaft 124 is being revolved in a direction to cause feeding action, and the other part is held stationary, the thread on the part 123 being engaged with the thread on ram 125 causes the ram to move down in the shaft 124, thus pushing against the stylus 14c, thus feeding it through the holder 120.

FIGS. 60 to 64 inclusive show the operation of the automatic feeding arrangement for the stylus 14c. FIGS. 61a, 62a, 63a, and 64 show the mechanisms when the arm E is raised and the feeding mechanism is not causing feeding action. FIGS. 61b, 62b, and 63b show the feeding mechanism in operation to advance the stylus 14c. The automatic feeding mechanism cuts in and out to maintain sufficient projection of the stylus 14c without the help of the operator. The lever 129 is pin connected to the arm 117. An adjusting screw 130 engages the threads in the hole of lever 129. A lock nut on the screw 130 restrains the screw from turning after it is set. The screw 130 engages the pin 119 until the stylus 14c wears down. When the stylus has worn down and the arm E is lowered, the screw 130 engages the conical boss 116a on the post 116. A pawl 131 is fastened to the lever 129 with a machine screw. A follower 132 is threadably engaged to the lever 129. A spring 133 tends to keep the pawl 131 away from the shaft 124. The spring 133 exerts a force which keeps the screw 130 in contact with the pin 119 or the boss 116a, except when the pawl 131 is engaged with the shaft 124.

In operation, the stylus 14c wears down until it needs to be fed a little from the holder 120. When the arm E is lowered, the screw 130 rides the conical boss 116a to give a lifting action to the end of the lever 129. The lever 129 rocks, moving the pawl 131 inwardly until it engages the catch recess in the shaft 124. Since the shaft 124 rotates in a counter-clockwise direction to cause feeding action, the catch therein tends to catch the pawl 131, even if the pawl is only slightly projected into the catch recess in the shaft 124. Once the shaft 124 and the pawl 131 are engaged, they have a tendency to tighten and the pawl 131 is pulled further into the catch recess in the shaft. When the pawl 131 is pulled in, the follower 132 is pulled into engagement with the eccentric cam portion 121a of the gear 121. The cam 121a pushes the follower 132 outwardly after a fraction of a turn, thus forcing the pawl 131 from the catch in the shaft 124. The fraction of a turn is enough to advance the stylus 14c. The lower portion of the lever 129 is resilient, thus allowing the lever 129 to bend when the pawl 131 contacts the shaft 124 opposite the catch recess.

The feeding mechanism advances the stylus 14c only when the rotary parts are revolving counter-clockwise, which is usually sufficient, since the direction of travel or movement of stylus 14c is being alternated frequently.

When all the lines are being drawn in the same direction as that which causes clock-wise movement of the stylus, that do not cause feeding action, or when a soft, fast wearing stylus is being used, the carriage may occasionally be moved a short distance so the stylus rotates counter-clockwise to feed, a piece of scratch paper being laid over the drawing at the marking action. When the stylus 14c wears down and as the feeding mechanism rotates clockwise, the pawl 131 touches the shaft 124, but it cannot catch and it merely drops into the catch recess and is forced out again. The resilient end of the lever 129 bends to relieve the strain, thus preventing binding action or the breaking of the parts.

The automatic feed acts in a similar way for liquid stylus 25g shown in FIG. 59. When the stylus 25g slides into holder 120 slightly as the liquid is used up, the feeding mechanism goes into play and turns and advances the ram 125, creating a hydraulic pressure in the liquid which forces stylus 25g towards its maximum projected position, then shutting off until the stylus must again be advanced.

As shown in FIGS. 24 and 37, the pivot control arm Y is illustrated with full lines in a position close to the board W. If preferred, the arm Y may be positioned at the position Ya or the position Yb, which are indicated by dot-dash phantom outlines. The control Y is used to facilitate the pivoting of the arm E. The handle 135 is held by the operator in the same way as a pencil or pen is held. The handle 135 may be a tube made of a resilient substance, such as plastic or rubber. The surface of the handle 135 should be knurled or roughened to allow for easy gripping. The handle would be as long as preferred by the operator. The connector 136 fits tightly into the lower portion of the handle 135 so as to rotate with it when the handle is rotated. The shaft 137 is fitted into a hole in the connector 136 and is fastened with a set screw. The gear frame 138 has holes that act as bearings for the shaft 137 and the pin 139. The bevel gear 140 is keyed to the shaft 137. The bevel gear 141 is keyed to the pin 139. The gear 141 and the pin 139 do not rotate in relation to the arm 117. The pin 139 fits into a hole in the arm 117 and a small pin projects through the arm 117 and the pin 139 to key the pin 139 to prevent it from rotating in its socket.

The pivot control Y operates as follows: The handle 135 is held like a pencil is held. When the proper pivot angle to be used is determined by the operator, he manipulates the handle 135 to obtain the pivot angle position that was selected. To do so, he pivots or rolls the handle 135 between his thumb and fingers, thus revolving the gear 140. The gear 140 turns gear 141 since the gear 141 is rigidly fixed to the arm 117, the arm 117 pivots. The handle 135 may be held loosely and almost stationary while being rotated. The arm 117 may be gripped and be pivoted to the selected pivot angle instead of using the control Y to pivot the arm. Since the pivot angle on carriage M is 270°, there would be considerably more hand movement when gripping the arm 117, and much of this movement would be with twisted unnatural hand positions which would be slow and awkward. The arm 117 is lowered or lifted by lowering or raising the handle 135. Since the handle 135 is resilient, it requires less effort to manipulate than that required to manipulate arm 117, as it has some spring or give which absorbs some of the shock of starting, stopping, locking, and reciprocating movement when making dotted lines.

When the control Y is used in the position Ya, the operator's hand may rest on top of carriage M which is a favorable position when making ink lines and the like, or when working on a rough paper or rough workable surface. Thus, the operator is less likely to smear freshly inked lines, pencil lines, or injure his hand, as is the case when the hand rubs the rough paper or workable surface. With conventional equipment, draftsmen often get sores on their hands, similar to bunions, from continuous rubbing against the drawing surface. The control position Ya eliminates the danger of the draftsman soiling the paper with perspiration from his hand. When the operator is controlling the machine with his hand positioned on the top of the carriage M, he can use the selective powered directional movement to propel the carriage and carry his hand. A machine that has a very small carriage M along with a small beam G would be low enough so the operator could rest his hand on the board W behind the beam G and the shaft T and be able to operate with the control at the position Ya.

It is an advantage to have the control Y in the position Ya, as it has the pivoting center of gear 141 concentric with the pivoting center of the arm 117. This positioning would allow easier switching from one directional pivot zone to a different directional zone, as the pivoting could be done without jarring the carriage from a position where a line ends and another is started and drawn at ninety degrees from the first. The operator may position the control Y at the position Yb to obtain the advantage of aligning the centers of the gear 141 and the arm 117, from the opposite side of the carriage from the control position Ya.

FIG. 58 shows a modification of the arm E that includes a common pivot point for the gear on the arm Y and the gear on the arm 117. The marker is a self-fed pen. This view will be described fully further on.

As shown in FIG. 37, the shaft 118 fits into a socket in the lower portion of the arm 117, and a socket in the takeup screw 142. These two sockets act as bearings for the shaft. The shaft 118 has a hole in its bottom to clear the pin 119 when the arm 117 is lowered. The gear 128 is keyed to the shaft 118 with a set screw. The dotting cam J is fastened to the shaft 118 with a set screw. Details of the cam are shown in FIG. 46. A sprocket 143 has a square hole through its center which allows the square portion of the shaft 118 to slide in the sprocket. The sprocket 143 drives the shaft 118. The collar 144 is press fitted to the upper portion of the shaft 118. The spring 145 bears against the sprocket 143 and the collar 144, tending to lift the entire arm E when it is not restrained. The carriage frame part 146 is fastened to the post 116 with a machine screw. A hole in an offset on the post 116 and a hole in the part 146 act as bearings for the sprocket 143. The jack R is supported by part 146. The jack R will be described later.

FIGS. 33 and 39 show the chain drive for rotating the sprocket 143. The chain 147 engages the sprockets 143 and 148. The sprocket 148 is fastened to the drive shaft 149 with a set screw. FIGS. 28, 29, and 39 show other details of the driving means. The reversible motor 150 has a beveled gear 151 keyed to it, the gear 151 engages the beveled gear 152, which is keyed to the shaft 149, thus when the motor 150 is switched on, it drives the shaft 149. The shaft 149 can also be driven without the motor, by the rotating movement of the shaft 45 or the movement of the carriage M along the beam 53 when the machine is locked and the carriage M is pushed manually. When the operator prefers to move the carriage manually, he may do so by switching off the current to the motor 150. He may also tilt the motor to disengage the gears, thus eliminating the drag of the non-active motor. As shown in FIGS. 25, 34, and 39, the motor 150 is attached to the frame 113 with a pin 150a. A resilient arm 150b engages the pin 150a, a notch in the motor 150 and a notch in the frame 113. The arm 150b is keyed to notch in the motor 150. The motor 150 is tilted by pressing back the top of the arm 150b towards the motor, this action disengages the arm from the notch in the frame 113. The arm 150b is pivoted to a second notch in the frame 113, that is adjacent to the end of the carriage. This action pivots the motor 150. Pressure is maintained to keep the arm 150a pressed backwards until it reaches the second notch. A fragmentary dot-dash phantom outline 150c indicates the tilted position of the motor 150.

The motor 150 may be omitted in subcombinations, thus using manual effort to move the carriage M. The carriage M can be moved by a combination of power from the motor 150, and manual efforts of the operator, thus allowing manual control to a large extent. When the carriage M is selectively locked, it is in gear as an automobile is in gear when it is in other than neutral. When the selective locking prevents the carriage M from moving along the beam G, the beam can be moved by the operator by his pushing or pulling the carriage M with the control Y, thus causing all the mechanism that is in gear to operate since they are mechanically coupled. The selective locking for drawing in the other direction also puts the mechanism into gear.

The shaft 153 has a bevel gear 155 keyed to it, the gear 155 engages bevel gear 156 which is keyed to the shaft 149. The shaft 154 has a bevel gear 157 keyed to it. The gear 157 engages the bevel gear 158 on the shaft 149. The shaft 154 is at a different elevation from that of the shaft 153. The clutch part 159a on shaft 153 has a collar 160a. A set screw keys the shaft 153, the clutch part 159a, and the collar 160a together. The clutch part 159b, the collar 160b, and the shaft 154 are also keyed together with a set screw. The clutch gear part 161 slides and rotates on the shaft 153. The clutch is shown in a neutral position. The gear teeth 161a on gear 161 engage the gear 162 on the shaft 45. The gear 162 has a square hole through its center to engage the square shaft 45. The gear slides on the shaft. The gear 162 has shouldered ends to engage holes in the frame 113. Curved, as distinguished from dished, spring steel washers 163a and 163b tend to keep the part 161 in neutral when it is not forced along the shaft 153 by the action of the shifting arm 164a of the rocker 164. Flat bronze washers may be placed next to the washers 163a and 163b to act as thrust bearings. When the action or movement of the arm 164a (the source of which movement will be explained later) forces the part 161 against the clutch part 159a, the engaging surfaces act as cone clutch surfaces, thus the part 159a and the part 161 are coupled when they are in contact. When the action or movement of arm 164a forces the part 161 in the opposite direction so that part 161 bears against the framework 113, the engaging surfaces act as brake surfaces, thus preventing the part 161 from revolving, which prevents the gear 162 and shaft 45 from rotating, thus locking the beam G to a position.

The clutch gear part 165 is similar to the part 161 and the washers 163c and 163d are identical to the washer 163a. The part 165 works similar to part 161. The teeth 165a engage the rack 53a. The shifting arm 164b pushes the part 165 along the shaft 154. When the part 161 is engaged to the part 159a, the part 165 is locked to the framework 113 and when the part 165 engages part 159b, the part 161 is locked to the framework 113. Thus the beam G and the carriage M cannot be locked at the same time with the rocker 164. All the parts are shown in neutral position.

As shown in FIGS. 28 and 37, the shaft 166 is supported by the framework 113, and the frame part 115. The shaft 166 has the rocker 164 keyed to it with a set screw 164c. A clevis-like part 167 is fastened with a set screw 167a to the upper end of the shaft 166. As shown in FIG. 25, when arm 117 is pivoted to a selected angle and lowered, the carriage M or the beam G is locked so as to allow the marker to move only in the direction selected, at the same time the arm 117 is at the proper pivot angle to produce the selected width of line to be drawn. When the arm 117 is held down within the pivot angle zones 168a, 168b, or 168c, the carriage M is locked so that it cannot move along the beam 53. The beam 53 is movable, thus the carriage M is movable with the beam as it is locked to the beam.

When the arm 117 is held down within a pivot angle zones 169a, 169b, or 169c, the shaft 45 is locked to prevent it from revolving. The carriage M is now free to be moved along the beam 53. The beam 53 is also locked to a position when the shaft 45 is locked, because the beam is attached to the ends of the shaft 45. When the arm 117 is set close to any of the lines 170a, 170b, 171a, or 171b, a thin line is drawn. When the arm 117 is selectively set at a larger angle to a line 170a, 170b, 171a, or 171b, the width of angle that can be made with the machine locked would be slightly less than 45°. The larger the pivoting angle setting, the greater the width of line that can be drawn.

When the carriage M is used for free hand lettering or with an auxiliary guide, the directional locking mechanism is made inoperative. The arm 117 may then be pivoted to 90°, thus allowing the drawing of greater width lines. The cam 172 could obviously be changed to one that has slots to govern locking when a 90° pivot is required for very wide lines. The cam 172 (see FIGS. 25, 37, and 100) revolves on the shaft 173. The shaft 173 is supported and keyed to the frame part 115. The shaft 173 does not revolve. A sprocket 174 is keyed to the cam 172 with a set screw. A sprocket 175 is keyed to the arm 117 with a set screw. A chain 176 engages the sprockets 174 and 175. When the arm 117 is pivoted the maximum 270°, the chain 176 turns the cam 172 a full 360°.

The slots in the cam 172 correspond to the pivot angle zones of the arm 117; slot 172a corresponds to the zone 168a, slot 172b corresponds to the zone 168b, slot 172c corresponds to the zone 168c, slot 172h corresponds to the zone 169a, slot 172k corresponds to the zone 169b, and slot 172m corresponds to the zone 169c. The seven notches 172e in each of the slots in the cam 172 correspond to seven different degrees of pivot angles within a zone for selectively positioning the arm 117, to obtain seven different widths of lines. As shown in FIGS. 25 and 37, when the arm 117 is raised, the lever part 177 is raised when the collar 144 engages it. The part 177 is pin connected to the lever part 178. The part 177 is hinged so it can be swung aside as indicated by the dot-dash outline 177a, when it is desirable to disengage it to prevent locking action when drawing by following a lettering guide and the like or the screw 164c or the screw 167a is loosened to retract it to prevent the shaft 166 from turning and locking the machine, when the part 177 remains engaged to tilt the rocker 179 so its tip can selectively engage a notch 172e. The part 178 is pin connected to the two raised lugs 115a on the frame part 115. The jaws on the part 178 engage the end of the rocker 179. The rocker is pin connected to the part 167. The spring 180 keeps the rocker 179 clear of the cam 172 when the arm 117 is not lowered fully or when the part 177 is disengaged and the rocker 179 is not operating. The tapered tip on the rocker 179 engages one of the six cam slots (172a–b–c–h–k or m) when the arm 117 is forced down so the stylus 14c touches the drawing paper or working surface. When the arm 117 is forced down so the marker 14c touches the paper, the part 177 is forced down. The part 177 is not forced down until the movement of the arm 117 has closed the gap between the screw 142 and the part 177. The parts 177 and 178 act as a rocker when the part 177 is forced down. The jaws on the part 178 that engage the flat end of rocker 179 tilt the rocker 179. This forces down the tapered tip of the rocker 179 into a slot in the cam 172. The gap between the screw 142 and part 177 allows the arm 117 to raise or lower slightly after the rocker 179 tightly engages the cam 172, thus the arm 117 may be raised and lowered slightly when making intermittent lines such as dotted lines, without unlocking from a selective setting. This means to selectively lock and move the markers without marking, allows the operator to move the marking means to a new starting position with powered movement. Furthermore, the operator may use the non-marking locked setting means to move the mechanisms manually or with powered movement in aligning points from one sketch to another sketch. The tapered tip of the rocker 179 is split and widened as shown in FIGS. 26 and 27, so that it tightly fits the slot 172a and the like, as shown in FIG. 27. The tip of the rocker 179 is forced into a slot. Friction holds the tip in the slot until the arm 117 is lifted high and parts 177—178 lift the rocker 179 out of the slot. The spring 180 is not strong enough to overcome the friction of the rocker 179 in the slot. The tip of the rocker 179 engages one of the seven notches in a slot. The notch locks the arm to prevent the pivot angle from changing due to torque of the driving means for the marker. The center lines of the slots in the cam 172 are off center of the neutral circle diameter 181. The radius to the center line of the slots 172a, 172b, and 172c is less than the radius of the circle 181. The radius to center line of the slots 172h, 172k, and 172m is greater than the radius of the circle 181. When the tapered tip of the rocker 179 is forceably withdrawn from a cam slot, it has a tendency to return to neutral, since the springs 163a, 163b, 163c and 163d cause the machine to shift to neutral when not being forced by locking actions. When the tip of the rocker 179 is forced into a cam slot in cam 172, the rocker pivots laterally since the cam slot is off center. As shown in FIG. 27, this lateral movement through the distance 182 pivots the part 167 slightly which pivots the shaft 166, which pivots or rocks the rocker 164, whose arms 164a, 164b push the clutch gear parts 161 and 165, thus locking or shifting gears for the required operation. Electrical mechanism for operating and locking will be explained hereinafter in connection with FIG. 57.

The circular rest 183 is fastened by a set screw to the shaft 173. The rest 183 allows the operator's hand to rest on the carriage M when operating with the control Y at the position Ya, or when he is gripping the upper portion of the arm 117. On a large graphic machine, such as would be practical for a ship-building mold loft work, it may be desirable to have the operator ride on the machine. He may be seated on the rest 183.

The automatic built-in scale measuring mechanism for measuring the lengths of lines drawn with different scales is shown mainly in FIGS. 28, 33, 37, and 41. The image of the selected scale is projected onto the drawing or working surface at the marker 14c as shown in FIG. 56. The scale recording means is synchronized with the movement of carriage M so that any movement is automatically shown in the projected image. The scale is driven by the train of gears consisting of the gear 184 which is fastened to shaft 149 with a set screw, the gear 185a which engages the gear 184, the gear 185b which is a portion of the same member as the gear 185a, and the gear 186 which meshes with the gear 185b. The composite gear 185a—185b rotates on the shaft 173. The gear 185a—185b is held in place by a tight fitting collar 187. The gear 186 revolves on the shaft 166. The lower surface of the gear 186 and the top surface of the scale wheel 188 act as clutch surfaces when they are in contact with each other. The spring 189 tends to force the gear 186 against the scale wheel 188 so as to form a clutch, thus the scale wheel 188 may be rotated by the gear 186.

A translucent scale band 190 is fastened around the scale wheel 188. A detail of the scale band 190 is shown in FIG. 45. There are perforations in the scale band 190 which are similar to those in motion picture film. The perforations engage the teeth on the scale wheel 188 as shown in FIGS. 43 and 44. The ends of the scale band 190 are fastened together with the splice plates 191 and 192. The plate 191 is made of steel so that it can be attracted by the permanent magnet 193 which is fastened to the frame post 116. The magnet 193 may be made of aluminum-nickel-cobalt alloy ("Alnico") metal. The plate 191 has four holes which line up with perforations in the ends of the scale band 190 and the teeth in the scale wheel 188 and the plate 192. The plate 192 has two teeth which engage perforations in the band 190 and the plate 191. The plate 192 has a hole for a machine screw. The screw passes through plate 192, the gap in the band 190, and enters the tapped hole in the plate 191. The band 190 is perforated along both edges so that it can be mounted on the scale wheel 188 in any direction, such as by reversing the sides and edges in relation to wheel 188 so as to obtain a projected image that is readable from the operator's selective position. The band 190 may be made with various scales printed on its surface the same as motion picture film is printed. The film type scale band is inexpensive and many different scales can be printed on it. Such a scale band can be made in color, black and white, positive or negative. The scale images on the band 190 are proportional to the distance the carriage M moves; for example, if the drive gears 186—188 are designed so that when the carriage M moves one inch, the wheel 188 revolves only one-eighth inch, then the so-called full size scale on the band 190 is only one-eighth full size, and the so-called half size scale is only one-sixteenth. When the scales on band 190 are projected, the projected image is enlarged to nominal size. In projecting for very small scaled work, the image may be enlarged to more than nominal size. The scale mechanism is designed to use such a scale ratio so the time lag is very short to return the scale to zero. Also, this type of scale ratio keeps the size of the band 190 small, light in weight and inexpensive to manufacture.

The optical system used to project the scale image is shown in FIG. 28 and FIG. 37. A projection bulb 194 has a mask 195 positioned in front of it. The mask 195 has a slot to allow light to pass through. This slot area is only wide enough to cover a small length of one of the plurality of scales on the band 190. The projected light passes through the band 190, picking up the scale image. Then it passes through the lens 196, and the prism 197 where it is bent ninety degrees. Then it passes through the prism 198 where it is again bent ninety degrees, and then through the prism 199 where it is bent slightly so as to project it onto the drawing paper or working surface as shown in FIG. 56. Mirrors may be used instead of prisms for bending the light. A support 200 supports the bulb 194, mask 195, lens 196, and prism 197. The support 200 is supported by the framework 113. A spring 201 tends to keep the support 200 raised. A selective scale is brought into play by turning the adjusting screw 202, as the screw 202 is in threaded engagement with a tapped hole in the shaft 173. The knurled knob 202a on the screw 202 is gripped for turning the screw. The end of the screw 202 bears against the holder for lens 196, the holder being fastened to the support 200. Thus by adjusting the screw 202, the support 200 is forced down, compressing the spring 201, or the screw 202 may be turned in the opposite direction to allow the support 200 to rise due to the action of the spring 201. When the support 200 is adjusted by raising or lowering it, the slotted hole in mask 195 and the other optical parts are aligned to the selected scale on the band 190. Projection bulb 194 has a shield around it which prevents light from straying. The shield could also absorb heat from the bulb and act as a reflector. The bulb 194 may be a clear bulb with a concentrated filament which could project the scale image without a lens 196. The scale wheel 188 may be perforated to allow the heat from the bulb 194 to escape. The mask 195 may be made so as to have an adjustable slot so as to allow two adjoining scales to be projected simultaneously. This would allow a metric scale to be projected along side of an English system scale when a drawing is being made with dimensions marked in both scales or when a drawing is being redrawn from one scale system to another.

Interchangeable lenses or various lenses mounted in a turret (not shown) may be selectively used as lens 196 so the scale image can be enlarged to a greater size as when a very small scale is being used. The prism 199 has supports secured to the frame post 116, which supports are hinged thereto so that prism 199 is angularly adjustable.

The carriage M may be oriented so that when the arm 117 is lowered, the marker 14c contacts the spot on the drawing that was previously selected for starting a line. A crossed hair unit 203 has a transparent sheet with crossed hairlines 203a and 203b attached to it or it may be a sheet of color film with a colored image of crossed hairs. The unit 203 is in the path of the projected light beam so as to cast a crossed hair image along with the projected scale onto the paper or working surface (see FIGS. 24, 37, 50, and 56). The projected scale image 204 is shown in FIG. 56, along with the projected hair images 204a and 204b that form crossed hairs. The point on the drawing surface where the images 204a and 204b intersect is centered and aligned with the center of the pin 119 and the tip of the marker 14c. The carriage M is oriented before drawing by moving it laterally until the intersection of the crossed hair images 204a and 204b is centered exactly with a point on the drawing selected for starting a line. When the arm 117 is lowered, the carriage M is selectively locked for directional drawing movement and the marker 14c contacts the starting point. The crossed hairs allow the operator to draw without having a lean over the drawing to orient the marker 14c with a starting point. The unit 203 may include a light polarizing sheet ("Polaroid"). The shank 203c of the unit 203 fits a hole in the bottom of the frame post 116. The unit 203 is held therein by a set screw so that it can be adjusted. The shank 203c is offset from the light beam to allow the unit 203 to be swung aside when the crossed hair image is not wanted on the drawing surface. A clear band or a clear portion of a band on the band 90 is used when projecting a crossed hair image with unit 203 without projecting a scale image, for use when tracing or making a non-scaled drawing.

The projected scale image 204 and the crossed hair images 204a and 204b would not show or reflect on a dark or clear surface, such as dark template paper, metal, or clear glass and plastic. Therefore, a screen 205, which would reflect a projected image, may be pivoted into the projection path to receive the projection (see FIGS. 24, 37, and 56). The screen 205 is shown with full lines in the position taken when it is not being used and is swung aside. In FIG. 56 a dot-dash outline 205b indicates the position of the screen 205 when it is pivoted into play. The screen 205 is pivotally supported by a pin 205a, which is threaded into frame post 116 as shown in FIG. 51. A light polarizing screen 206, which is positioned slightly above the screen 205, is the same shape as the screen 205. The screen 206 is swung into place when it is required to screen out unwanted polarized illuminating light. The grains in the polarizing sheet in the unit 203 and the screen 206 are parallel so as to allow the projected image to pass therethrough. When illuminating light is polarized differently, the screen 206 screens out such light on the area receiving the projected image. Since the graphic machine is shown with the locking mechanism in neutral, the zero position of the scale band 190 is shown in registry in the projected image 204 in FIG. 56, as it would appear when the arm E is lowered. When the carriage M moves with the arm 117 depressed, the scale band 190 revolves, projecting the moving scale image. The scale band returns to the zero position when the arm 117 is raised after a line is drawn. When the arm 117 is raised high, the gear 186 is raised above the scale wheel 188, thereby disengaging the clutching surfaces. A resilient band 207, which may be a coiled spring or a rubber band, is banded partially around a groove in the scale wheel 188. The band 207 is fastened to the frame post 116 and the scale wheel 188 at the zero point. The band 207 returns the scale wheel 188 and the scale band 190 to the zero position after the scale wheel 188 is disengaged from gear 186, thereby acting as a zero reset. The magnet 193 has the splice plate 191 attracted to it, thus forcing the scale band 190 into exact zero position. This magnetic force quickly overcomes the tendency of the scale band 190 to swing back and forth when it is returned to the vicinity of zero, the magnet having a dampening effect, overcomes any slight change in the tensioning of the band 207 on either side of frame post 116.

The scale recording is automatic for most types of work as shown by the mechanism in FIGS. 33 and 37. When the pivot arm 117 is raised fully, the top of the cam J engages the scale lever part 208 and raises it. A detail of the part 208 is shown in FIG. 35. The scale lever parts 208 and 210 are hinged to the scale lever part 209. The part 208 may be swung aside to the position 208a, where it is raised manually with a finger tip, to set the scale to zero when portions of lines are to be scaled without putting the machine in neutral. The part 210 is used when tracing to keep the parts 208 and 209 raised to prevent the scale clutch from engaging when the scaling action is not wanted. Disengaging the scaling mechanism reduces the drag on the manual effort or power source that is being used to move the carriage. It also eliminates the moving scale image when it would cause confusion. The part 210 is an eccentric which is hinged so it can be pivoted so its bottom engages the top of the screw 211, to keep the parts 208 and 209 raised. The screw 211 is threaded to the post 116. The part 209 is hinged to the frame 115 with the pin 212. The pins 209a and 209b on the part 209 engage the recessed hub of the gear 186, thus when the part 209 is raised, the gear 186 is raised allowing the wheel 188 and the band 190 to return to the zero position. Since the spring 189 tends to push the gear 186 in contact with the wheel 188, the spring 189 pushes the part 209 down when the arm 117 is depressed. The scale clutch engages when the arm 117 is depressed a short distance. This feature allows the arm 117 to be raised and lowered slightly without tripping the scale mechanism, when intermittent or dotted lines are being drawn.

When the graphic machine is to be used only for full sized work or when only one scale is to be used, a different scale arrangement may be used to advantage. Such a scale may be one that operates similar to that shown in U.S. Patent No. 1,805,740.

Other types of scales may be easily incorporated into the machine, such as one that records the distance traveled. It would be similar to the portion of an automobile speedometer that records the distance traveled. The measuring dials would be geared so as to register the distance traveled on the series of drums so that one revolution of the right-hand drum would measure one inch, the drum to the left of it one foot for one revolution, the next drum to the left ten feet for one revolution, and the next drum on the left one hundred feet for one revolution. Thus, only the right-hand figure would be revolving fast, and the others may be read easily without slowing down the movement of the machine. This arrangement would be ideal for a full sized scale for template work and for laying out working surfaces of materials that are to be fabricated.

A cam assembly J is located on the shaft 118. It is shown in FIGS. 24, 37, 46, 47, 48, and 49. The cam J is used for making intermittent lines which include short dash lines commonly called dotted lines, dot-dash-dot lines, such as centerlines, and long dash lines that are used as extension lines. The dotting cam J is made up of cam 213, cam 214, and cam 215. The cam 213 is press fitted to the outside of cam 214 and the latter is press fitted to the outside of cam 215. A set screw 216 fastens the cam J to shaft 118. An adjustable cam follower 217 is engageable with the cams.

FIG. 47 is a fragmentary developed view of the outside of cam 213. FIG. 48 is a fragmentary developed view of the outside of cam 214. FIG. 49 is a fragmentary developed view of the outside of cam 215. The cam follower 217 is pivotally and slidably supported to the frame post 116. The follower 217 is slightly resilient to allow it to yield slightly when the arm 117 lowers due to wear of the stylus 14c. As shown in FIGS. 37 and 28, the follower 217 is slidably attached to the post 116 with a loose rivet 217a that projects through a hole in the post 116. A pin-like offset 217b on the follower 217 engages one of the four index notches on the post 116. The notches allow selective positioning of the follower 217, so it can engage the three cams or be positioned away from the cams when it is to be inoperative. The follower 217 has an offset handle 217c. The handle is gripped when moving the follower. Since the shaft 118 revolves when the carriage M is in motion, the cam J revolves, and when the cam follower 217 is indexed to engage the cam J, a vertical reciprocating motion is made when the arm 117 is lightly held downwardly, thus causing the marker 14c to make intermittent markings.

An illuminating light bulb 218 is supported by the frame 113 as shown in FIGS. 24 and 39. A small light screen 219 may be made of polarizing material such as "Polaroid." The screen 219 is fastened to the light 218 to reduce the intensity of the light rays where the scale image and crossed hairs image is reflecting from the drawing surface. The grain of the screen 219 is turned differently from the grain in the screen 206 when the screen 206 is in registry, so that few light rays from the screen 219 are reflected to the operator.

When curved lines are to be drawn, the curve guide or template 221 is engaged and followed with the contour follower 220 (see FIGS. 24, 37, and 51). The upper end of the round shaft 220a is pressed into a hole in the post 116. An offset on the shaft prevents it from turning. The follower 220 is pressed onto the lower portion of the shaft 220a. The follower 220 has a square hole which fits tightly to a squared lower portion of the shaft 220a, thus preventing the follower from turning. The shaft 220a is resilient, its ends are split and widened so the splits can be sprung closed to fit tightly to the holes. The scale image and the crossed hairs image are projected under the follower 220. The follower 220 would be removed when it is not being used.

The follower 220 prevents the curve guide 221 from cutting into the marker 14c. The follower 220 maintains a constant distance from the center of the marker 14c to the edge of curve guide 221. The follower 220 allows the operator to easily and accurately make dotted or intermittent curved lines. In making dotted or intermittent lines while following a curved guide 221, it is necessary to have the follower 220 continuously maintain contact with guide 221 while the marker 14c is raised to allow the making of the gaps in the intermittent lines. Without the follower 220, the sloping surfaces of the marker 14c would offer insecure contact with guide 221, at various pivot angles, because the stylus 14c would revolve against the guide 221, thus grinding the stylus against the guide.

When the carriage M is used to draw lettering, very small circles, ellipses, standard symbols, and the like, with thin plastic guides, it would be imposible to follow these guides with the contour follower 220, so the contour follower 222 is used with small guides 223 (see FIGS. 24, 28, and 39). Follower 222 has a needle-like lower portion which bears against the guide 223. The follower 222 is fastened to the sliding shaft 224 with a machine screw. The follower 222 may be pivoted upwards as indicated by the position 222a when it interferes with a guide 221 and the like. The shaft 224 slides in and is supported by the framework 113. A flange 224a on shaft 224 has a helical spring 225 bearing against it, tending to raise it. A lever yoke 226 has one end hinged to frame 113. The yoke bears against the flange 224a.

The yoke 226 has a cable 227 fastened to it which extends to the lever 228 on the frame post 116. Lever 228 has a jaw at the other end which engages an offset 117a on arm 117. When arm 117 is lowered, follower 222 is lowered also through the action of the coupling mechanism. Thus, the tip of follower 222 is lowered to recesses in the guide 223 when required, and it rises automatically when the arm 117 is raised. This allows the operator to hold the pivot control Y with one hand and the guide 223 with the other hand. The cable 227 is rigged around the pin 229.

When the carriage M is used with beam G as a beam compass as described earlier, it would be to advantage to be able to mechanically hold down the arm 117 with a constant pressure. The resilient holddown 230 can be set after the arm 117 is lowered, so that holddown 230 bears against the top of offset 117a, holding the arm 117 down. The holddown 230 has an offset handle that is gripped to pull or push the holddown laterally to allow it to engage or disengage the offset 117a. When using the holddown 230, the operator's hands are free to control other parts of the machine. The holddown 230 may be used when drawing long lines, especially in a template or fabricating shop.

Since the carriage M may be used to draw a line while it is also controlling one or more other carriages to draw portions of identical sketches or portions of a pair of sketches, there is a switching means on the carriage M to allow the operator to change the engagement to the chains 57 and 58, to allow the making of identical marking movements or opposite movements with a secondary carriage. The switching means allows declutching of the chains to prevent movement of the chains when only the carriage M is to be moved. Engaging and disengaging chains 57 and 58 from operating with carriage M can be quickly done by depressing a key 231a or a key 231b which tilts a rocker 231 (see FIGS. 28, 30, 33, 34, 54a, 54b, and 55).

The catch or clutch 232 slides in a slot in framework 113. A bridge 113a is inserted and fastened to frame 113 to support the clutch 232. The clutch 232 has a steeply threaded shank 232a. The shank 232a projects through plain holes in framework 113. The other end of the clutch 232 is rectangular.

The rocker 231 is threaded to fit the shank 232a. The rocker 231 is held in position by a yoke formed by the framework 113. The rocker 231 is pivoted by depressing the key 231a. The action causes the clutch 232 to move laterally, to force the movement chain 57 against the resilient clutch block 233a. Thus the chain 57 can be locked to carriage M so any movement of the carriage M along the beam 53 moves the chain 57. Opposite movements of the chain 57 can be had by switching. The rocker 231 is switched by pivoting in the opposite direction by depressing the key 231b to the position as shown in FIG. 54b. This action moves the clutch 232 to force the opposite chain portion 57 against clutch block 233b, locking it. In FIG. 34, the clutch 232 is shown in a neutral position with neither right or left portion of the chain 57 being locked to the carriage M. The neutral positioning of the keys 231a and 231b is shown in FIG. 54a. Each of the keys 231a and 231b has a finger-like lock 231c that springs out and bears against the top of the frame 113 when a key is raised as shown in FIG. 55. The keys are resilient to allow them to be bent outwardly away from the high offset of frame 113, to disengage the lock 231c so the key may be depressed.

There is a clutching means on the carriage M that is automatically engaged and disengaged from the pivot chain 58 in response to the same action of keys 231a and 231b that operates the clutch 232 to engage and disengage the chain 57. The rocker 234 is connected to the framework 113 with the pin 235 and to clutch shank 232a with the pin 236 (see FIGS. 25, 28, 33, 34, and 29, also see FIGS. 53, 53a, and 53b for details of the rocker 234). When a key 231a or 231b is depressed, the rocker 234 is pivoted. The rocker 234 controls the clutch for engaging or disengaging the chain 58.

A sprocket 237 is welded to the arm 117. The sprocket is centered about the shaft 118, but it does not touch the shaft 118 (see FIGS. 28 and 37). A chain 238 connects the sprocket 237 with a sprocket 239. The sprocket 239 is supported on framework 113 and revolves with the shaft 240 to which it is fastened with a pin. The chain 58 is looped around the sprocket 241 and it is held in position by the idler sprockets 242a and 242b (see FIGS. 28, 31, 24, 37, and 52). The upper portion of the sprocket 241 has a conical shape. The lower portion of the sprocket 241 has a counterbored hole to form a cavity for a helical spring 243. The shaft 240 has a wide thin flange on the bottom. The upper surface of the flange on shaft 240 has a resilient pad of rubber cemented to it. The sprocket 241 tends to rise slightly above the flange on shaft 240 due to the force of the spring 243. When the rocker 234 is in the neutral position, as shown (see FIG. 31), chain 58 is disengaged from acting with movements of the carriage M. When the tapered hole in rocker 234 is centered with the shaft 240 and the sprocket 241, the rocker 234 is in the neutral position. When the rocker 234 is pivoted, its end moves so that a narrow end of the tapered hole in the rocker 234 moves into a position above the sprocket 241. The tapered depth of the hole has the same slope as the upper portion of the sprocket 241, as rocker 234 moves into position, the sprocket 241 is forced down so its bottom bears against the resilient surface of the flange on the shaft 240, thus clutching or engaging these surfaces. Therefore when the arm 117 pivots, sprocket 237 pivots and the chain 238 turns the sprocket 239, the latter turning shaft 240 which turns sprocket 241, thus chains 57 and 58 act in unison, as both are either in neutral or engaged.

The modification shown in FIG. 58 has a gear 141a keyed to a modified pivot arm 117b. An arm extension 117c is keyed to the lower portion of arm 117b. A tubular guide 301 is keyed to the extension 117c. The guide 301 has a rectangular hole through its center. A ruling pen 302 has a rectangular upper shaft that fits into the hole in the guide 301. A set screw holds the pen to the guide. The pen 302 may have a piece of felt 303 positioned between its blades. The felt 303 is saturated with thin ink to allow the marker to be used continuously for long periods without delays for filling the pen with ink. The felt 303 may be fed with the wick 304 from an ink source in the reservoir 305. A double pen-like unit PP, that is similar to pen 302, and similar to a conventional pen for simultaneously drawing two lines to indicate a railroad track, may be used in place of the pen 302. The double pen PP is shown in FIGS. 95 and 96. It is described in detail further on.

The individual blades of the pen 302 and the blades of the double pen PP may be used without ink to score lines of selective width by pressing against transparent drawing paper that has carbon paper below it with the carbon side up and marking the paper.

*Secondary carriage "C"*

The secondary carriage C is shown by FIGS. 65 to 81. The main framework part 244 is supported by three flanged wheels 245a, 245b, and 245c which ride on the edges of the beam 59. The arm Ea pivots in response to pivotal movements of arm E on carriage M. The pivot arm frame 246 is fastened to the framework 244 and is supported thereby through pins 247 and 248. The arm 246 may be pivoted 270 degrees. The arm Ea has a holder 249 which is similar to the stylus marker holder 120. Parts noted with the suffix "p" in FIG. 74 are identical to the like marks without the suffix, that are shown on carriage M in FIGS. 37 and 59. The marker or stylus 14d is identical to the stylii 14c.

The shaft 250 is keyed to the shaft 254 with a pin. A bevel gear 251 is fastened to the shaft 250 with a set screw. A reversible motor 252 has a bevel gear 253 fastened to it. The motor 252 is coupled to rotate the shaft 254, and thus the marker 14d.

A spring 255 keeps the arm 246 in a raised position, except when a downward force is applied. A pair of electromagnets 256 are fastened to the framework 244. The magnets are activated in response to the downward movement of the arm E on the carriage M. When the magnets 256 are activated, they pull down the arm 246 as there is an iron plate 257 fastened to the spring 257a which is attached to the pin 247. The spring 257a maintains tension to hold the arm 246 down so the stylus 14d maintains contact with the drawing paper. The marker on carriage C can be taken out of play by switching off the current to its magnets at the control K.

The operator controls the carriage C with the control movements of the carriage M and the control K, except when it is necessary to use the chain clutching and switching mechanism of the carriage C. When using four carriages, and only carriage C is to be uncoupled from the chains or be reversely coupled to the chains, the chain clutching and switching mechanism on the carriage C would be used. This clutching mechanism is similar to that on the carriage M. The chain 64 pulls the carriage C along the beam H. The keys 269 and 270 are like keys 231a and 231b. The clutch 271 is similar to the clutch 232. The arm Ea is pivoted in response to pivotal movements of the carriage M, as the pivot chain 65 is coupled to the carriage C with a coupling arrangement similar to that on the carriage M. The chain 258 engages the sprockets 259 and 260.

The arrangement shown in FIGS. 72a and 73a is similar to the arrangements shown in FIGS. 31 and 52. The sprocket 259 is keyed to an offset on arm 246 with a set screw. The sprocket 260 is keyed to the shaft 261. The sprocket 262 is mounted on the shaft 261, but not keyed to it. A rocker 263 is like rocker 234. The spring 264 is like spring 243. Idler sprockets 265, 266, and 267 along with guide 268 are used to rig the chain 65 so that it engages the sprocket 262. When the carriage C is positioned on the beam H, as shown in FIG. 11, the chain 65 is rigged as shown in FIG. 73a to obtain a workable pivot movement for that arrangement of the carriages C and M. When the carriage C is positioned as shown in FIG. 83, the pivot chain 58 is rigged as shown in FIG. 73b. Since carriage BR is like carriage C, when carriage BR is positioned on beam G, it would be rigged to chain 58 with the arrangement shown in FIG. 73b.

FIGS. 76 to 80 show the operation of the automatic feeding arrangement for stylus 14d or a liquid stylus like stylus 25g shown in FIG. 59. This feeding mechanism for the carriage C is similar to the feeding mechanism on carriage M. The mechanism on carriage C differs in that the drive is from the top of the arm Ea. The shaft 254 is similar to the shaft 124. It differs in that shaft 254 has an eccentric cam 254a on its lower outside portion, as shown in FIG. 78a. The cam 254a is part of the automatic stylus feeder. The elements 272 to 276 in FIGS. 78a to FIG. 80b inclusive are the equivalents of an operate similar to elements 129 to 133 respectively, in FIG. 63a and FIG. 63b.

The modified marking means shown in FIGS. 66a and 67 is a selective airbrush marker. This marker would allow the making of inked lines of selective uniform width in any direction with a single pivot angle setting of the arm Ea. This marker would therefore be useful for free hand lettering and with small template guides 223. Since this marking mechanism does not touch the drawing surface, it is an improvement over pen points. Pen points snag the drawing fibers where erasures have been made, causing the ink to run sideways forming ragged lines, furthermore the ink on pen points accumulates dirt from the drawing which broadens the point of contact and the lines.

FIG. 66a is an enlarged sectional elevational view taken through the lower portion of a modified arm Ea and the adjacent portion of the carriage C. There is a guide 301 and shaft 220a. The marker support 306 is attached to the framework 244 with a machine screw. The tube 307 pivots on the shaft 220a. The turret hub 308 is keyed to the tube 307. A tight fitting collar 309 holds the tube 307 and the hub 308 in place. A follower 220, shown in phantom dot-dash outline, may be attached to the bottom of the shaft 220a. The follower 220 would be used when carriage C is mounted on beam G and the marker on carriage C is used to trace over a preliminary drawing while the marker on carriage M is used to make a fine reproduction. The turret diaphragm 310 is pressed and snapped onto the hub 308. The airbrush nozzle 311 is attached to the support 306 with a machine screw. The gear 312 is keyed to the tube 307. The gear 313 rotates on the shaft 314. The coupler 315 is welded to the gear 313. The hole in guide 301 engages the coupler 315. The control cable 316 is supported by the coupler 315. The lower end of the cable 316 is attached to the nozzle 311. The plunger 316a of the control cable 316 bears against an offset on the guide 301. The control cable 316 is like a camera shutter release cable. It has a flexible tube which houses a flexible slidable cable, a plunger is depressed to project the cable further through the tube so the other end projects further to activate a mechanism. A spring resets the cable after the pressure on the plunger is released.

The turret 310 has six major pivot angle directional zones which correspond to the six zones 168 and 169 shown on carriage M in FIG. 25. Two of these zones are indicated in FIG. 67 as zones 317a and 317b. The six zones are similar to zones illustrated in FIG. 68. There are four holes that vary in size in each of the zones of the turret 310. These holes correspond to every other notch 172e in a cam slot in the cam 172 shown in FIG. 25. Thus there are four different sized holes to allow the making of four different width lines with the airbrush. The turret 310 may be modified to allow seven different sizes of holes to work in conjunction with the seven notches in a cam slot. The top of the cable plunger 316a is depressed when the arm Ea is lowered. This action projects the cable 316 to an extent against a valve in the nozzle 311, forcing the nozzle to open to allow ink to spray out through one of the holes in the turret 110. The nozzle 311 and the control plunger 316a each have a spring to cause them to reset to their original settings when the arm Ea is raised. When the arm Ea is pivoted to a selective position to allow the marker to form a selective width line, the turret 310 is pivoted to bring into registry a diaphragm opening the turret that is the size to control the spray width to form the proper line width. A resilient waterproof gasket on the tip of nozzle 311 would bear against the top of the turret 310. The tube 318 would carry the flow of ink and air from the airbrush 319 which is fastened to the frame 244. The location of the airbrush 319 is shown in FIG. 69. When drawing sketches with two different colored lines with such an arrangement as was described previously, the airbrush 319 on carriage C would be filled with a different colored ink from that in the airbrush on the carriage M. The airbrush nozzle 311 and its relationship with other parts of carriage M is shown in FIG. 86.

The modified marking means shown in FIG. 66b is a selective light-beam marker. The mounting mechanism is like that for the airbrush marker shown in FIG. 66a and FIG. 67. The light-beam unit 320 and a power source are used in place of the nozzle 311 and the airbrush 319. The unit 320 has a small electric light bulb and it may have a lens to concentrate the light. This light-beam marker would allow the making of lines on a sensitized sheet that would be equal to inked lines for making reproductions. The sensitized sheets may be coated with silver photographic solution or the like. The sensitized sheet may be like the "Xerography" process, using the light beam to change the polarity of carbon to form the reproduction image. The light-beam type marker would be most useful when tracing over a blueprint of a preliminary drawing with a pencil or pen marker on the carriage M, while the light beam marker on carriage C acts as a follow-up element that marks the sensitized sheet. With such usage, the marker on carriage M acts primarily as a guiding element to follow the sketch lines and to mark off the lines on the print as they are traced. The sensitized sheet would be shielded from other than the light of the light-beam marker. The control cable 316 is attached to a switch on the light-beam unit 320, when the arm Ea is lowered the switch would turn on the marking light. The different sized holes in the turret 310 would regulate the diameter of the light-beam that is projected onto the sensitized drawing surface.

Drawings with various colored lines may be made easily and quickly with the light-beam marker projecting different colors onto a color sensitized photographic sheet. A color turret 321 would be snapped onto the hub 308 replacing the turret 310. The turret 321 is shown in FIG. 68. The turret 321 is opaque except for the spaced, round, translucent colored filters. The turret 321 may be made of colored film, which has stiff transparent plastic backing. The turret 321 has three pairs of color zones that correspond to the six zones 168 and 169 shown in FIG. 25. Each zone has four different sized filtered diaphragm openings. Zones 322a and 322b have blue filters, zones 323a and 323b have red filters and zones 324a and 324b have green filters. Therefore, this marker on carriage C may be used to make four different widths of lines with each of the three different colors. Such markers may be used to draw lines that contrast with each other by being different in width, by being different in color, or by being different both in width and color. Color turrets with different colors from those of turret 321 may be interchanged with turret 321. Since different colored lines on a drawing would furnish contrast, lines may all be the same width, the color turret 325, shown in FIG. 75, may be used for such drawing work in place of the turret 321. The turret 325 allows the marker on carriage C to mark with four colors in any direction when the arm E on carriage M is only pivoted to ninety degrees, which is useful when carriage M and carriage BR are working in close relationship. The turret 325 may also be used when pivoting 270°. The turret 325 has three pairs of directional zones, each zone having four equal sized differently colored filtered diaphragm openings. The colors may be blue, red, green and brown. The zones are 325a, 325b, 325c, 325d, 325e, and 325f. When lines of different widths are to be made with this arrangement, the operator may vary the light with a rheostat attached to the control K. Most colored engineering drawings would be suitable when made with three or four colors. When more colors are needed, a modified turret may be used similar to turret 325 but with seven colors. The colors would correspond to the seven notches in a slot on the cam 172, shown in FIG. 25.

Light beam type markers such as shown in FIG. 66b may be used to burn or scorch lines on a drawing surface. The condenser lenses would concentrate the light so the heat would scorch the paper.

The modification shown in FIG. 81 has an inflammable gas torch 326. Such a torch may be used to burn and cut steel, also for brazing and welding. The arrangement is similar to that of the airbrush shown in FIG. 66a. The turret 327 may be used to provide different openings to control the width of the gas flow and thus the width of the torch flame. The fuel tanks for the torch 326 may be mounted in place of the airbrush 319.

*Electrical control system*

FIG. 82 shows a wiring diagram for the graphic machine.

The electric power source 279 is connected to the machine with a plug 280a. The switches 281a and 281b can turn off the light bulbs. The rheostat 282 controls the speed of the motors. The switch 283b is shown open to make the lock V inoperative. The commutator 296 and/or reversing switch 284 control all the motors. The commutator 296 is keyed to the cam 172. The reversing switch 284 may be located on arm Y so that it may be manipulated by the operator's index finger.

The reversing switch 284 is used when operating the carriage BR closely to the carriage M and pivoting the carriage pivot arms to not more than ninety degrees. When the carriages pivot arms are being used, fully to pivot up to 270°, the commutator 296 is used to automatically reverse the motors as the result of pivoting of pivot arm 117 to predetermined zones. The contact brush set 297 is fastened to the hand rest 183 (see FIG. 24). Zones on commutator 296 and cam 172 are marked 298a, b and c, which correspond to pivot angle zones 168a, b, and c (see FIG. 25), and 299a, b, and c which correspond to pivot angles 169a, b, and c.

Manually operated switch 300 connects the power lines and the lines to the motor to either manual reversing switch 284 or to commutator 296.

The commutator 296 which activates the motors is controlled by pivoting the pivot arm 117 to a selected zone 168a, b, c, or 169a, b, or c. The arrow shown in the segment of each zone indicates the direction of travel of the carriage with the automatic powered movement when pivot arm 117 is lowered within that segmental zone.

Numerals 286a, 286b, 286c, and 280b, 280c, and 280d denote plugs. Numerals 287a, 287b, 283b and 287c denote switches. The jack R (see FIGS. 24, 37, and 82) has four contact fingers or prongs 288a, b, c, and d. The jack R is shown as it would be when the pivot arm 117 is in the raised position. The collar 144 on the arm 118 does not depress the energized prong 288b. The prong 288b bears against the prong 288a which carries current to the prong 291c on the jack of the lock V.

FIG. 57 shows an electrically powered lock V which is electrically controlled by lowering and raising the arm 117. The lock V rocks the lever part 178 and this action tilts the rocker 179 which engages the cam 172, thus locking the machine to a selective setting for drawing a line.

FIG. 82 shows the lock V in circuit relationship with other elements. The lock V is used only when the lever 177 is swung aside from the shaft 118 and the collar 144, the lever 177 being for manual operation only. The jack of lock V has prongs 291a, b, c, and d. The lock V has a pair of electromagnets 289a which are supported by a bent plate 290. The plate 290 is supported by the frame part 115. The magnets 289b are supported by the frame part 115. The part 178a of the lever 178 breaks the contact between the prongs 291c and 291d when the magnet 289b pulls lever part 178 down. When the arm 117 pulls the collar 144 down slightly, it breaks the contact between the prong 288b and the prong 288a, and the prong 288b contacts the prong 288c. The prong 288c completes a circuit through the prong 291b, 291a, and the pair of magnets 289a. The pair of magnets 289a pull the lever part 178 up as an armature and as the latter nears the magnet 289a, the lever part 178a bends the prong 291a, breaking the circuit. When the prong 288b contacts the prong 288c, a circuit is completed to energize the motors. When the collar 144 is pushed down further by the arm 117, the prong 288b contacts the prong 288d in addition to being in contact with the prong 288c. The contact element on the prong 288d completes a circuit through magnets 256 on carriages C, BR and BL. This action pulls the pivot arms down on the carriages C, BR, and BL so that the marker stylus touches the drawing paper or workable surface. Arm 117 and collar 144 may be raised slightly from the marking position to break the contact between the prong 288b and the prong 288d, but not to the extent to allow contact arm 288b to break with contact arm 288c. Dotted lines can be made without breaking the locking setup as the electric controls are synchronized with the mechanisms. Switches, plugs, and rheostats may be mounted at the control board K so that the left hand can be used to operate these parts along with the protractor controls L, while the right hand is operating carriage M. Rheostat 282 and switch 284 may be operated by foot controlled pedals.

*Drafting machine assemblies*

The subcombination shown in FIG. 83 would be a highly practical graphic machine suitable for use in a wide field of engineering-drafting work and the like. Such a machine may be small, light in weight, low in cost and be adaptable to existing drawing boards. For example, a machine that covers a drawing area of one foot square and that can be shifted to new positions to cover all of the area of a drawing having a much greater area, would be most suitable for drawings that consist of many small sketches. A fixed object such as a drawing board 292 has a common type of drafting machine arm 293 fastened rigidly to it. The graphic machine is fastened to the arm 293 with two pins so there is a hinged engagement. The board 108, the beam H, and diaphragms D are omitted. The legs 37 are folded up from the frame. The protractor P bears on the board 292. The drawing is fastened to the board 292 or the board surface is marked. After the graphic machine is used in a given position to draw a sketch, it is moved over the board 292 to position it for making another sketch. The arm 293 is a parallelogram that allows the graphic machine to be moved over the drawing surface without the machine tilting out of alignment. The frame F rotates in its relationship with the protractor P when drawing sloping lines. Four carriages are shown on the beam G. One or more carriages may be used. The graphic machine arrangement is more useful than common drafting machines that have an L-shaped square and small protractor attached to an arm like arm 293, because the present graphic machine protractor is much greater in proportion, which allows extremely accurate positioning for drawing sloping lines. In addition the machine allows much sketching without shifting; furthermore, one or more markers may be used simultaneously.

The subcombination shown in FIG. 84 is similar to that shown in FIG. 83. This modification is lighter in weight and it can be tilted to various drawing positions more rapidly. It does not have a protractor P to obstruct and reduce the working area within the frame F, therefore it allows the operator to work over a larger area of a drawing from one position of the machine, than can be done with a machine of equal size as shown in FIG. 83. The corners of the frame F are supported by props 36h. A prop 36h is shown clearly in FIG. 23.

The arrangement shown in FIG. 84 has an indexing arm means to quickly obtain right and left hand sets of angles or slopes with one indexed setting. In addition, this indexed setting can be maintained while the machine is being used in non-tilted positions for drawing horizontal and vertical lines. These features are needed to allow structural steel detail draftsmen to speedily draw X-type framing that is found in bridgework, bracing, tower work, roof trusses, and the like, because the protractor P would require more time and effort for the work because it has the disadvantage of requiring two index settings to obtain right and left hand sets of slopes. The drawing board or workable surface 292a is similar to board 292. The drafting machine arm 294 is similar to the arm 293. The arm 294 has attached to it a common drafting machine protractor 294a.

An index arm ND on the frame F allows the operator to selectively tilt the frame F against the raised hinged straight edge 292b to position it for drawing left and right hand sets of sloping lines. The clutch on the protractor 294a is disengaged while the machine is being tilted with the index arm ND. After the machine has been tilted to a position, the protractor clutch may be reengaged so the machine may be moved away from the straight edge 292b. The arm 294 keeps the machine in alignment with the drawing. The clutch on the protractor 294a is kept disengaged when the machine is to be kept in engagement with the straight edge 292b. The index arm ND works in conjunction with the protractor-clamps 295a, 295b, and 295c, together with the raised hinged straight edge 292b of the board 292a to obtain selective sets of tilted and non-tilted positions. The principles of this indexing means is shown and described fully in my Patent No. 2,882,604.

Any two of the protractor-clamps 295a, 295b, or 295c may be brought to bear against the raised hinged straight edge 292b or the like straight edge 292c of the board 292a to obtain selective tilted and non-tilted positions. The index arm ND may have one or more selective index settings, each of which can be indexed to tilt the machine to form a different set of slopes and set of slopes that are opposites; that is, a right and a left set of slopes, each of the right and left sets having two slopes that are at right angles to each other. The graphic machine is rocked to a position like position F1 to position it to give the opposite or left set of slopes. The position F1 is indicated by a fragmentary phantom dot-dash outline. There is a retractable index pin in the clamp 295c on the index arm ND that fixes the tilted setting of the graphic machine when the pin bears against the raised straight edge 292b. The pin is retracted to allow the clamps 295a and 295b to be pushed against the straight edge 292b to obtain a non-tilted position for the graphic machine. The index arm ND has a hinged connection that allows it to be pivoted upwards to disengage the index pin from the straight edge 292b. The arm ND can be pivoted upwards to a further degree and be unhooked from the frame F. The index arm ND is shown positioned adjacent to the control K and to the protractor 294a, therefore these three mechanisms may be controlled readily with the operator's left hand. The index arm ND may be unfastened from that position and be fastened to any of the other sides of the frame F, two such positions are indicated by the dot-dash phantom outlines NE and NF. This selective positioning of the arm ND allows different edges of the frame F to be brought into close relationship with the straight edge 292b or the like straight edge 292c. The protractor-clamps bearing against the straight edge 292b or the like, may be clamped to the edge to allow the graphic machine to be held in perfect alignment with the edge. The clamps may loosely engage the straight edge 292b to allow the graphic machine to be slid along the straight edge 292b. The clamps have tightening means that can be adjusted to prevent the clamps and thus the machine from sliding. The clamps 295a and 295b and 295c on the machine may be brought into non-gripping engagement with the straight edge 292b to tilt and align the machine. The clamps may be mechanically self-coupled to the straight edge 292b, or the clamps may have permanent magnetic parts that may be clamped to an iron wire in the contact edge of the straight edge 292b. The clamps 295a, 295b and the like may be quickly attached to any or all of the holes in the offsets on the corners of the frame F. These clamps 295a and 295b may be omitted, the corner props 36h, shown in FIG. 23, being made to bear against the straight edge 292b. The powerful permanent magnets 36m in the props 36h act as clamps and bearing plates when they engage the iron wire in the straight edge 292b.

The frame F may be used without the arm 294 when the area to be sketched can be reached by the frame F while the frame is engaged to the straight edge 292b, the straight edge 292c or the like. This arrangement is most suitable with larger graphic machines. Small graphic machines may be used for much work without the arm ND and the clamps, the arm 294 and its protractor 294a being the means to position frame F. The protractor 294a being small cannot be set as accurately as the protractor P can be set, but the small protractor is highly practical for use on much drafting work.

The modification shown in FIG. 85 has the graphic machine engaged to a rigid member 331 whose surface is to be marked. The graphic machine and the member 331 may be tilted so the pair of wheels 332 bear firmly against the edge of the member 331, so the machine is kept in alignment with the member 331. The member 331 may consist of two steel plates tack welded together so they can be simultaneously marked for fabrication. The upper and lower surfaces of member 331 may be marked alike or they may be marked to obtain a pair having left and right markings. The member 331 may be a long template or drawing mounted on a stiff board. The member 331 may be a wide flange steel beam, the upper and lower surfaces being the beam flanges that are to be marked for fabrication or be drilled without the marking operation. The graphic machine may be used to mark the member 331 locally then be moved along the member 331 to the next area on it to be marked. The graphic machine may be restrained from moving along the member 331, the member 331 being movable in its relationship to the graphic machine. The arrangement shown in FIG. 85 may be used without having the beam H and its supplementary parts attached to it.

FIGS. 86 to 91 inclusive show some marking devices and tools that are graphically guided by the graphic machine in response to controls of carriage M. The marking devices and tools are shown on the carriage M. These types of devices may also be attached to the secondary carriages BR, BL, and C.

FIG. 86 shows an arrangement with an airbrush nozzle 311 on the carriage M. This arrangement is the reverse of the arrangement shown in FIG. 66a for the carriage C.

FIG. 87 shows a light-beam marker 320 on the carriage M. This arrangement is the reverse of the arrangement shown in FIG. 66b for the carriage C.

FIG. 88 shows a gas fed torch 326 on the carriage M. This arrangement is the reverse of the arrangement shown in FIG. 81 for the carriage C.

FIG. 89 shows a geared rotating marking device 333 embodying a drill 334 for making indentation-like marks similar to those made by a center-punch. Such center-punch markings are made on structural steel to outline fabricating operations, including the marking of centers of holes to be punched or drilled and the outlines of cuts to be made. The drill may also be used for making the finished holes, thus eliminating the actual marking operations on the piece. The play or lag in the arm E that allows the arm to be lifted to an extent without shifting the machine into neutral, allows the drill to be used to make a series of spaced holes along a line. The chucks 335 shown in FIGS. 89 and 90 are useful to hold other marking devices and tools.

FIG. 90 shows an arrangement with a geared unit 336 that has a marking or cutting wheel 337 which may be used with the machine.

FIG. 91 shows an arrangement for a tracer or follower 338 which is useful for following the contour of a template or sketch to guide markers on other carriages. The follower 338 may be used most effectively when it is mounted like the pen 302 is mounted as shown in FIG. 58.

Other types of markers and guided tools may be used on the carriages of the graphic machine, such as an electrode holding tool for electric welding, also markers and tools such as shown in my Patent No. 2,701,417.

A modification is shown in FIGS. 92, 93, and 94. It has a modified beam 341 that has means to act effectively to support and position the carriages without the need for a shaft T. The beam 341 has the essential elements to allow it to act as a combined beam and a shaft, thus it may be used in place of the beam G and the shaft T. The beam 341 is a rigid cylindrical metal tube whose outer surface has gear teeth. Its transverse cross section is like that of a pinion gear or pinion rod, thus it can act as a gear. There are grooves cut around the surface of the beam 341 to shape the teeth so the teeth on the surface of the beam form a gear rack. The gear rack feature does the functions of the beam rack teeth 53a that it replaces. The ends of the beam 341 are coupled to the racks 41 with gears as shown in FIG. 93. The beam 341 is more suitable for a small graphic machine than are the shaft T and the beam G, as it would be more compact, lighter in weight. It would be effective in resisting forces that tended to bend or twist it. The beam 341 could be made of aluminum alloy or other alloys. The beam 341 would be unsuitable for machines requiring extremely long beams, as such long beams must be wide to resist bending. A long beam 341 with a large diameter would be impractical when compared to beam G and shaft T.

FIG. 92 is a schematic elevational view showing modifications to carriage M to allow the beam 341 to be used with the carriage. Grooved wheels 342 would be used instead of wheels 114. Two additional grooved wheels (not shown) like wheels 342 may be attached to underside of the carriage to better align the carriage with the beam 341, thus allowing the wheels 342 to engage the beam 341 more freely. An idler gear 343 is mounted on offsets of the framework 113. The gear 343 engages the teeth of beam 341 and the teeth on the sliding clutch gear part 165. The idler gears 344, 345, and 346 are supported by offsets on the framework 113 to form a gear train to couple the teeth of the sliding clutch gear part 161 to the teeth on the beam 341. Thus the beam 341 is always geared to the carriage M. The idler gears allow the carriage to be coupled without disturbing the chains 57 and 58. The geared arrangement will give reverse action in response to movements of the arm Y, unless a modified cam 172 is used. The cam would have its slots reversed about the neutral circle 181 shown in FIG. 26.

FIG. 93 shows an arrangement for coupling the ends of the beam 341 to the frame F and to the beam H. FIG. 93 is similar to FIG. 13. Each end of the beam 341 is machined down to fit the holes in the flanged wheels 347 and gears 348. The gears 348 are keyed to the beam 341 with set screws. Each end of the beam 341 has an outrigger 349 attached to it. The outrigger 349 is held in alignment by the collar 350 and the axle 351. The axle 351 fits into the hole in beam 341 and the socket in the outrigger 349. A set screw keys the axle 351 to the outrigger 349. Wheels 50 keep the outrigger 349 from tilting, thus aligning it with the frame F. The outrigger 349 acts like the ends of beam G to support the chain sprockets, the diaphragms D, and thus a beam H.

The secondary carriage BR and the like may be engaged to the beam G by having the carriage equipped with wheels 341. The taut chain 58 restrains the carriages from tilting. The gear 346 maintains its coupled engagement with beam 341 by sliding when the carriage M is moved along the beam 341. As shown in FIGS. 95 and 96, a double pen-like unit PP is a marking means that has two pen markers 358 and 359. The unit PP is mounted on a carriage to allow two parallel lines to be drawn simultaneously. This marking means may be selectively controlled to draw selective width lines similar to the means for operating a single pencil type marker and the like. The unit PP has non-revolving shaft 360 which is used in place of the revolving pencil holder shaft 124 and the like. The head of the shaft 360 has a bayonet fitting to engage the arm E. A spring steel two pronged fork 361 fits into a socket in shaft 360. A set screw 362 keeps the fork 361 in position. Hinge pins 363 are threadably engaged to the fork 361. One prong has right hand threads and the other prong has left hand threads. The pins 363 may be made in two parts with opposite type threads. When the unit PP is assembled, the parts are set so that the forks of the hinge bind the pens tightly when they are positioned as shown in FIG. 96. Either or both pens may be pivoted out of play as indicated by the dot-dash outlines. There is a lug on each pen to allow the operator's finger to bear to push and pivot a pen out of play. The threaded hinge action would ease the pressure on the pens as they are pivoted out of play.

The adjusting screw 364 has a right hand and a left hand threaded engagement to the prongs of fork 361. A finger wheel on screw 364 is turned to vary the spread of the prongs on the fork 361 and thus selectively vary the distance between the pens 358 and 359. The distance between the parallel lines drawn with pens 358 and 359 may be selectively varied by selectively varying the pivot angle position of arm E. The forked pens 358 and 359 are made of spring steel. The widths of lines to be drawn may be selectively varied by adjusting the set screws 365 to selectively vary the distance between each set of pen blades. The pens 358 and 359 may be automatically fed with wicks 366 and 367. Wick fed pens may have felt 368 and the like between the blades to carry the ink to the drawing surface. The pen blades confine the felt 368. The wicks may be encased in thin plastic tubing to confine the ink. The pens 358 and 359 may feed different colored inks.

Ink reservoirs 369a and 369b supply the wicks and thus the pens with ink. The reservoirs are filled by removing the screws in their sides. The pair of reservoirs is held in position by a set screw. Thin aniline dyes and the like can be fed by the wicks. Thicker inks may be used without the wicks and felt feeding means. Medicine dropper type reservoirs may be used for thick ink. The constant tilt of the pens 358 and 359 allows the use of long contact edges 370 of the pen blades. The long contact edges 370 are less likely to cut into the drawing than would common tapered blades. The contact edges 370 allow selective variations in line width by varying the pivot angle of arm E.

The outer blades on pens 358 and 359 may have a thin bulged offset to allow these blades to deflect up, to line up with their mating blades to obtain good contact for all blades against the drawing surface, while drawing with the pens and fork variously positioned.

The unit PP may be used without ink to selectively press or score one to four lines simultaneously. The pen blades may each be used as scribers to press a line. A pair of blades may be adjusted tightly together to press a single double thick line. The selectivity for marking includes varying the spread of the pen blades and fork in addition to selectively pivoting of arm E. Transparent drawing paper may be marked by scribing the surface that has a sheet of carbon paper below it with the carbon turned up against the drawing paper. Another sheet of drawing paper with another sheet of carbon placed on it to mark it may be placed below the other carbon paper so that scribing above the top sheet will mark the top side of the bottom sheet of drawing paper. The markers shown in FIGS. 95 and 96 are useful on the master carriage M, also on secondary carriages.

While I have illustrated and described certain specific embodiments of my invention, it will be understood that these are by way of illustration only and that various changes and modifications will be readily suggested to those skilled in the art after having had the benefit of the teachings of the present specification, but which are within the contemplation of the present invention and within the scope of the claims.

For example, while I show magnets for applying motive power for lowering the markers of the secondary carriages, it will be apparent that other power sources may be used instead, such as air or electric motors with limit switches, air or hydraulic power means, etc.

I claim:

1. A drafting and layout machine for marking opposite surfaces of an object means, such as drawings on opposite surfaces of a board or metal sheet, comprising a frame having a large opening to provide access to one of said surfaces, a pair of opposed interconnected beams on opposite sides of said object means and movable laterally in unison so as to sweep over said opening, a main carriage mounted on one of said beams for longitudinal reciprocable movement thereon, means for adjusting the distance between said beams so as to accommodate different thicknesses of objects whose opposite surfaces are to be marked, and a secondary carriage mounted on the other of said beams for longitudinal reciprocable movement thereon and interconnected with said main carriage for simultaneous movement therewith, said carriages including marking elements oppositely disposed on said carriages for marking said opposite surfaces of said object means.

2. An automatic graphic machine comprising a frame, a beam mounted for translating movement across said frame, a carriage mounted on said beam for longitudinal reciprocable movement thereon, a guiding element carried by said carriage, an arm pivoted on said carriage, and means responsive to the extent of pivoting movement of said arm for selectively locking the said carriage to the said beam and allowing free translation movement of said beam or allowing free reciprocable movement of said carriage on said beam and locking said beam to the said frame so as to selectively move said guiding element along a straight path or another straight path at right angles thereto, depending upon the extent of pivoting of said arm, a second carriage having a follow-up element mounted thereon, coupling means for making said second carriage responsive to movements of said first mentioned carriage.

3. An automatic graphic machine as recited in claim 2 wherein said follow-up element comprises a marking element.

4. An automatic graphic machine as recited in claim 2 wherein said follow-up element comprises a tool.

5. An automatic graphic machine as recited in claim 2 together with a template associated with said first mentioned carriage for remotely controlling movements of said second carriage.

6. A layout machine for marking lines to indicate limits of fabricating operations, comprising a beam mounted for translating movement transversely of its longitudinal axis over the surface to be marked, a carriage mounted on said beam for longitudinal reciprocable movement thereon, a marking element and a scale means carried by said carriage, control means mounted on said carriage, said control means including an arm pivotally mounted and means responsive to the extent of pivoting movement of said arm for selectively locking said carriage to the said beam and allowing free translation movement of said beam, or allowing free reciprocable movement of said carriage on said beam and locking of said beam to prevent movement of said beam, so as to selectively draw lines along a straight path or another straight path at right angles thereto, depending upon the extent of pivoting of said arm.

7. A drafting machine comprising a track mounted adjacent a drawing surface to be marked, a beam mounted for translating movement along said track to sweep over the said drawing surface, the longitudinal axis of said beam being perpendicular to the longitudinal axis of said track and parallel to said drawing surface, a carriage mounted on said beam for longitudinal reciprocable movement thereon, a marking element carried by said carriage, control means mounted on said carriage, said marking element responsive to movements of said control means, said control means including an arm pivoted on said carriage, and means responsive to the extent of pivoting movement of said arm for selectively drawing lines of different widths and selectively locking the said carriage to the said beam and allowing free translation movement of said beam or allowing free reciprocable movement of said carriage on said beam and locking said beam to the said track so as to selectively draw lines along a straight path or another straight path at right angles thereto, depending upon the extent of pivoting of said arm.

8. A machine as recited in claim 7 together with means to automatically draw dotted lines in response to another movement of said control means.

9. A machine as recited in claim 7 together with means to project a luminous centering image onto said drawing surface, said image being centered with said marking element, whereby said marking element can be aligned with a predetermined point on the said drawing surface, allowing the operator to draw without having to lean over the said drawing surface to orient the said marker with a starting point.

10. A machine as recited in claim 7, together with a straight edge, said track being tiltably mounted with respect to said straight edge selectively about two bearing points spaced along one side of said track, only one of said bearing points engaging said straight edge when the said track is tilted, said track having an indexing arm means attached to said track, the longitudinal center of said index arm means being parallel to said drawing surface and at right angles to said side of said track, said indexing arm means being positioned equidistantly between said bearing points, said indexing arm means including a pin equidistantly spaced from said bearing points, said pin being engageable with said straight edge and being adjustable to vary the distance between said track and said straight edge for selectively tilting the said track relative to the said straight edge, said track being tiltable in opposite directions by selectively engaging the said bearing points and said pin against said straight edge to obtain opposite sets of sloping positions for the said track to allow the drawing of sets of lines ninety degrees to each other and oppositely sloped.

11. Drafting apparatus comprising a carriage means supporting a marking element, said carriage means including a control mounted to allow movement towards and away from a drawing, said marking element initiating marking said drawing in response to a downward movement of said control and said marking terminating in response to an upward movement of said control, means for preselecting the path of movement of said marking element along a straight path or another straight path at right angles thereof, translucent scale means having at least one scale printed thereon, means for projecting a light beam through said scale means onto the drawing surface adjacent the area being marked by said marking element so as to project an image of said scale means onto said surface, means responsive to lateral movement of said carriage for moving said scale means relative to said light beam, and means for zero setting said scale means in response to lifting of said control, whereby said scale will measure and register the length of a line as it is drawn, starting from a zero point established by the point of initial marking action of the said marking element when forming said line.

12. A drafting machine comprising a track mounted adjacent a drawing surface to be marked, a beam mounted for translating movement along said track to sweep over the said drawing surface, the longitudinal axis of said beam being perpendicular to the longitudinal axis of said track and parallel to said drawing surface, a carriage mounted on said beam for longitudinal reciprocable movement thereon, a marking element carried by said carriage, scale means mounted on said carriage, control means mounted on said carriage, said control means including an arm pivoted on said carriage, and means responsive to the arcuate position of said arm for preselecting the width of line to be drawn and for preselecting the path of movement of said marking element, locking means responsive to downward movement of said control means for locking said carriage to the said beam and allowing free translation movement of said beam, or locking said beam to the said track while allowing free reciprocable movement of said carriage on said beam, to enable drawing of lines of selective width along a straight path or another straight path at right angles thereto, said marking element initiating marking said drawing surface in response to said downward movement of said control means, said scale means including means to automatically measure and register the length of a line as it is drawn, starting from a zero point established by the point of initial marking to form said line.

13. A machine as recited in claim 12 together with means for unlocking said locking means to permit drawing of curved lines, whereby said curved lines may be of said selective width.

14. A drafting machine comprising a track mounted adjacent a drawing surface to be marked, a beam mounted for translating movement along said track to sweep over the said drawing surface, the longitudinal axis of said beam being at right angles to the longitudinal axis of said track and parallel to said drawing surface, a carriage mounted on said beam for longitudinal reciprocable movement thereon, a marking element carried by said carriage, said carriage including a control means, said control means including an arm pivoted on said carriage, and including means pivotally supporting said marking element on said carriage about an axis perpendicular to the said drawing surface, said marking element having a substantially conical tip rotatable about its own axis and being supported at an acute angle with respect to said drawing surface such as to provide line bearing contact therewith along the entire length of the conical surface of said tip, means responsive to pivotal movement of said control arm to pivot the marking element supporting means about said perpendicular axis to vary the width of line, along a straight path or another straight path at right angles thereto, and means for rotating said marking element about its axis, said marking element including matter which is deposited on said drawing surface to form said lines.

15. A machine as recited in claim 14 together with means responsive to the extent of pivotal movement of said arm about said perpendicular axis for selectively locking said carriage to said beam to allow reciprocating movement only between said beam and said track, or to lock said beam to said track to allow reciprocating movement only of said carriage along said beam, whereby lines can be drawn along a straight path or along another straight path at right angles thereto.

16. A machine as recited in claim 15 together with scale means mounted on said carriage, means for zero setting said scale means in response to movement of said control means, said scale means including means to measure the length of a line as it is drawn.

17. An automatic graphic machine for performing fabricating operations comprising a frame, a beam mounted for translating movement across said frame, a carriage mounted on said beam for longitudinal reciprocable movement thereon, a tool carried by said carriage, an arm pivoted on said carriage, and means responsive to the extent of pivoting movement of said arm for selectively locking the said carriage to the said beam and allowing free translation movement of said beam or allowing free reciprocable movement of said carriage on said beam and locking said beam to the said frame so as to selectively guide said tool along a straight path or another straight path at right angles thereto, depending upon the extent of pivoting of said arm.

18. A machine as recited in claim 2 wherein said machine is a layout and drafting machine and wherein said guiding element is a marking element.

19. A machine as recited in claim 1 wherein said coupling means includes switching means for selectively coupling said carriages so that they will move in the same or in opposite directions to each other.

20. A machine as recited in claim 1 wherein said machine is a drafting machine and wherein said follow-up element comprises a marking element having a source of light mounted on said second carriage for emitting a light-beam which is projected on a light sensitive drawing surface, together with means responsive to the extent of pivoting of said arm for selectively varying the area of the said light beam emitted from the said light source to obtain lines of selective width, whereby sharp dense lines for technical drawings can be drawn rapidly with ease.

21. A machine as recited in claim 1 wherein said machine is a drafting machine and wherein said follow-up element comprises a marking means having a source of light and selective color filter means mounted on said second carriage, said source of light emitting a light-beam projecting through said color filter means onto a light sensitive drawing surface comprising photographic color reproduction means, together with means responsive to the extent of pivoting of said arm for selectively varying the color of the said light beam with said color filter means to obtain selective color lines, whereby sharp, different colored lines for technical drawings can be drawn rapidly with ease, thereby providing engineering drawings that can be understood more readily.

22. A machine as recited in claim 1 together with reversible motor means for selectively reciprocating said carriages.

23. Apparatus for making layouts on opposite surfaces of object means, comprising a pair of beams positioned in parallel relationship on opposite sides of said object means to be marked, said beams and said object means being relatively movable transversely of the longitudinal axis of said beams, a carriage movable on each beam, sprocket means at both ends of said beams chained to said carriages, said sprocket means on at least one end of each of said beams being interconnected so that movement of one of said carriages will cause movement of the other said carriage, and relatively inverted marking elements carried by said carriages.

24. Apparatus for guiding tools to perform work on opposite surfaces of object means, comprising a pair of beams positioned in parallel relationship on opposite sides of said object means, said beams and said object means being relatively movable transversely of the longitudinal axis of said beams, a carriage movable on each beam, sprocket means at both ends of said beams chained to said carriages, said sprocket means on at least one end of each of said beams being interconnected so that movement of one of said carriages will cause movement of the other said carriage, and relatively inverted tools carried by said carriages.

25. Apparatus for making layouts on opposite surfaces of object means, comprising a pair of beams positioned in parallel relationship on opposite sides of said object means to be marked, said beams and said object means being relatively movable transversely of the longitudinal axis of said beams, a carriage movable on each beam, sprocket means at both ends of said beams chained to said carriages, said sprocket means on at least one end of each of said beams being interconected so that movement of one of said carriages will cause movement of the other said carriage, and relatively inverted marking elements carried by said carriages, control means mounted on one of said carriages, said control means including an arm pivotally mounted, means responsive to extent of pivotal movement of said arm for selectively locking one of said carriages to one of said beams to allow only relative movement of said beams with said object means, or to prevent relative movement between said beams and said object means to allow movement of only said carriages along said beams, whereby said marking elements can be selectively guided along paths that are at right angles to each other and scale means mounted so as to indicate at least the relative travel movement of one of said carriages along one of said beams.

26. Apparatus for guiding tools to perform work on opposite surfaces of object means, comprising a pair of beams positioned in parallel relationship on opposite sides of said object means to be marked, said beams and said object means being realtively movable transversely of the longitudinal axis of said beams, a carriage movable on each beam, sprocket means at both ends of said beams chained to said carriages, said sprocket means on at least one end of each of said beams being interconnected so that movement of one of said carriages will cause movement of the other said carriage, and relatively inverted tools carried by said carriages, means for adjusting the distance between said beams so as to accommodate different thicknesses of object means, control means mounted on one of said carriages, said control means including an arm pivotally mounted, means responsive to extent of pivotal movement of said arm for selectively locking one of said carriages to one of said beams to allow only relative movement of said beams with said object means, or to prevent relative movement between said beams and said object means to allow movement of only said carriages along said beams, whereby said tools can be selectively guided along paths that are at right angles to each other.

27. An automatic graphic machine comprising a frame, a beam mounted for translating movement across said frame, a carriage mounted on said beam for longitudinal reciprocable movement thereon, a marking element carried by said carriage, an arm pivoted on said carriage, and means responsive to the extent of pivoting movement of said arm for selectively locking the said carriage to the said beam and allowing free translation movement of said beam or allowing free reciprocable movement of said carriage on said beam and locking said beam to the said frame, so as to selectively draw lines along a straight path or another straight path at right angles thereto, depending upon the extent of pivoting of said arm.

28. A machine as recited in claim 27 wherein said machine is a drafting machine for drawing technical diagrams, and wherein said marking element is an airbrush for discharging a liquid spray marking material, means responsive to the extent of pivoting said arm for selectively varying the area of the sprayed liquid emanating from the said air-brush to obtain selective width lines.

29. A drafting machine for drawing technical diagrams, comprising a frame, a beam mounted for translating movement across said frame, a carriage mounted on said beam for longitudinal reciprocable movement thereon, a guiding element carried by said carriage, an arm pivoted on said carriage, and means responsive to the extent of pivoting movement of said arm for selectively locking the said carriage to the said beam and allowing free translation movement of said beam or allowing free reciprocable movement of said carriage on on said beam and locking said beam to the said frame, so as to selectively move said guiding element along a straight path or another straight path at right angles thereto, depending upon the extent of pivoting of said arm, a second carriage having a marking element mounted thereon, coupling means for making said second carriage responsive to movements of said first mentioned carriage, scale means mounted on one of said carriages, and means responsive to the extent of pivoting movement of said arm for selectively varying the width of line drawn by said marking element.

30. A drafting machine comprising a track mounted adjacent a drawing surface to be marked, a beam mounted for translating movement along said track to sweep over said drawing surface, the longitudinal axis of said beam being perpendicular to the longitudinal axis of said track and parallel to said surface, a carriage mounted on said beam for longitudinal reciprocable movement thereon, two marking elements mounted on said carriage including means for drawing lines which contrast with each other, a control means mounted on said carriage, said marking elements being coupled with said control means, means responsive to movements of said control means for initiating marking action of said marking elements, said control means including an arm pivoted on said carriage, means responsive to extent of pivoting movement of said arm for selectively locking the said carriage to said beam and allowing free translation movement of said beam or allowing free reciprocable movement of said carriage on said beam and locking said beam to said track, so as to selectively draw lines along straight paths parallel to said beam or other straight paths at right angles thereto, depending upon the extent of pivoting of said arm, whereby lines of different contrast can be drawn.

31. A machine as recited in claim 30 wherein said means for drawing lines which contrast with each oher consists of means for drawing differently colored lines.

32. A drafting machine comprising a track mounted adjacent a drawing surface to be marked, a beam mounted for translating movement along said track to sweep over said drawing surface, the longitudinal axis of said beam being perpendicular to the longitudinal axis of said track and parallel to said drawing surface, a carriage mounted on said beam for longitudinal reciprocable movement thereon, two marking elements mounted on said carriage, an arm pivoted on said carriage, and means responsive to the extent of pivoting movement of said arm for selectively locking said carriage to said beam and allowing free translation movement of said beam or allowing free reciprocable movement of said carriage on said beam and locking said beam to said track, so as to selectively draw lines along straight paths parallel to said longitudinal axis of said beam or other straight paths at right angles thereto, whereby two lines can simultaneously be drawn.

33. A drafting machine for marking opposite drawing surfaces of drawing board means comprising a track means having two parallel rails, said rails being disposed apart to provide a large opening between said rails for access to one of said surfaces, a pair of opposed interconnected beams on opposite sides of said board means and movable in unison along said track means so as to sweep over said opening, a main carriage mounted on one of said beams for longitudinal reciprocable movement thereon, and a secondary carriage mounted on the other of said beams for longitudinal reciprocable movement thereon and interconnected with said main carriage for simultaneous movement therewith, said carriages including marking elements oppositely disposed on said carriages for marking said opposite surfaces of said board means, said marking elements including means adapted to be activated to cause them to draw lines, and to be deactivated to halt the drawing of lines, a control means mounted on said main carriage, said control means including switching means selectively movable relative to said main carriage, said scale means including means adapted to be activated to cause it to scale and deactivated to stop the scaling action, a scale means mounted on one of said carriages, said scale means interconnected with one of said beams so as to register the distance traveled by said carriage on which it is mounted, said distance traveled including travel of said carriage along said beam on which it is mounted and travel of said beams along said track means, whereby the length of a line being drawn is measured, said scale means and said marking elements interconnected with said control means, said marking elements and said scale means activated and deactivated in response to switching movements of said switching means on said control means, means responsive to switching movements of said switching means on said control means for selectively locking said carriages to said beams and allowing free translation movement of said beams or allowing free reciprocable movement of said carriages on said beams and locking said beams to said track means, so as to selectively draw lines along straight paths parallel to longitudinal axes of said beams or other straight paths at right angles thereto, depending upon the difference of movement of said control.

34. A drafting machine comprising a translucent drawing board means having opposite surfaces to be marked, a track means having two parallel rails mounted adjacent said board means, said rails being disposed apart to provide a large opening between said rails for access to one of said surfaces, a pair of opposed interconnected beams on opposite sides of said drawing board means and movable in unison along said track means so as to sweep over said opening, a main carriage mounted on one of said beams for longitudinal reciprocable movement thereon, and a secondary carriage mounted on the other of said beams for longitudinal reciprocable movement thereon and interconnected with said main carriage for simultaneous movement therewith, said carriages including marking elements oppositely disposed on said carriages for marking said opposite surfaces of said drawing board means, said marking elements including means adapted to be activated to cause them to draw lines and to be deactivated to stop the drawing of lines, a scale means mounted on one of said carriages, said scale means including means adapted to be activated to cause it to scale and deactivated to stop the scaling action, at least one of said marking elements comprising an air brush, a control means mounted on said main carriage, said control means including switching means selectively movable in relationship to said main carriage, said scale means interconnected with one of said beams so as to register the length of a line being drawn, said scale means and said marking elements interconnected with said control means, said marking elements and said scale means activated and deactivated in response to switching movement of said switching means on said control means, means responsive to switching movements of said switching means of said control means for selectively locking said carriages to said beams and allowing free translation movement of said beams or allowing free reciprocable movement of said carriages on said beams and locking said beams to the said track means so as to selectively draw lines along straight paths parallel to the longitudinal axes of said beams or other straight paths at right angles thereto, depending upon the difference of movement of said control.

35. A layout machine for marking lines to indicate limits of fabricating operations, comprising a beam mounted for translating movement transversely of its longitudinal axis over the surface to be marked, two carriages mounted on said beam for reciprocable movement thereon, said carriages being interconnected so that movement of one of said carriages will cause movement of the other said carriage, a marking element carried by each of said carriages, scale means carried by one of said carriages, control means mounted on one of said carriages, said control means including an arm pivotally mounted and means responsive to the extent of pivoting movement of said arm for selectively locking said carriages to said beam and allowing free translation movement of said beam, or allowing free reciprocable movement of said carriage on said beam and locking of said beam to prevent movement of said beam, so as to draw straight lines along paths parallel to said longitudinal axis of said beam or along paths at right angles thereto, depending upon the extent of pivoting of said arm.

36. A drafting machine for making technical diagrams, comprising a frame, a beam means mounted for translating movement across said frame, said beam means including gear means at the ends thereof, said beam means including coupling means to couple said gear means so they rotate together, said frame having a pair of racks in parallel relationship to form a track for said beam means, said racks being in geared relationship with said gear means, said beam means including rack means along its longitudinal axis, a carriage mounted on said beam means for longitudinal reciprocable movement thereon, said carriage including gear means coupled to said rack means on said beam means and said gear means on said beam means, a marking element carried by said carriage, control means mounted on said carriage and including an arm pivoted on said carriage, means responsive to the extent of pivoting movement of said arm for selectively locking the said carriage to the said beam means and allowing free translation movement of said beam means or allowing free reciprocable movement of said carriage on said beam means and locking said beam means to the said frame so as to selectively draw lines along a straight path or another straight path at right angles thereto, depending upon the extent of pivoting of said arm, scale means mounted on said carriage for registering the travel movement of said carriage when said machine is selectively locked for movement along straight paths, said scale means including means to interconnect and rotate with said gear means on said carriage, said interconnecting of said scale means being in response to a different movement of said control means, whereby said scale means can accurately measure and register the distance traveled by said carriage when drawing a straight line, said scale means including means for zero setting so the scale means will start to measure simultaneously with the starting of drawing of a straight line.

37. A machine as recited in claim 36 together with a round protractor means mounted adjacent and concentrically with said frame and interconnected thereto, said protractor means including rotating means for selectively changing the angular relationship between the said frame and the longitudinal axis of the drawing surface to be marked, thereby allowing said carriage to be moved selectively in any direction over said drawing surface to be marked.

38. A machine as recited in claim 36 together with a reversible motor means for selectively reciprocating said carriage on said beam and for reciprocating said beam on said frame, the direction of drive of said reversible motor means being controlled by said pivotal movements of said arm.

39. A machine as recited in claim 36 wherein the said extent of pivoting of said arm effects the drawing of lines of selective width on said drawing surface to be marked.

40. A drafting machine for making technical diagrams, comprising a frame, a beam mounted for translating movement across said frame, a carriage mounted on said beam for longitudinal reciprocable movement thereon, a marking element and a scale means carried by said carriage, manual control means mounted on said carriage, said control means including an arm pivoted on said carriage and means responsive to the extent of pivoting movement of said arm for selectively locking the said carriage to the said beam and allowing free translation movement of said beam or allowing free reciprocable movement of said carriage on said beam and locking said beam to the said frame, so as to selectively draw lines along a straight path or another straight path at right angles thereto, depending upon the extent of pivoting of said arm, said last mentioned means permitting a draftsman to grip said control means and manually propel said carriage along said beam to make said reciprocable movement, or to manually propel said carriage and said beam to make said translation movement.

41. A drafting machine for making technical diagrams, comprising a frame, a beam mounted for translating movement across said frame, a main carriage mounted on said beam for longitudinal reciprocable movement thereon, a guiding element carried by said main carriage, manual control means mounted on said main carriage, said control means including an arm pivoted on said main carriage and means responsive to the extent of pivoting movement of said arm for selectively locking the said main carriage to the said beam and allowing free translation movement of said beam or allowing free reciprocable movement of said main carriage on said beam and locking said beam to the said frame so as to selectively move said guiding element along a straight path or another straight path at right angles thereto, depending upon the extent of pivoting of said arm, a second carriage having a marking element mounted thereon, coupling means for making said second carriage responsive to movements of said main carriage, thereby permitting a draftsman to grip said control means and manually propel said main carriage and said beam to make said translation movement, or to manually propel said main carriage to make said reciprocable movement.

42. A drafting machine for making technical diagrams, comprising a frame, a beam means mounted for translating movement across said frame, said beam means including gear means at the ends thereof, said beam means including coupling means to couple said gear means so they rotate together, said frame having a pair of racks in parallel relationship to form a track for said beam means, said racks being in geared relationship with said gear means, said beam means including rack means along its longitudinal axis, a carriage mounted on said beam means for longitudinal reciprocable movement thereon, said carriage including gear means coupled to said rack means on said beam means and said gear means on said beam means, a marking element carried by said carriage, control means mounted on said carriage and including an arm pivoted on said carriage, means responsive to the extent of pivoting movement of said arm for selectively locking the said carriage to the said beam means and allowing free translation movement of said beam means or allowing free reciprocable movement of said carriage on said beam means and locking said beam means to the said frame so as to selectively draw lines along a straight path or another straight path at right angles thereto, depending upon the extent of pivoting of said arm, scale means mounted on said carriage for registering the travel movement of said carriage when said machine is selectively locked for movement along straight paths, said scale means including means to interconnect and rotate with said gear means on said carriage, said interconnecting of said scale means being in response to a different movement of said control means, whereby said scale means can accurately measure and register the distance traveled by said carriage when drawing a straight line, said scale means including means for zero setting so the scale means will start to measure simultaneously with the starting of drawing of a straight line, a round protractor means mounted adjacent and concentrically with said frame and interconnected thereto, said protractor means including rotating means for selectively changing the angular relationship between the said frame and said surface to be marked, thereby allowing said carriage to be moved selectively in any direction over the said surface to be marked, a parallel motion mechanism secured to a fixed object and being engaged with said protractor means, said fixed object having a fixed axis parallel to said surface to be marked, said protractor means having an axis parallel to said fixed axis, said protractor means being annular, said parallel motion mechanism including means to maintain a parallel relationship between said fixed axis and said parallel axis, while sweeping said protractor means and said frame over the said surface to be marked thereby allowing the carriage to be positioned locally over a large said surface to be marked to selectively draw lines in any direction in true relationship to each other.

43. An automatic graphic machine for making technical drawings, comprising a frame, a beam mounted for translating movement across said frame, a main carriage mounted on said beam for longitudinal reciprocable movement thereon, a guiding element carried by said main carriage, an arm pivoted on said main carriage, and means responsive to the extent of pivoting movement of said arm for selectively locking said main carriage to the said beam and allowing free translation movement of said beam or allowing free reciprocable movement of said main carriage on said beam and locking said beam to the said frame so as to selectively move said guiding element along a straight path or another straight path at right angles thereto, depending upon the extent of pivoting of said arm, a second carriage mounted on said beam for longitudinal, reciprocable movement thereon, said second carriage having a marking element mounted thereon, coupling means for making said second carriage responsive to movements of said main carriage, and means responsive to the said extent of pivoting of said arm for preselecting the width of line to be drawn by said marking element.

44. A machine as recited in claim 43 wherein said coupling means includes switching means for selectively coupling said main carriage to said second carriage so that they will move in the same or in opposite directions to each other, together with scale means mounted on one of said carriages, said scale means being interconnected with said beam so as to register the distance traveled by said beam across said frame or the distance traveled along said beam by said carriage on which said scale means is mounted, whereby a line can be drawn and be measured simultaneously.

References Cited in the file of this patent

UNITED STATES PATENTS

| | | |
|---|---|---|
| 467,825 | McCabe | Jan. 26, 1892 |
| 623,227 | Veronese et al. | Apr. 18, 1899 |
| 784,633 | Schantz | Mar. 14, 1905 |
| 1,118,215 | Mossman | Nov. 24, 1914 |
| 1,185,996 | Groby | June 6, 1916 |
| 1,227,862 | Wikberg | May 29, 1917 |
| 1,285,279 | McCabe | Nov. 19, 1918 |
| 1,323,716 | Nelson | Dec. 2, 1919 |
| 1,393,572 | Ritchie | Oct. 11, 1921 |
| 1,627,205 | Seaborne | May 3, 1927 |
| 1,719,621 | Pearne et al. | July 2, 1929 |
| 1,805,740 | Peters | May 19, 1931 |
| 1,884,302 | Shanks | Oct. 25, 1932 |
| 2,035,677 | Steinke | Mar. 31, 1936 |
| 2,072,286 | Wellington | Mar. 2, 1937 |
| 2,145,861 | Casto | Feb. 7, 1939 |
| 2,219,783 | Matson | Oct. 29, 1940 |
| 2,269,643 | Bechtle et al. | Jan. 13, 1942 |
| 2,279,338 | Oldham | Apr. 14, 1942 |
| 2,328,405 | Williams et al. | Aug. 31, 1943 |
| 2,347,558 | Hedin | Apr. 25, 1944 |
| 2,353,726 | Guttmann | July 18, 1944 |
| 2,357,206 | Klages | Aug. 29, 1944 |
| 2,359,037 | Hofrichter | Sept. 26, 1944 |
| 2,377,780 | Hann | June 5, 1945 |
| 2,622,871 | Martin | Dec. 23, 1952 |
| 2,793,080 | Brown et al. | May 21, 1957 |

FOREIGN PATENTS

| | | |
|---|---|---|
| 18,982 | Great Britain | 1907 |
| 188,794 | Germany | Sept. 23, 1908 |
| 265,885 | Germany | Oct. 18, 1913 |